United States Patent
Paiz

(10) Patent No.: US 11,423,018 B1
(45) Date of Patent: Aug. 23, 2022

(54) MULTIVARIATE ANALYSIS REPLICA INTELLIGENT AMBIENCE EVOLVING SYSTEM

(71) Applicant: Richard Paiz, N. Miami Beach, FL (US)

(72) Inventor: Richard Paiz, N. Miami Beach, FL (US)

( * ) Notice: Subject to any disclaimer, the term of this patent is extended or adjusted under 35 U.S.C. 154(b) by 173 days.

(21) Appl. No.: 16/805,682

(22) Filed: Feb. 28, 2020

Related U.S. Application Data

(60) Continuation-in-part of application No. 16/802,526, filed on Feb. 26, 2020, which is a continuation-in-part of application No. 16/129,784, filed on Sep. 12, 2018, now Pat. No. 10,936,687, which is a continuation-in-part of application No. 15/944,770, filed on Apr. 3, 2018, now abandoned, which is a division of application No. 15/889,150, filed on Feb. 5, 2018, now Pat. No. 11,048,765, which is a division of application No. 15/829,963, filed on Dec. 3, 2017, now abandoned, which is a division of application (Continued)

(51) Int. Cl.
| | |
|---|---|
| G06F 7/00 | (2006.01) |
| G06F 16/242 | (2019.01) |
| G06F 16/951 | (2019.01) |
| H04L 67/52 | (2022.01) |
| H04L 67/02 | (2022.01) |

(52) U.S. Cl.
CPC .......... *G06F 16/243* (2019.01); *G06F 16/951* (2019.01); *H04L 67/18* (2013.01); *H04L 67/02* (2013.01)

(58) Field of Classification Search
CPC .. G06F 16/00; G06F 16/9535; G06F 16/3341; G06F 16/3328; G06F 16/337; G06F 16/243; G06F 16/951; H04L 67/18; H04L 67/02
See application file for complete search history.

(56) References Cited

U.S. PATENT DOCUMENTS

| | | | |
|---|---|---|---|
| 4,974,191 A | 11/1990 | Amirghodsi | |
| 5,025,369 A | 6/1991 | Schwartz | |

(Continued)

FOREIGN PATENT DOCUMENTS

EP 0448800 A1 10/1991

OTHER PUBLICATIONS

Robertson, et al. "Cone Trees: Animated Visualization of Hierarchical Information", 1991.

(Continued)

*Primary Examiner* — Mohammed R Uddin
(74) *Attorney, Agent, or Firm* — Jonathan Torchman; Torchman IP LLC

(57) ABSTRACT

An evolving system of computers linked into a neural network continuously scans and gathers information from, understands, and interacts with, an environment; and a client computer program interactively executes software instructions using a subject matter data warehouse to transform input into a search pattern. The evolving system server supercomputer program executes multivariant big data indexing to cherry pick the optimal input and output using page, site and supersite probabilities. The client computer program analyzes the optimal output given a search pattern in order to interact and engage scripted communication with the end user.

20 Claims, 26 Drawing Sheets

Related U.S. Application Data

No. 15/829,916, filed on Dec. 2, 2017, now abandoned, which is a division of application No. 15/708,122, filed on Sep. 18, 2017, which is a division of application No. 15/644,713, filed on Jul. 7, 2017, which is a division of application No. 15/494,497, filed on Apr. 22, 2017, which is a division of application No. 15/486,276, filed on Apr. 12, 2017, now Pat. No. 10,922,363, which is a continuation-in-part of application No. 15/390,713, filed on Dec. 26, 2016, now Pat. No. 10,915,523, which is a division of application No. 15/352,555, filed on Nov. 15, 2016, now abandoned, which is a division of application No. 15/264,996, filed on Sep. 14, 2016, which is a division of application No. 15/246,446, filed on Aug. 24, 2016, now Pat. No. 10,959,090, which is a division of application No. 15/175,861, filed on Jun. 7, 2016, now Pat. No. 11,281,664, which is a division of application No. 14/682,052, filed on Apr. 8, 2015, which is a division of application No. 14/623,559, filed on Feb. 17, 2015, which is a division of application No. 14/582,236, filed on Dec. 24, 2014, which is a division of application No. 14/578,439, filed on Dec. 21, 2014, now abandoned, which is a division of application No. 14/474,268, filed on Sep. 1, 2014, now abandoned, which is a division of application No. 14/028,508, filed on Sep. 16, 2013, now Pat. No. 9,355,352, which is a continuation-in-part of application No. 14/013,018, filed on Aug. 28, 2013, now abandoned, which is a continuation-in-part of application No. 13/777,775, filed on Feb. 26, 2013, now Pat. No. 8,977,621, which is a continuation-in-part of application No. 13/247,964, filed on Sep. 28, 2011, now Pat. No. 8,868,535, which is a continuation-in-part of application No. 12/785,122, filed on May 21, 2010, now Pat. No. 8,386,456, which is a continuation-in-part of application No. 12/778,228, filed on May 12, 2010, now Pat. No. 8,239,229, which is a continuation-in-part of application No. 12/764,934, filed on Apr. 21, 2010, now Pat. No. 8,676,667.

(56) References Cited

U.S. PATENT DOCUMENTS

| | | |
|---|---|---|
| 5,063,506 A | 11/1991 | Brockweil et al. |
| 5,265,065 A | 11/1993 | Turtle |
| 5,585,839 A | 12/1996 | Ishida et al. |
| 5,659,766 A | 8/1997 | Saund |
| 5,671,363 A | 9/1997 | Cristofich et al. |
| 5,677,835 A | 10/1997 | Carbonell |
| 5,706,497 A | 1/1998 | Takahashi et al. |
| 5,710,916 A | 1/1998 | Barbara |
| 5,748,807 A | 5/1998 | Lopresti |
| 5,762,552 A | 6/1998 | Vuong et al. |
| 5,790,935 A | 8/1998 | Payton |
| 5,794,210 A | 8/1998 | Goldhaber et al. |
| 5,809,282 A | 9/1998 | Cooper et al. |
| 5,819,258 A | 10/1998 | Vaithyanathan et al. |
| 5,832,069 A | 11/1998 | Waters et al. |
| 5,873,076 A | 2/1999 | Barr |
| 5,873,099 A | 2/1999 | Hogan et al. |
| 5,878,113 A | 3/1999 | Bhusri |
| 5,878,127 A | 3/1999 | Fleischer, III |
| 5,881,269 A | 3/1999 | Dobbelstein |
| 5,910,981 A | 6/1999 | Bhagat et al. |
| 5,917,899 A | 6/1999 | Moss et al. |
| 5,918,010 A | 6/1999 | Appleman |
| 5,931,901 A | 8/1999 | Wolfe et al. |
| 5,940,821 A | 8/1999 | Wical |
| 5,978,780 A | 11/1999 | Watson |
| 5,987,446 A * | 11/1999 | Corey ................ G06F 16/951 |
| 5,995,920 A | 11/1999 | Carbonell |
| 6,006,225 A | 12/1999 | Bowman |
| 6,028,924 A | 2/2000 | Ram et al. |
| 6,069,310 A | 5/2000 | James |
| 6,078,657 A | 6/2000 | Alfieri et al. |
| 6,088,733 A | 7/2000 | Kikuchi |
| 6,128,378 A | 10/2000 | Diener et al. |
| 6,182,085 B1 * | 1/2001 | Eichstaedt ............ G06F 9/5083 |
| 6,219,652 B1 | 4/2001 | Carter et al. |
| 6,233,545 B1 | 5/2001 | Datig |
| 6,243,480 B1 | 6/2001 | Zhao et al. |
| 6,256,627 B1 | 7/2001 | Beattie et al. |
| 6,264,560 B1 | 7/2001 | Goldberg et al. |
| 6,279,038 B1 | 8/2001 | Hogan |
| 6,282,653 B1 | 8/2001 | Berstis et al. |
| 6,285,999 B1 | 9/2001 | Page |
| 6,330,672 B1 | 12/2001 | Shur |
| 6,345,182 B1 | 2/2002 | Fabritius et al. |
| 6,356,899 B1 | 3/2002 | Chakrabarti |
| 6,363,253 B1 | 3/2002 | Valentine et al. |
| 6,377,993 B1 | 4/2002 | Brandt |
| 6,405,188 B1 | 6/2002 | Schwartz |
| 6,408,282 B1 | 6/2002 | Buist |
| 6,415,319 B1 | 7/2002 | Ambroziak |
| 6,418,433 B1 | 7/2002 | Chakrabarti |
| 6,427,132 B1 | 7/2002 | Bowman-Amuah |
| 6,442,169 B1 | 8/2002 | Lewis |
| 6,445,785 B1 | 9/2002 | Chan et al. |
| 6,463,275 B1 | 10/2002 | Deakin |
| 6,484,162 B1 | 11/2002 | Edlund |
| 6,490,345 B2 | 12/2002 | Fleischer et al. |
| 6,490,580 B1 | 12/2002 | Dey |
| 6,507,841 B2 | 1/2003 | Rivierieulx de Varax |
| 6,508,709 B1 | 1/2003 | Karmarkar |
| 6,510,419 B1 | 1/2003 | Gatto |
| 6,519,616 B1 | 2/2003 | Zamora-McKelvy |
| 6,526,440 B1 | 2/2003 | Bharat |
| 6,529,592 B1 | 3/2003 | Khan |
| 6,529,878 B2 | 3/2003 | De Rafael et al. |
| 6,546,388 B1 | 4/2003 | Edlund |
| 6,601,044 B1 | 7/2003 | Wallman |
| 6,614,781 B1 | 9/2003 | Elliott et al. |
| 6,614,893 B1 | 9/2003 | Paiz |
| 6,629,890 B2 | 10/2003 | Johnson |
| 6,661,884 B2 | 12/2003 | Shaffer et al. |
| 6,714,979 B1 | 3/2004 | Brandt |
| 6,754,873 B1 | 6/2004 | Law |
| 6,782,430 B1 | 8/2004 | Cragun |
| 6,842,511 B1 | 1/2005 | Paiz |
| 6,915,268 B2 | 7/2005 | Riggs et al. |
| 6,947,540 B2 | 9/2005 | Madoch et al. |
| 6,963,867 B2 * | 11/2005 | Ford ................ G06Q 30/02 707/752 |
| 7,006,988 B2 | 2/2006 | Lin et al. |
| 7,050,813 B1 | 5/2006 | Paiz |
| 7,058,601 B1 | 6/2006 | Paiz |
| 7,058,628 B1 | 6/2006 | Page |
| 7,059,515 B2 | 6/2006 | White |
| 7,103,536 B1 | 9/2006 | Kanno |
| 7,216,123 B2 | 5/2007 | Kamvar |
| 7,225,249 B1 | 5/2007 | Barry |
| 7,451,388 B1 | 11/2008 | Henzinger |
| 7,499,914 B2 | 3/2009 | Dieb et al. |
| 7,505,964 B2 | 3/2009 | Tong |
| 7,552,395 B2 | 6/2009 | Neale et al. |
| 7,660,815 B1 * | 2/2010 | Scofield ................ G06F 16/951 707/999.102 |
| 7,725,465 B2 | 5/2010 | Liao et al. |
| 7,739,281 B2 | 6/2010 | Najork |
| 7,756,850 B2 | 7/2010 | Keith, Jr. |
| 7,805,382 B2 | 9/2010 | Rosen |
| 7,809,659 B1 | 10/2010 | Paiz |
| 7,836,039 B2 * | 11/2010 | Clark ................ G06F 16/951 707/706 |
| 7,890,526 B1 | 2/2011 | Brewer et al. |
| 7,908,263 B1 | 3/2011 | Paiz |
| 8,239,229 B1 | 8/2012 | Paiz |

(56) References Cited

U.S. PATENT DOCUMENTS

| | | | |
|---|---|---|---|
| 8,291,080 B2* | 10/2012 | Miyakawa | G06Q 30/02 709/226 |
| 8,386,456 B1 | 2/2013 | Paiz | |
| 8,452,765 B2 | 5/2013 | Hoffman et al. | |
| 8,527,269 B1 | 9/2013 | Kupor et al. | |
| 8,548,995 B1 | 10/2013 | Curtiss | |
| 8,615,442 B1 | 12/2013 | Kupor et al. | |
| 8,620,951 B1 | 12/2013 | He et al. | |
| 8,630,975 B1 | 1/2014 | Guo | |
| 8,645,393 B1 | 2/2014 | Kolak | |
| 8,661,029 B1 | 2/2014 | Kim | |
| 8,676,667 B1 | 3/2014 | Paiz | |
| 8,682,892 B1 | 3/2014 | Panda et al. | |
| 8,700,653 B2 | 4/2014 | Hansson et al. | |
| 8,719,276 B1 | 5/2014 | Haahr | |
| 8,868,535 B1 | 10/2014 | Paiz | |
| 8,903,800 B2 | 12/2014 | Kakade et al. | |
| 8,924,379 B1 | 12/2014 | Kim | |
| 8,977,621 B1 | 3/2015 | Paiz | |
| 9,009,146 B1 | 4/2015 | Lopatenko | |
| 9,053,156 B1 | 6/2015 | He et al. | |
| 9,118,655 B1 | 8/2015 | Paczkowski et al. | |
| 9,135,307 B1 | 9/2015 | Panda et al. | |
| 9,191,522 B1 | 11/2015 | Krieger et al. | |
| 9,323,808 B1 | 4/2016 | Kanefsky | |
| 9,355,352 B1 | 5/2016 | Paiz | |
| 9,390,174 B2 | 7/2016 | Zhou et al. | |
| 9,514,404 B1 | 12/2016 | Corrado et al. | |
| 9,514,405 B2 | 12/2016 | Chen et al. | |
| 10,025,858 B2 | 7/2018 | Blass | |
| 2001/0037304 A1 | 11/2001 | Paiz | |
| 2002/0042793 A1 | 4/2002 | Choi | |
| 2002/0049622 A1 | 4/2002 | Lettich et al. | |
| 2002/0137217 A1 | 9/2002 | Rowe | |
| 2002/0143940 A1* | 10/2002 | Chi | G06F 16/951 709/225 |
| 2002/0173971 A1 | 11/2002 | Stirpe | |
| 2003/0018547 A1 | 1/2003 | Steele | |
| 2003/0036898 A1 | 2/2003 | Duan | |
| 2003/0050719 A1* | 3/2003 | Bao-Liang | G06K 9/6281 700/91 |
| 2003/0050819 A1 | 3/2003 | Koenigbauer et al. | |
| 2004/0024739 A1 | 2/2004 | Copperman et al. | |
| 2004/0093325 A1 | 5/2004 | Banerjee et al. | |
| 2004/0133671 A1* | 7/2004 | Taniguchi | H04L 29/06 709/224 |
| 2005/0114324 A1 | 5/2005 | Mayer | |
| 2005/0132305 A1* | 6/2005 | Guichard | G06F 16/957 715/855 |
| 2005/0165753 A1 | 7/2005 | Chen et al. | |
| 2006/0242098 A1 | 10/2006 | Wnek | |
| 2007/0033275 A1* | 2/2007 | Toivonen | G06F 16/9562 709/224 |
| 2007/0050393 A1 | 3/2007 | Vogel et al. | |
| 2007/0067297 A1* | 3/2007 | Kublickis | G06Q 20/29 |
| 2007/0094251 A1 | 4/2007 | Lu | |
| 2008/0027936 A1* | 1/2008 | Liu | G06F 16/951 |
| 2008/0126538 A1* | 5/2008 | Uyama | H04L 41/147 709/224 |
| 2008/0168033 A1 | 7/2008 | Ott et al. | |
| 2008/0195477 A1 | 8/2008 | Kennedy et al. | |
| 2008/0270377 A1* | 10/2008 | Liu | G06F 16/951 |
| 2009/0048941 A1* | 2/2009 | Strassmann | G06Q 30/02 705/26.62 |
| 2009/0100125 A1 | 4/2009 | McDowell | |
| 2009/0106081 A1* | 4/2009 | Burgess | G06Q 30/0242 705/14.41 |
| 2009/0106100 A1 | 4/2009 | Mashinsky | |
| 2009/0106224 A1 | 4/2009 | Roulland | |
| 2009/0150156 A1 | 6/2009 | Kennewick | |
| 2009/0240683 A1 | 9/2009 | Lazier | |
| 2009/0282022 A1 | 11/2009 | Bennett | |
| 2010/0017267 A1 | 1/2010 | Negron | |
| 2010/0138426 A1* | 6/2010 | Nakayama | G06F 16/313 707/741 |
| 2011/0125743 A1 | 5/2011 | Immonen et al. | |
| 2011/0145088 A1 | 6/2011 | Bonner et al. | |
| 2011/0219295 A1 | 9/2011 | Adams et al. | |
| 2011/0258258 A1 | 10/2011 | Briere | |
| 2012/0158633 A1 | 6/2012 | Eder | |
| 2012/0203754 A1* | 8/2012 | Biran | G06F 16/90344 707/706 |
| 2013/0159286 A1* | 6/2013 | Manzano Macho | G06F 16/24552 707/718 |
| 2013/0305333 A1 | 11/2013 | Katzer | |
| 2014/0032306 A1 | 1/2014 | Sukomyk | |

OTHER PUBLICATIONS

Hearst, et al. "Cat-a-Cone: An Interactive Interface for Specifying Searches and Viewing Retrieval Results using a Large Category Hierarchy", 1997.

Zamir, et al. "Grouper: A Dynamic Clustering Interface to Web Search Results", 1999.

Dumais, et al. "Hierarchical Classification of Web Content", 2000.

Wen, et al. "Clustering User Queries of a Search Engine", 2001.

Yue, et al., "A Video Summarization Tool Using Two-Level Redundancy Detection For Personal Video recorders", 2010.

Unknown, American Banker, "Chemical Buys Trading Software from Reuters", ( v 154, n 145, p. 14, Dialog file 9, Accession No. 005003233), 1994.

Croneliusson, Roy, SAP-R3, Jan. 1999. Downloaded from https:llqupea.ub.gu.se/dspace/bitstream/2077/1359/1/hattab.IA7400.pdf downloaded on Mar. 26, 2008, 47 pages.

SAP-CAPS, 1999. Downloaded from http://web.archive.org/web/19991105101002/www.caps.com/products/sap/sapr3.htm, 3 Pages.

RoutePro, 1999, Downloaded from http://web.archive.org/web/20010627035933/www.caps.com/products/rprodsgrfrpdsgrfeat.htm, 2 pages.

Paiz, Richard, "Designing Hot Billing Systems for Large Volume and/or Complex Networks" Doctoral Dissertation, California Coast University, Nov. 1999.

\* cited by examiner

MULTIVARIATE ANALYSIS REPLICA INTELLIGENT AMBIENCE EVOLVING SYSTEM

CROSS REFERENCE TO RELATED APPLICATIONS

This Continuation-In-Part Patent application claims the benefit of:

co-pending U.S. patent application Ser. No. 16/802,526, filed on Feb. 26, 2020, wherein U.S. patent application Ser. No. 16/802,526 is a Continuation-In-Part claiming priority co-pending U.S. patent application Ser. No. 16/129,784, filed on Sep. 12, 2018, wherein U.S. patent application Ser. No. 16/129,784 is a Continuation-In-Part claiming priority co-pending U.S. patent application Ser. No. 15/944,770 filed on Apr. 3, 2018, wherein U.S. patent application Ser. No. 15/944,770 is a Divisional Application claiming priority co-pending U.S. patent application Ser. No. 15/889,150 filed on Feb. 5, 2018, wherein U.S. patent application Ser. No. 15/889,150 is a Divisional Application claiming priority co-pending U.S. patent application Ser. No. 15/829,963 filed on Dec. 3, 2017, wherein U.S. patent application Ser. No. 15/829,963 is a Divisional Application claiming priority co-pending U.S. patent application Ser. No. 15/829,916 filed on Dec. 2, 2017, wherein U.S. patent application Ser. No. 15/829,916 is a Divisional Application claiming priority co-pending U.S. patent application Ser. No. 15/708,122 filed on Sep. 18, 2017, wherein U.S. patent application Ser. No. 15/708,122 is a Divisional Application claiming priority to co-pending U.S. patent application Ser. No. 15/644,713 filed on Jul. 7, 2017, wherein U.S. patent application Ser. No. 15/644,713 is a Divisional Application claiming priority to co-pending U.S. patent application Ser. No. 15/494,497 filed on Apr. 22, 2017, wherein U.S. patent application Ser. No. 15/494,497 is a Divisional Application claiming priority to co-pending U.S. patent application Ser. No. 15/486,276, filed on Apr. 12, 2017, wherein U.S. patent application Ser. No. 15/486,276 is a Continuation-In-Part claiming priority to co-pending U.S. patent application Ser. No. 15/390,713, filed on Dec. 26, 2016, wherein U.S. patent application Ser. No. 15/390,713 is a Continuation-In-Part claiming priority to co-pending U.S. patent application Ser. No. 15/352,555 filed on Nov. 15, 2016, wherein U.S. patent application Ser. No. 15/352,555 is a Divisional Application claiming priority to co-pending U.S. patent application Ser. No. 15/264,996 filed on Sep. 14, 2016, wherein U.S. patent application Ser. No. 15/264,996 is a Divisional Application claiming priority to co-pending U.S. patent application Ser. No. 15/246,446 filed on Aug. 24, 2016, wherein U.S. patent application Ser. No. 15/246,446 is a Divisional Application claiming priority to co-pending U.S. patent application Ser. No. 15/175,861 filed on Jun. 7, 2016, wherein U.S. patent application Ser. No. 15/175,861 is a Divisional Application claiming priority to co-pending U.S. patent application Ser. No. 14/682,052 filed on Apr. 8, 2015, wherein U.S. patent application Ser. No. 14/682,052 is a Divisional Application claiming priority to co-pending U.S. patent application Ser. No. 14/623,559 filed on Feb. 17, 2015, wherein U.S. patent application Ser. No. 14/623,559 is a Divisional Application claiming priority to co-pending U.S. patent application Ser. No. 14/582,236 filed on Dec. 24, 2014, wherein U.S. patent application Ser. No. 14/582,236 is a Divisional Application claiming priority to co-pending U.S. patent application Ser. No. 14/578,439 filed on Dec. 21, 2014, wherein U.S. patent application Ser. No. 14/578,439 is a Divisional Application claiming priority to co-pending U.S. patent application Ser. No. 14/474,268, filed on Sep. 1, 2014, wherein U.S. patent application Ser. No. 14/474,268 is a Divisional Application claiming priority to co-pending U.S. patent application Ser. No. 14/028,508, filed on Sep. 16, 2013 (issued as U.S. Pat. No. 9,355,352 on May 31, 2016), wherein U.S. patent application Ser. No. 14/028,508 is a Continuation-In-Part Utility Application claiming priority to co-pending U.S. patent application Ser. No. 14/013,018, filed on Aug. 28, 2013 (now abandoned), wherein U.S. patent application Ser. No. 14/013,018 is a Continuation-In-Part claiming priority to co-pending U.S. patent application Ser. No. 13/777,775, filed on Feb. 26, 2013 (issued as U.S. Pat. No. 8,977,621 on Mar. 10, 2015), wherein U.S. patent application Ser. No. 13/777,775 is a Continuation-In-Part claiming priority to co-pending U.S. patent application Ser. No. 13/247,964, filed on Sep. 28, 2011 (issued as U.S. Pat. No. 8,868,535 on Oct. 21, 2014), wherein U.S. patent application Ser. No. 13/247,964 is a Continuation-In-Part claiming priority to co-pending U.S. patent application Ser. No. 12/785,122, filed on May 21, 2010 (issued as U.S. Pat. No. 8,386,456 on Feb. 26, 2013), wherein U.S. patent application Ser. No. 12/785,122 is a Continuation-In-Part claiming priority to co-pending U.S. patent application Ser. No. 12/778,228, filed on May 12, 2010 (issued as U.S. Pat. No. 8,239,229 on Aug. 7, 2012), wherein U.S. patent application Ser. No. 12/778,228 is a Continuation-In-Part claiming priority to co-pending U.S. patent application Ser. No. 12/764,934, filed on Apr. 21, 2010 (issued as U.S. Pat. No. 8,676,667 on Mar. 18, 2014);

all of which are incorporated herein in their entireties.

FIELD OF THE INVENTION

The present invention relates generally to an Internet evolving system, more particularly relates to an interface product that works independently and in parallel with the browser and search engine supercomputer that gathers, analyzes and distills interactively input.

BACKGROUND OF THE INVENTION

Conventional Search Engines have various limitations, drawbacks and/or disadvantage that get compounded as the scope of the search increases.

SUMMARY OF THE INVENTION—(IBS) INTELLIGENT BILLING SYSTEM

The invention is directed to a neural network supercomputer that is optimized for internet search engine upon uniquely ranking and weighting each resource, webpage or page, website or site or IP Address, and Super Site, or website portal. It would be desirable to implement a search engine that operates with an interactive search scope.

U.S. 60/184,537 teaches "Intelligent Components (IC) work in unison to generate a billing entity for all calls. The IBS scans the environment by gathering network messages such as SS7 protocol ISDN User Part (ISUP) or Asynchronous Transfer Mode (ATM) messages and Central Office Switch (CO) Call Detail Records (CDR). This information is obtained by polling SS7 messages, and then the IC filter out all unnecessary messages, and instantiate calls once, an Instant Access Message (IAM) message is obtained. All the valid messages are the scrubbed and primed upon scanning a Release (REL) message and then inserted into the appropriate database, the duration, cost and value of the call is immediately determined."

U.S. 60/184,537 teaches "The IBS neural network includes multiple computer called intelligent components (IC) that mimic production class V Central Office Switches (CO), which give connection between the telephone company's network and customer premises equipment (CPE)." To those in the art the IBS neural network simulates each call of the network.

U.S. 60/184,537 teaches "The IBS neural network further include larger computers that are used as Data Warehouse (IDW) (IDW is a collection of integrated subject-oriented databases designed to support Decision Support function, where each unit of data is relevant to some moment in time) for live data mining and Network Information Warehouse (INIW) (INIW is a specialized type of Data Warehouse designed to monitor network traffic) continuous network traffic monitoring." To those in the art Intelligent Data Warehouse, are subject matter database, designed to support Decision Support function and to assign task to subordinate computers.

U.S. 60/184,537 teaches "The IBS neural network further has multiple components and business rules that convert every packet and CDR into a common language message format so that all the IC, IDW, and INIW can communicate. IC every minute monitor the connect ratio, system integrity and traffic volume to give live data to the IDW and INIW, which helps to identify buffer resources to further make the process of converting input data to output data more productive. Every single IC has its own copy of a database to keep tract of its own internal decision statistics and a client connection to its respective data warehouse. Note (HQ represents a leader within a military organization) HQ3-HQ5 are dually considered data warehouses and network information warehouses." To those in the art the Intelligent Components are continuously polling messages from the environment, that are sent to parent IDW and INIW for decision making, assigning tasks and prioritizing resources given real time sensitive constraints.

U.S. 60/184,537 teaches "The Intelligent Component Billing System's intelligent components go through different fuzzy states to arrive at a billable entity. Then the IC calculates how to maximize its available internal and external resources. Intelligent components can use available buffer resources interactively to reduce the load in the queuing system. The default choice each intelligent component will take is to determine the expected number of messages stored in the queuing system and determine if it can process all the messages within time interval limitations." To those in the art real time describes as fast as possible and when optimized for the Internet within 0.1 seconds. To those in the art interactively as the end user speaks or types input describes assigning scripted input timer delays in the seconds to avoid saturating the user with useless outputs and servers continuously modify values as network conditions change.

U.S. 60/184,537 teaches "The IBS can maximize the resources in a network and increase the throughput of any given network by 50 percent. This is accomplished by distributing the work amongst all of the intelligent components. The intelligent components also create a vector CDR with source, destination, and route, which simplify the correlation process. All the members of the networks readjust the efforts and synchronize themselves to work in unison. HQ2+ are responsible to make all the subordinate intelligent components work as a team and from this planning and coordination, the benefits of synergy are manifested." To those in the art each Intelligent Component belongs to a large scale distributed hierarchal computer system. HQ2+ servers are supervisors components executing software instruction in order to assign and prioritize time sensitive tasks and decision support functions, whereas the HQ0 to HQ1 subordinate components, perform the lion share of the work. HQ2+ servers continuously create environment bitmaps messages with parameters that are used to modify and prioritize tasks.

U.S. 60/184,537 teaches "Parallel processing and database accessing are key technologies that enable two or more different IC to be able helps another intelligent component (IC). Synergy is achieved since parent-child IC use and work with their local copy of database are thus able to mimic other IC." To those in the art the virtual Maestro client side artificial intelligence program analyzes and deciphers as human interactive input is transformed into a search pattern question and virtual Da Vinci server side artificial intelligence is programmed to continuously figure out the optimal dataset given a search pattern question using human knowledge, wisdom and understanding, and uses big data indexing to predict what is relevant and irrelevant using unique page, site and super site probabilities and 'related objects' values.

U.S. 60/184,537 teaches "The IBS not only correlates billing entities in real time, but also proactively monitors the network integrity and scans for specific patterns that might predict new churn, system failures, system volume, and/or usage behaviors. To those in the art IDW (Intelligent Data Warehouses) and INIW (Intelligent Network Information Warehouse) perform Business Intelligence statistics of the inputs and outputs to identify patterns recognition and permits the (multidimensional array reiterating intelligence ambience) evolving system to continuously predicts, updates and weights significant time sensitive conditions of the Internet environment, in order to modify input and output preprocessed and pre-calculated datasets.

U.S. 60/184,537 teaches" All IDW (HQ3+) are large Data Warehouses with the ability to store substantial amounts of data. IDW (HQ3+) servers have terabyte capacity and have many IC under their command. HQ3 IDW and HQ4 request their parent HQ5 for resource allocation for processing billing entities, data mining reports, and/or network traffic management and work collectively. "To those in the art Decision Support functionality in view of big data indexing technologies analyzes, quantifies, qualifies and stores in real time massive amounts of data.

U.S. Pat. No. 6,614,893 teaches "A computer network system within a virtual environment, includes several computers which are networked to each other to function as a single unit, including at least one parent computer synchronizing and delegating tasks among the several computers; so that the unit scans and gathers data from the virtual environment, and processes and organizes the data into an implementable representation of the data. The unit preferably additionally includes at least one dedicated computer for performing a specific task, and at least one processing computer for providing processing power to the unit. The unit alternatively delivers the implementable representation of the data in the form of a report to a user computer terminal and awaits a decision from a human user." To those in the art the virtual environment describes a simulation replica of a real world computer network, and then HIVE working as a single unit processes and iterates to assimilate and transform all the messages, in order to deliver the implementable representation of the data in the form of a report to a user computer. The report can be further described as optimal data that is spoken to the end user's smart device. U.S. Pat. No. 8,386,456 teaches the human knowledge Codex Encyclopedia and U.S. Pat. No. 9,355,352 further teaches transforming the HIVE into an evolving system that continuously searches the Codex Encyclopedia to find preprocessed and pre-calculated outputs natural variants responses or reports. U.S. Ser. No. 16/129,784 further teaches an interactive artificial intelligence virtual maestro that upon detecting relevant significant data given the tracked search pattern, weights probable and plausible branching responses or reports. To those in the art the virtual maestro finds the optimal report by probabilistically weighting each input and output combination data sets to decern a craving need based on the user's search preferences and upon determine a satisfying response automatically engages in an interactive personalized multimedia communication with a human.

U.S. Pat. No. 6,614,893 teaches "The system generally includes a hierarchy of individual computers interlinked to form a single unit known as a hive, some of which are dedicated to performing certain tasks while others provide processing power and still others at the peak of the command hierarchy synchronize and delegate tasks among the various interlinked computers with continuous automatic reevaluation and redirection in real time. The real time interlinking of the computers making up the hive permits execution of strategies pre-set by the user and also permits user updating and changing of the strategies as new information becomes available. The intelligent components of the parent or command computers, which are intelligent data warehouses, interrelate. The synergistic interlinking of these several computers multiplies processing power to a level many times greater than that of a single computer running a program." U.S. Pat. Nos. 7,809,659 and 7,908,263 teaches to those in the art continuous automatic reevaluation and redirection in real time to represent a question that receives an answer in 0.1 seconds when preprocessed and pre-calculated and U.S. Ser. No. 16/129,784 The system uses the end user's profile to track search patterns deemed as a craving need, and upon determining a satisfying significant change of the environment (or high quality website) communicates in a scripted time delayed manner mimicking a human. U.S. Ser. No. 16/802,526 weights each input and output combination datasets as if a human scripted time delayed (in seconds) upon scanning social media and trending data to instantiate a dialogue with the human, with one exception, automatically (with no delay) when performing a mission critical financial transaction in behalf of the end user.

U.S. Pat. No. 6,614,893 teaches "The method of optimizing parameters of tasks executed within a virtual environment using the above-described system includes the steps of scanning the virtual environment; gathering data from the virtual environment; and processing the data into an implementable representation of the data. Additional steps include delivering the implementable representation of the data in the form of a report to an end user computer terminal; and receiving instructions from the end user based upon the content of the report. Where the system additionally includes a strategy program within the hive for receiving and evaluating the implementable representation of the data and for delivering a command based upon the evaluation of data to networked computers, the method includes the additional step of receiving into the hive and evaluating the implementable representation of the data; and delivering a command to a computer within the virtual environment based upon the evaluation of data substantially in real time." To those in the art evaluation is to determine if the data matters.

U.S. Pat. No. 7,058,601, issued to Paiz, Jun. 6, 2006 claim language teaches "1. A non-centralized, hierarchically-arranged, multi-tiered distributed parallel computer network system incorporating software for imparting artificial intelligence to system hardware and communicatively coupled to a plurality of financial exchanges and at least one real time news source for facilitating the real-time trading of securities offered through the exchanges by an end user from an end user computer terminal, the computer network system comprising:

(A) configured to continuously process and filter said raw data into primed data comprehensible for human monitoring and evaluation;

(B) coupled to a continuous real-time news, data and information source, and particularly programmed to analyze and parse through said news, data and information in real time to determine portions thereof having relevance based upon the most recent primed data received;

(C) computers having a strategy execution computer program installed and running thereon for comparing the primed data to end user-defined parameters in order to automatically instructions upon the occurrence of said primed data falling within said parameters;

(D) computers having a computer program installed and running thereon for proactively determining the information being tracked by said end user, customizing said news, data and other information based upon the particular information being tracked, and automatically communicating updates of said news, data and other information to said end-user computer terminal; and, (E) Said summit-tier computer cluster coordinating, controlling, managing and synchronizing the tasks each of the subordinate computer cluster tiers."

To those in the art "communicatively coupled to a plurality of financial exchanges and at least one real time news source for facilitating the real-time trading of securities offered through the exchange" describes an apparatus to process real time primed data for trading securities. U.S. Pat. Nos. 7,809,659 and 8,676,667 teaches the server side of the apparatus the XCommerce Search Engine that transform regular expressions into linguistic word patterns.

U.S. Pat. Nos. 7,908,263, 8,868,535, and 8,997,621 teach the client side of the apparatus the Cholti search engine optimizer software that interactively transforms input into an optimal version of the input or search pattern using the human brain equation that uses independent variables, and human knowledge "subject matter", human wisdom "rules of association and likelihood" and human understanding "hot and cold algorithm and rules of relevancy" to figure out the best possible weighted combination of keywords search pattern to filter and dilute the searchable and navigational environment to derive the output.

To those in the art U.S. Pat. No. 8,386,456, U.S. Ser. No. 15/390,713 and U.S. Ser. No. 15/486,276 teaches "how to store billions of linguistic words patterns into the 'CORE List' and trillions of probable and plausible valid combinations into a human knowledge Codex encyclopedia, where each multivariate search pattern is represented as a Codex Page." Furthermore, teaches "how to update, synchronize and build the master index of the Internet and each partial master index improved environment given a set of probabilistic independent variables as the evolving system continuously iterates (analyzes), monitors (gathers), determines (probabilistically evaluates) and automatically updates tracking human monitoring and evaluation indicia (using end user defined parameters) to display or speak changes in the environment that are satisficing given a craving need defined parameter to the user computer terminal, smart or interface device."

To those in the art "A non-centralized, hierarchically-arranged, multi-tiered distributed parallel computer network system incorporating software for imparting artificial intelligence to system hardware and communicatively coupled to a plurality of financial exchanges and at least one real time news source for facilitating the real-time trading of securities" describes a system that performs: (A) continuous real time primed data for human monitoring and evaluation, U.S. Pat. No. 7,809,659 further teaches: as trending data used for business intelligence, U.S. Pat. No. 7,908,263 further teaches: optimal preprocessed and pre-calculated results, U.S. Pat. No. 8,386,456 further teaches: optimal dataset human knowledge entities belonging to an Inventory Control Encyclopedia.

It is the object of the invention for the evolving system supercomputer to improve over the Managerial Pyramid Switch that continuously and monitors the Internet environment and determines from the changing environment "which and what" particular information is important using the Codex Encyclopedia input hierarchical set of valid search pattern Codex Pages and Big Data Indexing volume, velocity, veracity, value, variant, variability, vim and vigor.

It is the object of the invention for the evolving system supercomputer to improve over the Codex Encyclopedia that iterates human interactions and significant changes to Codex Pages determined by the changing environment introducing big data indexing: human knowledge "Where and Who" and human wisdom "When and How" algorithms to improve the quality of (assisted input), geospatial (smart input), metadata and trending (personal input) data.

It is the object of the invention for the evolving system supercomputer to improve over the Codex Encyclopedia upon determining la crème de la crème or the input that automatically maps the output determined by the changing environment answering the "Why" it is satisficing given an end user define parameter craving needs while randomly surfing the web or performing a communicating and/or dialoguing with an intelligence ambience smart or interface device.

An apparatus, including a computer hive made up of several inter-linked computers having specialized functions, the computers operating in unison to build a supercomputer that has shared disk space and memory, in which each node belongs to the collective and possesses its own business rules and membership to an organization managerial hierarchy.

Big Data Indexing describes a massive data warehousing means used for knowledge discovery that then uses business intelligence to understand for each search pattern optimal dataset that becomes the output, the "Which, What, Where, Who, When, How and Why" that are used by the intelligence ambience to derive command instruction or communicate with the end user upon receiving post factum changes in the environment that meet a craving need.

Page Rank describes as Markov expansion model to scan, gather and analyze each document and to assigning on a score to each document of the Internet, and using probability sampling to determine a unique ranking probability from (0 irrelevant to 1 certain).

Site Rank describes the process of assigning each document of the Internet to a parent website, and removing duplicate, spam, viral and non-navigational content from calculation, and using probability sampling to determine a unique ranking probability from (0 irrelevant to 1 certain), then Website using probability ranges are given a quality partition that is used to attenuate low quality website and shrink the searchable environment optimally and to gain factor the highest quality in order to find (la crème de la crème or) the optimal answer.

Super Site Rank describes as a plurality of website belonging to the same Corporate ID.

Codex Page Rank describes the search pattern way to measure the hierarchical dataset of natural variants, probable and positional branching human knowledge attributes entities.

Value of the Content Rank describes the Inventory value of the content where the search pattern is found in a Page, Site, Super Site, Industry and the Internet using Big Data Indexing.

Volume Rank describes the number of search clicks to the search pattern is found in a Page, Site, Super Site, Industry and the Internet as in overall trending value.

Value of the Positional Branching Entity describes the value of the search pattern is found in a Page, Site, Super Site, Industry and the Internet using Big Data Indexing, where the positional branching of human knowledge is a term or concept of the Codex Encyclopedia. To those in the field the value of the Natural Variant Entity describes, the Codex Encyclopedia, used discover key featured association or associative features entities to a term or concept.

Value of the Probable Branching Entity given the Search pattern describes the value of the search pattern, natural variants and probable branching entities are found in a Page, Site, Super Site, Industry and the Internet using, the Codex Encyclopedia, Big Data Indexing, where human knowledge, and wisdom are used to discover key featured transitive or rules of transitive features entities to a plurality of related terms and concepts.

Value of the Plausible Branching Entity given the Search pattern describes the value of the search pattern, natural variants, probable and plausible branching entities are found in a Page, Site, Super Site, Industry and the Internet using, the Codex Encyclopedia, Big Data Indexing, where human knowledge, wisdom and understanding are used to discover key featured transitive or rules of transitive features entities to a plurality of related terms and concepts.

Value of the Checkmate Combinations given the Search pattern describes the value a checkmate combination that are found in a Page, Site, Super Site, Industry and the Internet using Big Data Indexing, where input automatically maps output upon finding a cascade of terms and entities to map six independent variables. E.g. When a user types of says a telephone number which is reversed engineered into GPS data (X, Y, Z) and Business (I), Address (J) and personal information (K) hierarchal sets. The virtual maestro upon achieving informational certainty performs knowledge discovery of the output to communicate mimicking another human.

Supercomputer—Managerial Pyramid Switch

The present invention relates to a system of computers linked to form a Supercomputer subdivided into multiple hierarchical neural sub-components having neural elements residing at remote sites. The Supercomputer updates, validates and verifies the flow of environmental messages by scrubbing, validating, standardizing, organizing, transforming, analyzing and then evaluating the massive amount of data bring order to the Internet, using eigenvectors to rank each webpage and site of the world wide web. The system is comprised of computers configured, linked and otherwise arranged to form a Supercomputer subdivided into multiple hierarchical neural-like subcomponents, having neural elements residing at remote sites.

To those in the art bringing order to the web describes the process of measuring with harmony, balance and proportion the Internet using a Supercomputer to map and plot a valid, verified, and non-redundant simulation of the physical environment. Big Data Index refining of the virtual environment is how the supercomputer can replicate and store each resource, webpage, site, supersite, and industry into the link database, with corresponding unique probability values such as Page Rank, Site Rank and Supersite Rank.

It is object of this invention to add the Industry Rank of each resource when performing the 'Vueno, Vonito, Varato' algorithm of the improved environment and each managerial hierarchical set of entities given a search pattern using human like decision making.

U.S. Pat. No. 7,809,659 teaches "the Managerial Pyramid Switch supercomputer for Telecommunications networks, using parallel cluster computers to create a very fast and inexpensive Supercomputer probabilistically integrates all the resources of the Internet."

U.S. Pat. No. 7,809,659 teaches Telecom version: "is a parallel cluster Supercomputer using Intelligent Components to analyze, gather and distill the messages of the environment created by each telephone call, and the information is scrubbed, primed, rated and match/merge into a correlated billing entity that is stored at the insertion rate of one million transactions per minute. The technology has evolved into a mission critical system that is commercially known as the Managerial Pyramid Switch®, that is designed to simulate and plot circuit by circuit all the telecommunications networks of a PTT. To those in the art Supercomputer that allows the integration of the Internet describes a global Telecommunication network."

U.S. Pat. No. 7,809,659 introduces the TQM version: "The MPS™ uses fuzzy math to measure the performance and strength of the traffic traveling through the environment, so that human intelligence can perform strategic planning using Business Intelligence programs to better understand the craving needs of the end users to offer the best quality product and services. To those in the art Business Intelligence programs to better understand the craving needs of the end users describes incorporating data warehousing improvements to Total Quality Management principles of product, quality and service using personal usage search patterns."

U.S. Pat. No. 7,809,659 introduces UCommerce "method and supplier system that identifies inefficiencies, match/merge multiple quotes to take benefit of economies of scale to optimize the traffic patterns of the movement of merchandise from Leg A (origin) to Leg B (destination) using X_FOB and Y_CDIF meaning, converting all of the WebPages of the Internet to possess geospatial, demographic and debit card functionalities to improve product, quality and service. To those in the art X_FOB and Y_CDIF methods describes shopping cart capabilities used to determine an optimal time and price per unit door to door delivery."

U.S. Pat. No. 7,809,659 introduces XCommerce, "converts the 'massive' information of the Internet by transforming the content into basic language business blocks and then stores its mathematical values into Environmental Bitmaps Data Structures, so that Inventory Control Systems can quantify, qualify and determine the best satisfying results of an end user KEYWORD request. To those in the art Environmental Bitmap methods describes the HIVE performs intermediate reduction approximations to identify the best satisficing results given the request. Furthermore, subject layer refinement reduction describes an Inventory Control system that uses reference subject matter data warehousing means to identify collections of words that are associated to the keywords given the request to help find contextually the optimal response."

U.S. Pat. No. 7,809,659 XCommerce: teaches "the Internet environment (U) can be construed as a complex and massive volume telecommunications network with billions of subscribers. The Search engine supercomputer analyzes information from the environment estimated to be billions of unique web pages, and then uses eigenvectors to determine the highest ranked pages from the end user's match criteria. As explained, in the doctoral dissertation Designing Hot Billing Systems for Large Volume and/or Complex Networks© 1999, hereinafter referred as dissertation, "As the size of the environment increases the level of redundancy and tax burden of a system exponentially increases"." For this reason, it will be object of this invention to eliminate the tax burden created by the environment.

The process of finding contextually the optimal response required data warehousing metadata as follows: (1) descriptive used for knowledge discovery, using title, author and keywords, (2) structural how subject matter layer of refinement maps a human knowledge profile comprising of hierarchical set of associative and transitive words that are related to a concept of idea using reference subject matter collections, (3) using the benefit of U.S. Pat. No. 8,868,535 analysis of search requests based on rank probabilities of resources, WebPages, and websites.

It is the object of the present invention to improve the accuracy of quality values $Q(w, x, y, z)$ filters as taught in U.S. Pat. No. 7,908,263, using deductive reasoning subject layer statistical samples [AX], [BX], [CX] and [DX] calculations to measure social media, trending and usage pattern of behavior dimensions metrics used for personalized searches.

Client/Server Supercomputer Enhancements

U.S. Pat. No. 7,908,263 introduces Cholti: A search engine optimizer that works independently and in parallel with a browser and search engine supercomputer to gather, analyze, and distill input information interactively. The optimizer reorganizes the input and providing an optimized version as an output. The optimized version of the input (e.g. output) is sent to the search engine, which responds to the end user with search results. The optimizer recognizes each request as a pattern and stores the pattern in an advanced Glyph format. This permits the optimizer to identify a left and right-side checkmate combination required to achieve certitude.

To those in the art Glyphs in view of the Cholti Mayan lingua franca hieroglyphics describes a precise way to communicate and story tell using linguistics and geospatial data absent of computers. It is the object of the present invention to add the Big Data Indexing, volume, velocity, value, variability attributes and the capacity to discover and replicate using multivariate analysis a virtual environment and metadata.

It is the object of the present invention given a search pattern to the add the new attributes, vim, vigor, variant (finding natural variant, probable, and plausible branching entities to the search that are offered as command instructions or are used to create the managerial hierarchical set of knowledge entities given a search pattern), and the 'Vueno, Vonito, and Varato' algorithm multivariate analysis approximation hierarchical dataset, when determining dynamically a personal input based on usage patterns of behavior.

U.S. Pat. No. 7,908,263 Cholti: further teaches based on U.S. Pat. No. 7,809,659 as follows: "1) Scrub, validate, verify, clean, standardize and organize the Internet environment by gathering, analyzing, distilling, managing, organizing and distributing the massive information using a parallel distributed managerial hierarchical supercomputer that removes redundancy, latency and the computational tax burden. To those in the art to scrub, validate, verify and clean the Internet environment describes to bring order to the Web upon removing duplicate, spam and viral content using the Site Rank probability and cherry picking the weighted modifier given the quality partition from 0 (viral) to 10 (la crème de la crème) of the website. To those in the art website describes an IP address, Site or group of resources within a domain of the Internet."

"2) Organizing the Environment: The information comprising the environment must be scrubbed, validated, verifies, standardized, primed, distributed, configured and stored. Cholti Search Engine Optimizer is the client side of the architecture and behaves in the same manner as traditional 'Boolean Algebra' browser that can interactively identify, validate and verify each end user regular expression. Then it categorizes keywords, clusters and geospatial keywords and assigns them to left or right side of the brain. The left side of the brain consists of the hierarchical three tiers that analyze, and statistically shrinks the valid size of the environment. The right side of the brain is the secondary method of shrinking the size of the environment by assisting the left side by weighting and distilling the multivariate hierarchical set with geospatial information."

"3) Preprocessing is done by the XCommerce Supercomputer that updates the content of the environment using the following configuration: MPS™ HQ manage Superset (i) where I=1 to 4, SIS™ HQ manage Set (i, j) where J=1 to 4, TWS™ HQ manage Subset (i, j, k) where K=1 to 16. XCommerce load balances and optimizes throughput and measures four subject layers samples the Ax, Bx, Cx, and Dx. The XCommerce Supercomputer continuously scans, gathers, distills, analyzes, primes and integrates in real time organizational data so that responses are synchronized with up to date information."

"4) Load Balancing Requests: based on the quantity and quality of the informational certainty the system must identify, scrub, validate and verify the top responses associated to an end user's request. XCommerce has evenly distributed its node configuration to perform the subject layer samples Ax, Bx, Cx, and Dx that are responsible for searching and responding optimal page results based on vector parameters. Mimicking the human brain each request is broken into keywords that associated to belong to either to the [L] left or [R] right side group. When the [L] left side group keywords consisting of at least one independent variable will always have an Anchor made up of a keyword or cluster. The system identifies an anchor keyword or cluster to create valuable common denominator environments that are used as valid point of reference when performing comparative analysis of a plurality of requests."

"5) XCommerce four subject layer samples: as all calculations are made to scrub, clean, validate, verify, organize, standardize a mirror image of the existing Internet environment. While performing this task the system correlates the content of each resource, paragraph, and page belonging to the same Site. The system primes each paragraph, and this is when confounding data is eliminated by supplying the missing gaps of information."

"A) (Ax or 'Before' analysis) sample: Ax represents traditional 'Boolean Algebra' or prior art means that are translated into Basic Glyphs. The requests are searched 'AS IS' using existing eigenvector methods for valorization means and the Ax response is used as the point of reference for further optimizations made by Bx, Cx, and Dx."

"B) (Bx 'After' analysis) sample: Bx represents the ability to reorganize requests and identify missing gaps of information that are converted and translated into Advanced Glyphs. Cholti identifies, validates and verifies the 'AS IS' query and rearranges each request. This method is the first step that filters and weights requests dynamically and identifies, quantifies and qualifies confounded 'Boolean Algebra' oversimplifications."

"C) (Cx 'Improved' analysis) sample: Cx represents the process of comparing, mapping, plotting and merging both Ax and Bx to a resultant probabilistic hierarchical set. Then Cholti gathers, distills and analyzes the Cx hierarchical set. During this process the best results of each subject layer are measured using the Hot & Cold Algorithm parameters to update the Super Site and Super Site objects and create a probabilistic distribution to yield the optimal result. Cholti identifies, validates and verifies the 'AS IS' query and reorganizes and prioritizes keywords. The Cx subject layer reduces the size of the environment between 1,024 and 10,000 result page W_Rank Basis. To those in the art 'AS IS' query describes as the end user types the input."

"D) (Dx 'Optimal' analysis) sample: Dx or W_RANK Bitmaps represents the final process of deciphering the optimal result that where derived from Cx hierarchical sets by weighting and valorize each page against Super Glyphs filters that take into account Page and Site Rank, Media Value, and transparency and/or content privacy. Dx mission is to reduce the size of the environment to the output dataset comprising 1024 result page W_Rank Basis."

"Cholti 'Cherry picks' the best results as information certitude improves proportionally as the size of the environment is reduced. Thus, when information certitude is reached, the size of the environment is set to 10 and thus when information certitude is achieved the environment size is the output displayed to the end user computer terminal, subscriber or smart device."

It is the object of the present invention to improve the quality of the [Ax], [Bx], [Cx], [Dx] and [Ex] subject layer samples using the 'Vueno, Vonito and Varato' algorithm to figure out a managerial hierarchical entity set given a search pattern using big data indexing metadata natural variants, positional, probable and plausible knowledge discovery. Updating the value of each resource after removing redundancy, irrelevancy and low-quality content using Page and Site Rank, and gain factoring la crème de la crème using Supersite and Industry fuzzy logic probabilities of each entity using weight, trending and personal value of each resource.

"6): Organizing the Internet Environment: A) For each cluster, associate clusters and Glyphs the system assigns an HQ1-HQ5 owner that controls the parallel running Internet environment. Each HQ0 is assigned a plurality of keywords. Each HQ1 is assigned all the single tiered clusters of its subordinates. Each HQ2 is assigned all the dual tier clusters of its subordinates. Each HQ3 is assigned half of triple tiered clusters or Basic Glyphs of its subordinates. Each HQ4 is assigned all the Advanced Glyphs of its subordinates. Each HQ5 is assigned all the Geodata of the environment. B) A Site based on a given extension such as ".com" is assigned to exactly one of the parallel running planes."

"C) A Site rank value is equal to the sum of its Top n W_Rank subordinates. Each Site is assumed to have Top 32 pages, even if most are null. The basis of each Site is equal Top 32 valid pages in its hierarchy from the perspective of a partial environment. The W_Rank Basis of each Page is equal to the Q(x) value. D) Sites with Q(x)>1 and valid Corporate ID are considered a Super Sites. Pages with Q(x)>1 and valid Corporate ID are considered a Super Pages. Each keyword, cluster, dual tiered cluster and Advanced Glyphs has a Q(x) value >1."

To those in the art a Site or a Website comprises a plurality of common denominator WebPages have the same IP Address, Website are ranked probabilistically from viral content or spam with P(x)=0.00, up to highest quality website P(x)=1.00. To those in the art each page is assigned to a parallel running quality partition if further described by U.S. Pat. No. 7,908,263 that teaches "Once the system filters out redundancy and each Page and each Site is given a Quality value Q(x), Cholti can awards to each valid page a W_Rank Basis from 0.001 to 10. Each page based on their page rank gets a W_Rank Basis as follows: 0=0.001, 1=0.01, 2=0.10, 3=0.25, 4=0.50, 5=1, 6=2, 7=4, 8=6, 9=8, and 10=10. When analyzing a given request Cholti may use other variables and mathematical filters to be able to shrink the environment."

U.S. Pat. No. 7,908,263 teaches "7) Restricting the Size of the Environment: Cholti is programmed to limit the size of the Internet environment between the Upper Limit of approximately 1 billion and Lower Limit of 1,024-page results compared to its existing size of approximately 30+ billion. The environment is subdivided parallel running planes that represent the different quality Q (x) of the sites from 0 to 10. Each Site also has a sub partition or Q (x, y) where y ranges from 1 to 100. Q (x, y, z) has a third dimension where z is the commercial value of the Keyword."

"Each site has a quality value or Q(x) that ranges from 0 to 10. Complex multinational corporate organizational hierarchies consist of a plurality of Super Sites that are linked together. Consequently, a Site is assigned a Corporate ID that contains all the valid ANI, address information, and organizational information."

To those in the art the system in order to remove irrelevancy uses the Site Rank probability that attenuates or gain factors webpages based on quality partition of parent website, using the W_RANK Basis modifier. To those in the art if the website belongs to a parallel running quality partition below 5, where the modifier is below 1, the modifier attenuates the original Page Rank score. Alternatively, if the website belongs to a parallel running quality partition above 6 where the modifier gain factors the original Page Rank score. The ability to attenuate or gain factor the original Page Rank score is based on the Site Rank score.

To those in the art, large scale massive portals or Supersite has a plurality of websites under their chain of command with a common denominator Corporate_ID. It is object of the present invention to remove irrelevancy using Supersite rank that attenuates or gain factors WebPages based on Supersite Rank probability of the parent website, using the W_RANK Basis modifier. To those in the art standalone website possess Supersite rank and Site rank with the same probability and thus have the same quality partition. To those in the art all the subordinate websites belonging to a Supersite portal, such as Amazon.com are deemed to be la crème de la crème or 10 in quality and are gained factor by 10 the highest available multiplier.

It is the object of the present invention, to use Page Rank, Site Rank and Supersite rank when performing the analysis of the content of each entity belonging to a managerial hierarchical set given a search pattern. Where Site Rank is used to remove duplicates, low quality, spam and viral content, and Supersite is used to find the best fit intellectual property and 'related-objects'.

U.S. Pat. No. 7,908,263 teaches: 8)Glyphs based Search: A) Each Site has a fingerprint or is associated to clusters, dual tiered clusters and Advanced Glyphs. B) The owner of each keyword, cluster, dual tiered cluster and Advanced Glyph keep tracts in memory the TOP n value based on the Q(x) value that is used as a filter. Then they forward chain the Q(x) value to the HQx owner of a request. Reasonable results are kept in memory and probable in memory. Alternatively (faster!) the 'Reorganized' results are kept in memory and the entire Bx 'After' step is skipped unless a given combination does not exist in memory or in a file.

"C) Each Super Site and Super Page are assigned to a keyword, 'Zero Clusters', cluster, dual tiered clusters and Advanced Glyph when they belong to the estimated TOP 1,000,000 W_Rank Basis. This additional dimension or W is an extension to the Q(x, y, z) that can be used to further expedite searches."

To those in the art keyword, Super Site and Super Page belonging [BX] sample are used to discover the 1st set of associative entities with an above average relevancy probability.

U.S. Pat. No. 7,908,263 teaches: "D) Superset (i) search limits range from 16,384 to 131,072, Set (i, j) search limits range from 8,192 to 65536, and Subset (i, j, k) search limits range from 4,096 to 32,768 net result pages or W_Rank Basis."

To those in the art keyword, Super Site and Super Page belonging [CX] sample are used to discover the $2^{nd}$ set of associative entities with a high relevancy probability.

To those in the art keyword, Super Site and Super Page belonging [DX] sample are used to discover the $3^{rd}$ set of associative entities with a highest relevancy probability.

To those in the art keyword, Super Site and Super Page belonging [EX] sample are used to discover the nth set of associative entities with an optimal relevancy probability.

To those in the art Simple Layer of refinement collections of words describes 1st set of associative entities with an above average relevancy probability and Hybrid Layer of refinement collections of words describes $2^{nd}$ set of associative entities with an high relevancy probability, and Complex Layer of refinement collections of words describes $3^{rd}$ set of associative entities with an highest relevancy probability and Optimal Layer of refinement collections of words describes nth set of associative entities with an optimal relevancy probability.

U.S. Pat. No. 7,908,263 teaches: "E) Based on the quality of the Geodata Cholti assigns filtering values as follows: 1) Geodata (n, 0, 0, 0), multiplier=0.7, 2) Geodata (n, n, 0, 0) multiplier=0.5, 3) (Geodata (n, n, n, 0) or Geodata (n, n, 0, n)) multiplier=0.35 and 4) Geodata (n, n, n, n) multiplier=0.25. The Geodata value helps to weight each page and derive the optimal size environment. F) When the Corporate ID is valid then multiplier=0.25. The Q(x, y) is used to prorate. Each Page also has a sub partition or Q(x, y)."

U.S. Pat. No. 7,908,263 teaches: "G) The request HQ owner must determine the search parameter when filtering. The upper limit is always set to equal the highest Q(x) value. The lowest limit is calculated by estimating the size of the environment compared to the filter value multiplier. Q(x) total equals the summation of Q(x) from 10 to 2. Should Q(x) total value be less than the lower limit then Q(x) Total=lower limit. Example: The system determines via the Ax Before calculation that "American Civil War" has approximately 80,000,000-page results. In this case only a Superset (i) exists. The system is interested in restricting the search that is within the request limit. The valid limits are from 16,384 to 131,072 W_Rank Basis, since no Corporate ID is known or Geodata is available. To shrink the environment Q (x, y, z) is used."

U.S. Pat. No. 7,908,263 teaches: "The system identifies the number of valid results based on the Q(x) values starting from 10 to 2. Initializing the Q(x) valid counter to zero, it begins to add Q(x) until the valid counter is greater than the upper limit and does not exceed it lower limit. Should it exceed the limit it must prorate using Q(x, y) values."

"9) Hot Algorithm or Cx Optimizations: Once Cholti knows what is hot it can be measure the weight of Super Pages and Super Sites. The notion of static values for combinations of keyword is relegated to the process of shrinking the size of the environment, and dynamic values to the deciphering process of selecting the best solution. The Hot Algorithm assigns to each keyword three components (x, y, z). x measures the trending multiplier based on the end user's pattern with regards using a keyword. y represents the relative strength of a keyword in belonging to the Advanced Glyph domain hierarchy such as Superset (i), Set (i, j) and Subset (i, j, k). z determines the probability the Keyword is necessary to reach the optimal W_Rank."

To those in the art the Hot Algorithm assigns to each keyword belonging to the set of associative entities component (x, y, z) to determine the probability of being necessary to reach the optimal response. It is the object of the present invention offer the highest probability associative entities as command instruction or alternative queries to a search.

U.S. Pat. No. 7,908,263 teaches: "10) Cold Algorithm or Dx Optimizations: Once the Hot Algorithm has successfully helped value each site and page during the 'Improved' or Cx sample, by measuring patterns of behaviors of the end user's requests within a session. The Cold Algorithm assigns to each keyword four components (w, x, y, z) values. w measures the probability the word is required for the search. x measures the likelihood the keyword or a 'Zero Cluster' validates a W_Rank. y quantifies geospatial dimensions based on Geodata (w, x, y, z). z modifies Super Glyphs based on how Cholti measures the corporate dimensions of a request. y and z serve as a geospatial and corporate information filters to further reduce the size of the environment by assigning filter value from 0.01 to 1.00. Cholti never assigns a value of 0 since results are weighted down but never eliminated."

To those in the art the Cold Algorithm assigns to each keyword belonging to the set of associative entities component (w, x, y, z) to determine the probability of not being necessary to reach the optimal response. It is the object of the present invention not to offer the lowest probability associative entities as command instruction or alternative queries to a search.

U.S. Pat. No. 8,386,456 Codex Search Patterns teaches "1) an interface product that works independently and in parallel with a browser client and search engine supercomputer server architecture that gathers, analyzes and distills input information interactively. The browser client analyses the end user's input and converts it into a search pattern. For each valid search pattern, the Codex continuously maintains and updates a pre calculated and preprocessed array or collection of best-fit web page responses. The Codex simultaneously keeps in existence for each search pattern its corresponding virtual simulation environment that contains all relevant bound web pages. Each virtual simulated environment possesses a relative Master Index. The Codex continuously purifies and synchronizes the plurality of relative Master Index that permits to match/merge and then correlates the Internet's Master Index in real time. To those in the art the Master Index comprises all the resources of the Internet and a relative Master Index comprises all the resources of the Internet given a search pattern."

"2) The Codex continuously scans and detects the environment in real time for new content with significant difference quality to update each search pattern's virtual environment partition relative Master Index, top (n) pages and inventory of 'related objects' and relevant words. The Optimizer heuristically reads the content by page, paragraph, sentence, and grouping of words for each web page. Existing Master Index has an absolute rank value for each web page. The Optimizer rank value is dynamically adjusted by matching independent variables and related keywords belonging to the search pattern to generate a content value. The Optimizer "cherry picks" the best content value web pages as output. The output is displayed to the user."

"3) The Optimizer converts requests into ideas by eliminating Search Engines dependency on "Boolean algebra" using Caesar's "divide and conquer" approach that limits reaching the top results. In contrast, the Optimizer using 'deductive reasoning' interprets keyword combinations as being part of an idea being formulated by both the left and the right sides of the brain. When a request is incomplete the Optimizer probabilistically supplies and inserts missing gaps of information. The dissertation teaches that a Vector CDR can be expressed as the summation of a plurality of valid vectors. The Optimizer matches/merges a plurality of partial vectors and then correlates them to create a resultant vector containing a collection of top (n) web pages possessing informational certitude."

"4) The Codex uses Triangulation Deductive Reasoning to convert the end user's typed keywords into a meaningful idea, insert missing gaps of information, perform the steps of: 1) Association, 2) Relevancy and 3) Likelihood to create an optimal environment express in hundreds of web pages and finally 4) 'Cherry Pick', by physically read the content of each web page and then perform probabilistically vector weight comparisons to identify the best response."

"5) The Codex computer network minimizes bandwidth usage by performing scheduled and synchronized calculations and updates throughout the network. This allows the Supercomputer to accurately project future resource requirement trends in order to update end user's software to avoid system congestion. Each Summit Tier functions are provided to update all the components by sending only summarized information packets to its organizational subordinates."

"6) The Codex partitions the overall supercomputer cluster or superset into sets clusters. Sets are partitioned into subsets clusters and are partitioned into elements clusters comprising several nodes. The superset, set, subset and element clusters are placed in a distributed geographic managerial hierarchical manner to handle tasks efficiently and effectively."

U.S. Pat. No. 8,386,456 Codex Search Patterns: definitions:

"HIVE" is a managerial hierarchical structure refers to a decentralized parallel clustered large-scale supercomputer consisting of a plurality of nodes that are specifically arranged in tiers.

Search Pattern is the conversion of at least one (1) relevant keyword and cluster to independent variables.

Browser are software that receives human input and sends the input as request message to a search engine, that in turn process the request, and forward chains the output response to the end user's terminal that is displayed as text, audio or video form. To those in the art the Browser uses its own dictionary database to identify and weight each word to avoid system congestion, by sending too many irrelevant requests to the system. To those in the art the Browser uses its own dictionary database to identify and weight each 'CORE List' Superset (i) and Set (i, j) comprising the most frequently used regular expressions to avoid system congestion, sending too many irrelevant request to the system.

To those in the art upon the end user speaking or typing interactively the first each valid word or idea search pattern Superset (i) and Set (i, j) uses its own Glyph database with a statistical and vector component and establishing a hierarchical for each of the word in the word database and glyph database.

To those in the art the Browser uses its own commercial word database and adds the end user geospatial information to identify and weight each 'CORE List' smart input Subset (i, j, k) comprising the most frequently used regular expressions to avoid system congestion, sending too many irrelevant request to the system.

Glyph is a database object that represents a keyword and cluster that stores all the static "HIVE" global variables.

Super Glyph is a dynamically statistical database object for each Glyph with personalized and dynamic statistics of the analysis of the end user's interactions.

To those in the relative Master Index comprises performing subject matters layers of index refinement given a search pattern until identifying la crème de la crème.

Triangulation Deductive Reasoning or TDR: The methodical analysis and rearranging of end user's keyword, adding missing gaps of information, and by inserting and expanding available keywords used in a session to find the final destination. Determining the best fit independent variables that best represents the smallest identifiable partition of the Internet and then transforming the valid content of each Site and web page into dynamical statistical database objects. Valorizing the top dynamical statistical database objects to find and determine by using association, likelihood and relevancy guidelines additional independent variables that are used to distill and sub divided in real time the visible environment to a session.

Codex is a massive book supercomputer that stores the billions of common denominator search patterns possessing a Super Glyph equation to derive optimal responses for static requests, and optimal sized environments for dynamic and personalized sessions consisting of two (2) or more consecutive requests.

Mass represents the overall net quality of a Search ranging from lowest to highest as follows:
  A) Massless very vague with the lowest rate of accuracy, and the response has $(2^{30})$ or one billion web pages.
  B) Lowest Mass searches have at least one independent variable with a low rate of accuracy, and the response has $(2^{20})$ or one million web pages.
  C) Average Mass searches have at least 2 independent variables with an average rate of accuracy, and the response has $(2^{10})$ or one thousand web pages.
  D) High Mass searches are targeted with at least 3 independent variables with a highest rate of accuracy, and the response has $(2^{7})$ or one hundred web pages.
  E) Highest Mass searches are deciphered with at least 4 independent variables with certitude, and the response has $(2^{0})$ or one web page.

Significant Levels of Difference are representation of the total number of relevant independent variables are available given a Codex Page after analysis of end user's keywords and clusters and then finding additional independent variables through means of deductive reasoning. End user's sessions are capped at 4 independent variables, to achieve higher levels resource intensive data mining triggered by analysis of the correlated lowest identifiable common denominator environment.

Zero Significant Difference: (U) the environment is massless, (X) is greater than 200 and the number of web pages is: $(X!-(X-6)!)/6!$ First Significant Difference: (FSD) the environment Mass is between 1 and 3, (X) ranges from 120 to 60 and the number of web pages is: $(X!-(X-5)!)/5!$ Second Significant Difference: (SSD) the environment Mass is between 3 and 5, (X) ranges from 60 to 40 and the number of web pages is: $(X!-(X-4)!)/4!$ Third Significant Difference: (TSD) the environment mass is between 5 and 6, (X) ranges from 40 to 30 and the number of web pages is: $(X!-(X-3)!)/3!$ Fourth Significant Difference: (QSD) the environment mass is between 6 and 6.5, (X) ranges from 30 to 25 and the number of web pages is: $(X!-(X-2)!)/2!$ Fifth Significant Difference: (PSD) the environment mass is between 6.5 and 6.95, (X) ranges from 25 to 15 and the number of web pages is: $(X!-(X-1)!)/1!$ Sixth Significant Difference: (HSD) the environment Mass is 7, and thus optimal and (X)=10 is $(X!-(X-0)!)/0!$ or 1 web page.

[R] or Right Brain Conversions Right Brain environmental independent variables are expressed as (X), (Y), and (Z), which are replaced with Quad, Pentane, and Hexane samples.

Partitioning the Environment

Internet (U) comprises an environment of 20 billion+ web pages.

Block, Sub Block and Mini Block: Block: Is a common denominator environment that is based on at least one (1) search pattern. Each Block can be further subdivided into a Sub Block provided at least one (1) relevant search pattern exists. Each Sub Block can be further subdivided into a Mini Block provided at least one (1) relevant search pattern exists.

Element: An Element is the smallest identifiable partition of the Internet that the "HIVE" optimally derived from correlating, data mining and valorizing the top results. Once the lowest subdivision of the Internet is found using Search Patterns and keyword combinations, a unique Codex Page is created, otherwise a Codex Page already exists with its corresponding W_RANK Bitmap collection of top (n) pages results.

Super Site is a database object converts each web page belonging to the lowest sub division of the Internet, after match/merging and then correlating all visible web pages belonging to an Internet Site, and then adds statistical characteristics that are used for deductive reasoning analysis of at least one (1) request belonging to a session.

Super Page is a database object that consists of each web page belonging to the lowest possible attainable sub division of the Internet, after all the relevant and visible Super Sites have been identified, and then adds statistical characteristics that are used for deductive reasoning analysis of least at 1 request belonging to a session.

Evolution of the Keyword

The environment contains a list of linguistic and geospatial keywords and clusters and then the "HIVE" converts the keywords into Glyph dynamic statistical objects.

Association

1) Using the rules of association each independent Glyph is associated to a category, e.g. person, historical event, product or related object.

Relevance and Likelihood

2) Using the rules relevance and 3) using rules of likelihood of each Glyph to the best valued categories permits the "HIVE" to correlate linguistic and geospatial related categories to expand the number of independent variables. When a Left Brain and Right Brain category are merged as one variable, they become an Event. Once at least one (1) Event is found they become the primary and most significant Managerial Hierarchical Relationship Indices belonging to a best-fit search pattern.

Mimicking the Brain

A language based expert system method that mimics the brain to decipher at least one (1) end user's final destination by continuously at least one browser request by arranging keywords into Left Brain linguistic and Right Brain geospatial objects that helps create an optimal relationship index that partitions the environment by determining the best fit search pattern that is stored in a Codex that dynamically analyzes, valorizes, quantifies, qualifies, reorganizes, reformulates and interprets end user's intentions to identify the best way to find the final destination of a session.

Deciphering

The force behind the process of deciphering with certainty the best response is the "HIVE" ability to measure the available inventory contained in the smallest identifiable partition of the environment by using logic to make web pages from irrelevant to relevant, by using resource management that weights the quality and probability value that best matches the best fit search pattern, and then reads, locates and selects the highest level of satisfaction content.

The "HIVE" uses a method of 'deductive reasoning' that takes the smallest identifiable partition environment derived from the best fit search pattern identify the highest number of independent variables that serve as a common denominator that describes the end user's intentions as follows:

Hot and Cold Analysis

First: Using the hot and cold trending valuation of each keyword belonging to at least one request in a session. For each request a search pattern is assigned that contains a managerial hierarchical relation index that corresponds to a stored Codex page that is a search pattern to make the first subdivision of the environment.

The "HIVE" measures the quality of the search pattern and checks in its inventory to determine if the optimal response is readily available. When the optimal response is readily available it immediately sends the top (n) responses to the end user, avoiding any search. The top (n) responses are contained in a preprocessed and pre-calculated W_RANK Bitmap belonging to the Codex encyclopedia inventory control database requiring no further calculation.

Association Using Set Theory

Second: After each request the "HIVE" qualifies each keyword and reevaluates what is the newly derived best-fit search pattern. The keywords are transformed into Glyphs that possesses linguistic, geospatial and statistical dimensions that help emphasize what is valid. The "HIVE" inserts missing gaps of information and uses rules of association using fuzzy logic properties of membership using set theory to assign to each Glyph category characteristics.

Once the most probable categories are known the "HIVE" adds a collection of probable keywords to help in performs the 2nd subdivision of the environment and checks in its inventory to determine if the optimal response is available to immediately send the top (n) responses to the end user. Block partitions have millions of valid web pages.

Relevancy Analysis

Third: The "HIVE" adds the most relevant collection of Super Glyphs and then applies likely and unlikely analysis based on the best category characteristics to correlate the top information and determines if 2 categories can be match/merged into 1 event, which in turn expands the number of independent variables.

Once an event is found using the relevancy analysis the "HIVE" performs the 3rd subdivision of the environment and checks in its inventory to determine if the optimal response is readily available, and immediately send the top (n) responses to the end user. Sub Block partitions have thousands of valid web pages.

Likely and Unlikely Analysis

Fourth: The "HIVE" adds the most relevant collection of Glyphs and then applies likelihood analysis based on the best category characteristics to correlate the top information and then determines if 2 categories can be match/merged into 1 event, which in turn expands the number of independent variables.

Once an event is found using the likelihood analysis the "HIVE" performs the final subdivision of the environment and checks in its inventory to determine if the optimal response is readily available, and then immediately send the top (n) responses to the end user. Mini Block partitions have hundreds of valid web pages. To those in the are the final subdivision using the benefit U.S. Pat. No. 8,676,667 describes to the nth subdivision as in continuously.

"Cherry Picking" Optimal Content Value

The "HIVE" confirms with the skeptic approach "Seeing is believing" to verify the best responses, and 'Cherry Picks' the top content value results are sent to the end user's browser. The Element partition has tens of web pages.

U.S. Pat. No. 8,868,535, issued to Paiz, Oct. 21, 2014, Search Engine Optimizer: teaches 1. A method of executing a word search on a computer with a software program to buffer between an Internet browser and a search engine to interpret numerical and text data and convert the interpreted data into a search pattern, wherein software program establishes a search pattern database, via a server which a set of software instructions and upon finding a match sends the output in response to the end user valid request, the methods comprising the steps of:
   a. assigning a unique value from lowest to highest to each site and web page;
   b. establishing a pattern database means with a collection of all hierarchical index relationships wherein pattern database executes software instructions employing set theory constructs to process the impact of each exact search pattern to create a probabilistic spatial environment and selecting as output the highest valued web pages;
   c. establishing a glyph database means with a collection of all keywords and clusters based on language; wherein glyph database executes software instructions to interpret numerical and text data and convert the interpreted data into an exact search pattern;
   d. executing a set of software instructions to search the pattern database in order to identify said exact search pattern, via a server which executes a set of software instructions and upon finding an match automatically sending the preprocessed calculated results to the end user's browser as output.

U.S. Pat. No. 8,868,535 Search Engine Optimizer: further teaches 2.
   a. assigning a probabilistic value from lowest to highest to each site and web page;
   c. organizing the Internet into a hierarchical set, using the pattern database, executing informatics constructs to create super blocks based on language;
   d. wherein applying fuzzy set theory constructs to partition each super block into blocks using primary index relationships and each block into sub blocks using secondary index relationships and each sub block into mini blocks using tertiary index relationships; and probabilistically filtering relevant pages using index relationships;
   e. indexing an improved environment of each partition of said hierarchical set based on the probable value of each web page and then selecting as output the highest valued web pages;
   g. correlating a plurality of probabilistic spatial environments based on said probable search pattern, and executing a set of software instructions to search the pattern database in order to identify said probable search pattern, and upon finding a match, performing a cherry picking process by reading, parsing, and analyzing in behalf of the end user word by word each sentence and web page to create the best answer and then sending the preprocessed said best answer to the end user's browser as output.

U.S. Pat. No. 8,868,535 Search Engine Optimizer: teaches
   6. The method of claim 5, comprising an additional step of identifying key words and clusters that confound and restrict the search as zero cluster glyphs.
   7. The method of claim 6, comprising an additional step of assigning a vector magnitude to each statistical glyph object based on frequency of occurrence from lowest to highest.
   8. The method of claim 7, comprising the additional step of defining a series of environment domains; and applying site quality filters to select the highest valued site and pages within each environment domain of the series of environment domains.
   9. The method of claim 8, comprising an additional step of mapping each search pattern into a managerial hierarchical set.

To those in the art Site Rank describes a probabilistic value from lowest to highest to each site, where Site Rank is used to attenuate irrelevant webpages, and during the selection of the best answer gain factor the Page Rank™ probabilistic value to each webpage.

U.S. Pat. No. 8,868,535, issued to Paiz, Oct. 21, 2014, Search Engine Optimizer: teaches:
   12. The method of claim 11, comprising an additional step of maximizing and minimizing said dynamic session glyphs values based on end user usage patterns of behavior.
   13. The method of claim 12, comprising an additional step of solving for missing gaps of information that improve the session.

Combining U.S. Pat. No. 8,868,535 Search Engine Optimizer independent claims 1, 2, and dependent claims 12 and 13 performing a set of reduction approximations maximize and minimize the Page Rank™ probabilistic value to each webpage using usage patterns of behavior and upon solving for missing gaps of information to identify la crème de la crème.

U.S. Pat. No. 8,868,535, issued to Paiz, Oct. 21, 2014, Search Engine Optimizer: teaches:
   30. The method of claim 29, comprising an additional step of using valid super glyph parameters to identify a valid optimal search within the search pattern database in order to expand the glyph equation. 31. The method of claim 30, comprising an additional step of using valid super glyph parameters to identify an answer search within the search pattern database and then sending the preprocessed top pages as output.
   32. The method of claim 31, comprising an additional step of updating existing search patterns at incipiency as web crawlers detect significant difference changes in the environment and the updating with the latest information each managerial hierarchical set and the corresponding partial master indices of the chain of command in real time.

To those in the art subject matter layers of index refinement describe how to expand the end user's search pattern using human knowledge, wisdom and understanding to take into account trending and commercial value of each associative and transitive word related to the end user's search pattern and then using super glyph weighted parameters to identify la crème de la crème, and also modifying partial master indexes of the entire chain of command of the human knowledge encyclopedia at incipiency as web crawlers continuously iterate and navigate webpages, sites and supersites to detect significant difference changes in the Internet.

U.S. Pat. Nos. 8,977,621 and 9,3552,355 define the Evolving System as follows:

In a nutshell, existing Boolean algebra search engines uses inductive reasoning page rank probabilities for finding the best results, whereas the HIVE solves for the optimal answer uses deductive reasoning subject matter subject layers approximations to decipher the content of each page to find the best results. To those in the are the subject layers approximations uses intermediate reduction site rank and supersite rank probabilities to remove irrelevancy.

Internet environment must be continuously organized and updated by the HIVE supercomputer. The Optimizer system is the client side of the architecture and behaves in the same manner as traditional browser that can identify interactive input and upon detecting a new keyword or term cluster which is immediately displayed on the end user's browser. Then it maps and plots keywords and assigns them to [L] left or [R] right side of the brain.

The [L] left side of the brain consists of a managerial hierarchical relationship dataset, which is used to statistically shrink the environment. The [R] right side of the brain is the secondary method of shrinking the environment by using geospatial information.

[Ax] Before: The Optimizer system continuously scans and gathers the browser's interactive input, and breaks the input into keywords and optimally into term clusters that are then arranged in a managerial hierarchical manner upon identify the independent variables within a request that will be used to create a search pattern request that is sent to the search engine. To those in the art the [Ax] search pattern request is sent to the search engine and maps a searchable environment of Zero significant Event in other words it is what it with no independent variables as follows:

a. Mass=0 (Logic_305_Basis=1 trillion) or 305!–(305–6)!/6!
  b. Mass=1 (Logic_100_Basis=1,192,052,400) or 100!–(100–6)!/6!
  c. Mass=2 (Logic_70_Basis=131,115,985) or 70!–(70–6)!/6!
  d. Mass=3 (Logic_50_Basis=15,890,700) or 50!–(50–6)!/6!
  e. Mass=4 (Logic_40_Basis=3,838,380) or 40!–(40–6)!/6!
  f. Mass=5 (Logic_30_Basis=593,775) or 30!–(30–6)!/6!
  g. Mass=6 (Logic_20_Basis=38,760) or 20!–(20–6)!/6!
  h. Mass=7 (Logic_15_Basis=5,005) or 15!–(15–6)!/6!
  i. Mass=8 (Logic_6_Basis=1) or final destination as per the random surfing the web model.

[Bx] Present: The Optimizer system now scans the Top Results, and analyzes each page to find key featured associations and the best fit paragraph content and dynamically calculates, prioritizes, arranges and find missing gaps of information to create an improved [Bx] search pattern request. To those in the art the [Bx] search pattern request using search engine maps an improved environment of First significant Event using Site Rank probabilities to remove duplicate, spam and viral content as taught in U.S. Pat. Nos. 8,977,621 and 9,355,352 the searchable environment (a, b, c, d, e, f) becomes (FSE, b, c, d, e, f) with 1 independent variable as follows:

a. Mass=0 upon having a valid REGEX use Mass=1 to 8
  b. Mass=1 (Logic_100_IV_1 or 75,287,520) or (99!–94!)/5!
  c. Mass=2 (Logic_70_IV_1 or 11,238,513) or (69!–64!)/5!
  d. Mass=3 (Logic_50_IV_1 or 1,906,884) or (49!–44!)/5!
  e. Mass=4 (Logic_40_IV_1 or 575,757) or (39!–34!)/5!
  f. Mass=S (Logic_30_IV_1 or 118,775) or (29!–24!)/5!
  g. Mass=6 (Logic_20_IV_1 or 11,628) or (19!–14!)/5!
  h. Mass=7 (Logic_15_IV_1 or 2,002) or (14!–9!)/5!
  i. Mass=8 is when input automatically maps the destination.

[Bx] Present: To those in the art the [Bx] search pattern request using big data indexing maps an improved environment of 2nd significant difference event using human knowledge fuzzy logic memberships to identify a 1st set of key featured associations that becomes the 2nd independent variable as taught in U.S. Pat. Nos. 8,977,621 and 9,355,352 the searchable environment (a, b, c, d, e, f) becomes (FSE, SSE, c, d, e, f) with 2 independent variables as follows:

a. Mass=0 upon having a valid REGEX use Mass=1 to 8
  b. Mass=1 (Logic_100_IV_2 or 3,612,280) or (98!–94!)/4!
  c. Mass=2 (Logic_70_IV_2 or 814,385) or (68!–64!)/4!
  d. Mass=3 (Logic_50_IV_2 or 194,580) or (48!–44!)/4!
  e. Mass=4 (Logic_40_IV_2 or 73,815) or (38!–34!)/4!
  f. Mass=5 (Logic_30_IV_2 or 20,475) or (28!–24!)/4!
  g. Mass=6 (Logic_20_IV_2 or 3,060) or (18!–14!)/4!
  h. Mass=7 (Logic_15_IV_2 or 715 or (13!–9!)/4!
  i. Mass=8 is when input automatically maps the destination.

[Bx] Present: Using the benefit of Ser. Nos. 16/129,784 and 17/129,784 teaches the first multivariate Big Data improvement of how to remove irrelevancy using two probability ranking values. To those in the art Page Rank ranking is a mandatory in order to be able bring order to the web comprising billions of documents. Unfortunately, Page Rank was never designed to remove duplicates, spam and viral content beyond the scope of a webpage or document, whereas Site Rank remove duplicates, spam and viral content for each website.

[Cx] After: is a post factum analysis performed by big data indexing, to map a 3rd significant difference event environment using human wisdom fuzzy logic to find a 2nd set of key features associations. Thus, [Ax] is before, [Bx] is present, and [Cx] is after interactive input to solves for the top results. To those in the art the 2nd set of key feature association becomes the 3rd independent variable as taught in U.S. Pat. Nos. 8,977,621 and 9,355,352 the searchable environment (a, b, c, d, e, f) becomes (FSE, SSE, TSE, d, e, f) with 3 independent variables as follows:

a. Mass=0 upon having a valid REGEX use Mass=1 to 8
  b. Mass=1 (Logic_100_IV_3 or 147,440) or (97!–94!)/3!
  c. Mass=2 (Logic_70_IV_3 or 47,905) or (67!–64!)/3!
  d. Mass=3 (Logic_50_IV_3 or 16,215) or (47!–44!)/3!
  e. Mass=4 (Logic_40_IV_3 or 7,770) or (37!–34!)/3!
  f. Mass=5 (Logic_30_IV_3 or 2,925) or (27!–24!)/3!
  g. Mass=6 (Logic_20_IV_3 or 680) or (17!–14!)/3!
  h. Mass=7 (Logic_15_IV_3 or 220 or (12!–9!)/3!
  i. Mass=8 is when input automatically maps the destination.

[Cx] After: Using the benefit of Ser. Nos. 16/129,784 and 17/129,784 teaches the second multivariate big data indexing remove irrelevancy using three probability ranking values. To those in the art Page Rank ranking is a mandatory to bring order to the web comprising billions of documents. Unfortunately, Page Rank was never designed to remove duplicates, spam and viral content beyond the scope of a webpage, whereas Supersite Rank probability remove duplicates, spam and viral content for a plurality of websites having the same corporate ID. The evolving system uses fuzzy logic rules to determine distinct single version of the truth optimal webpage using big data relationships to map an optimal document. As changes in the environment occur given a web design architecture to maximize the value of a supersite, the evolving system, upon determining significant change, can reassign the optimal documents.

The evolving system using fuzzy logic based on human understanding detects GPS information and commercial keywords to generate smart input. [Cx] After: uses geospatial dimensions such as Country, Region, LATA, Zip Code, IP Address and ANI as the fourth independent variable. [Cx] After: upon applying supersite ranking probabilities as taught in U.S. Pat. Nos. 8,977,621 and 9,355,352 the searchable environment (a, b, c, d, e, f) becomes (FSE, SSE, TSE, QSE, e, f) with 4 independent variables as follows:

a. Mass=0 upon having a valid REGEX use Mass=1 to 8
  b. Mass=1 (Logic_100_IV_2 or 3,612,280) or (98!–94!)/4!
  c. Mass=2 (Logic_70_IV_2 or 814,385) or (68!–64!)/4!
  d. Mass=3 (Logic_50_IV_2 or 194,580) or (48!–44!)/4!
  e. Mass=4 (Logic_40_IV_2 or 73,815) or (38!–34!)/4!

f. Mass=5 (Logic_30_IV_2 or 20,475) or (28!−24!)/4!
g. Mass=6 (Logic_20_IV_2 or 3,060) or (18!−14!)/4!
h. Mass=7 (Logic_15_IV_2 or 715 or (13!−9!)/4!
i. Mass=8 is when input automatically maps the destination.

[Dx] Optimal: Using the benefit of Ser. Nos. 16/129,784 and 17/129,784 teaches the four multivariate Big Data improvement of how to remove irrelevancy using four probability ranking values. The evolving system using human understanding, in view of the end user's historical profile and weighting supersite using the Industry_ID quality partition. E.g. Miami Dolphins, and the Dallas Cowboys, belong to the same Industry_ID, which represents all the teams in the NFL. [Dx] optimal: upon grouping supersite ranking probabilities given an common denominator Industry_ID can eliminate confounding elements of the search using end user historical profile values to weight keywords and concepts based on usage patterns of behavior becomes the fifth independent variable as taught in U.S. Pat. Nos. 8,977,621 and 9,355,352 the searchable environment (a, b, c, d, e, f) becomes (FSE, SSE, TSE, QSE, PSE, f) with 5 independent variables as follows:

a. Mass=O upon having a valid REGEX use Mass=1 to 8
b. Mass=1 (Logic_100_IV_5 or 95) or (95!−94!)/1!
c. Mass=2 (Logic_70_IV_5 or 65) or (65!−64!)/1!
d. Mass=3 (Logic_50_IV_5 or 45) or (45!−44!)/1!
e. Mass=4 (Logic_40_IV_5 or 35) or (35!−34!)/1!
f. Mass=5 (Logic_30_IV_5 or 25) or (25!−24!)/1!
g. Mass=6 (Logic_20_IV_5 or 15) or (15!−14!)/1!
h. Mass=7 (Logic_15_IV_5 or 10 or (10!−9!)/1!
i. Mass=8 is when input automatically maps the destination.

As taught in U.S. Pat. No. 8,977,621 As used herein, the term "module" is intended to include one or more computers configured to execute one or more software programs configured to perform one or more functions. As used herein, the term "computer" is intended to include any data processing device, such as a desktop computer, a laptop computer, a mainframe computer, a parallel cluster supercomputer, a server, a hand held device, or any such device able to process data. The components of the Search Engine Optimizer system represent computer hardware and/or computer-implemented software configured to perform the function described in detail within below. The components of the Search Engine Optimizer system may be implemented on one or more communicatively connected computers. The term "communicatively connected" is intended to include, but is not limited to, any type of connection, whether wired or wireless, in which data may be communicated, including, for example, a connection between devices and/or programs within a single computer or between devices and/or programs on separate computers.

As used herein, the term "inductive reasoning" Search Engine is intended to include any search engine supercomputer that ranks and measure the popularity score of each Site and Page belonging to Internet and performs "static searches" while users randomly surf the web. As used herein, the term "static search" is intended to include a single search, whereas the term "dynamic search" comprises one or more searches belonging to a session. "Static searches" use Glyphs, and "Dynamic Searches" use Super Glyphs. The term "Glyph" comprises the statistical vector components of a valid keyword and/or clusters that are used to identify relevant pages. The term cluster is a combination of two or more words that placed in an exact order have a significant meaning E g "American", "Of", "States" and "United" is best known for the cluster "United States of America". The term "Super Glyph" is applied to Glyphs that are gain factored when using the Hot/Cold, Likelihood and Relevancy analyses of the incorporated references.

As used herein, the term "deductive reasoning" Search Engine is a method for simulating the entire potential valid interactive input regular expressions construed during an Internet browser search, converting the results sets into Environmental Summary reports object that enables efficient and accurate searching. Furthermore, uses index relationships to eliminate pages from the search process, and dependent and complement variable to gain factors relevancy. Finally, mimicking the Human Brain, linguistic Glyphs are assigned to the [L] left side and geospatial Glyphs are assigned to the [R] right side of the brain and the Anchor is the best common denominator Glyph that is used as the primary index relationship.

The Optimizer is communicatively connected to a Browser by users while they are performing a web search. The artificial intelligence scans, distills and converts interactive input into keywords and term clusters that are then transformed into vector Glyphs. The Optimizer then arranges, analyzes, and prioritizes Glyphs into a managerial hierarchical relationship, and uses Hot/Cold, Likelihood and Relevancy analyses to create a mathematical equation that optimally shrinks the environment. Then reads and measures each page and then gain factors matches of the search pattern and key featured associations by document, paragraph and sentence to figure out the final weighted value. Finally, the Optimizer, Cherry Picks the highest final weighted value pages belonging to the optimal dataset or output that is display to the user.

The Shopping Cart System is communicatively connected to a Browser and interactively facilitates a list of assisted input command instructions with valid keywords and term clusters that simplifies building a purchase of merchandise search and can serves as a bona fide spellchecker when encountering a misspelled word within the input.

In operation of the search engine Optimizer system, a user at the terminal may input a search request using the browser. The search request consists of interactive input, selected or copied from existing document by the user assisted input. Having received the search request from the browser, the terminal may communicate with the Search Engine system via the Internet to search using the Optimizer system in accordance with the search request. For example, for each search request, the artificial intelligence software create a mathematical equation using a managerial hierarchical index relationship that optimally shrinks the environment. Allowing the Optimizer to search the databases via the data network and retrieve search results. The software analyzes the search results obtained from search engine and "Cherry Picks" the best responses. The output display is a formatted object that may be a graphical representation of the search request that is capable of being adjusted and modified by a user. The search engine Optimizer system then display the output to the end user computer terminal or smart device.

For example, for each search request, the Shopping Cart subsystem identifies assisted input that in turn is converted into a mathematical equation that optimally shrinks the environment. The Human Brain Module creates the managerial index relationship that allows the search engine Optimizer system to search the databases via the data network and retrieve search results. The Sale Module analyzes the search results obtained from the search engine and finds the optimal dataset. The Sales Module performs financial transactions if applicable.

The search engine Optimizer system may also provide suggestions assisted input and smart input command instructions to the user to refine the dataset. For example, the search engine Optimizer system performs data mining to analyze the search results and then using smart input GPS coordinates to interact with the user to obtain command instructions that eliminates confounding variables to create an optimal dataset and the corresponding statistical information is the output object that is displayed on the user's browser. Responsive to the interactive input, the terminal may send the changes to the Search Engine Optimizer system, repeatedly until the user is satisfied with the search results and upon determining the user's intent to perform a financial transaction puts buyers and sellers together.

As taught in U.S. Pat. No. 9,355,352 the evolving fuzzy system can be describes as: (EFS) can be defined as self-developing, self-learning fuzzy rule-based or neuro-fuzzy systems that have both their parameters but also (more importantly) their structure self-adapting on-line. They are usually associated with streaming data and on-line (often real-time) modes of operation. In a narrower sense they are adaptive or evolving fuzzy systems. The difference is that evolving fuzzy systems assume on-line adaptation of system structure in addition to the parameter adaptation, which is associated with the term adaptive or evolving. They also allow for adaptation of the learning mechanism. Therefore, evolving assumes a higher level of adaptation.

Metadata can be described as: "is structured information that describes, explains, locates, or otherwise makes it easier to retrieve, use, or manage an information resource. Metadata is often called data about data or information about information." "An important reason for creating descriptive metadata is to facilitate discovery of relevant information. In addition to resource discovery, metadata can help organize electronic resources, facilitate interoperability and legacy resource integration, provide digital identification, and support archiving and preservation." Metadata serves the same functions in resource discovery as good cataloging does by allowing resources to be found by relevant criteria; identifying resources; bringing similar resources together; distinguishing dissimilar resources and giving location information."

The search engine optimizer system using summary reports objects derived from the Evolving Fuzzy system metadata and human brain equation can now offer and display with the highest precision advertisement that satisfy the end user and thus yield direct sales.

The advertisement subsystem uses the metadata from interactive, assisted, smart and personal input summary report objects to figure out the best target links, target ANI, targeted advertisements to view free content, valorized optimal advertisements to view and make consent or advertisement decisions that permit the sharing of information with corporate sponsor and in turn receive credits or currency to view, download or purchase intellectual property audio, digital and video works for free or at a discounted price.

The shopping cart subsystem offers a list of target links and billing the corporate link owner upon detecting the command instruction decision to display the link. For example, the end user is shown a list of corporate sponsor links (A, B, C). End user selects command instruction C, sending the user to corporate sponsor link C. The advertisement module now bills corporate sponsor C, for performing the targeted advertisement.

Multivariate Analytical Replicating Evolving System Optimized for Internet Searches As taught in U.S. Pat. Nos. 7,809,659, 7,908,263, 8,386,456, and 8,858,535 probabilistically rank each web page of the Internet in an order and then storing the information into a link database describes to those in the art a Page Rank.

U.S. Pat. No. 7,809,659, issued to Paiz, Oct. 23, 2010, independent claim 1 teaches defining a searchable environment; providing a link database of searchable Internet web pages, wherein the searchable Internet web pages are provided within the searchable environment;

analyzing the content of each of said Internet web pages based upon a set of predetermined semantic guidelines for said language and assigning a relative quantitative value to each of said Internet web pages based on said analysis;

quantifying and qualifying the content of each of said Internet web pages based on a comparison of said content with a plurality of predefined individual word collections, each word in a particular one of said word collections sharing a common assigned value;

As taught in U.S. Pat. No. 7,809,659 Internet searchable webpages describes to those in the art the neural network launches web crawler to scan and determine whether each hyperlink is navigational. To those in the art non-navigational or forbidden hyperlinks are deemed not searchable. To those in the art the evolving system continuously determines searchable and navigational hyperlinks when ranking webpage or page, websites or site or IP Address, supersite or large-scale site portals, and industry specific supersites such as the NFL or the NBA.

As taught in U.S. Pat. Nos. 7,809,659, 7,908,263, 8,386,456, and 8,858,535 probabilistically rank each web page of the Internet in an order and then storing the information into a link database describes to those in the art a Page Rank.

As taught in U.S. Pat. No. 7,809,659 Internet searchable webpages describes to those in the art the neural network launches web crawler to scan and determine whether each hyperlink is navigational. To those in the art non-navigational or forbidden hyperlinks are deemed not searchable. To those in the art the evolving system continuously determines searchable and navigational hyperlinks when ranking webpages, websites or site or IP Address, supersite or large-scale site portals, and industry specific supersites such as the NFL.

U.S. Pat. No. 7,809,659, issued to Paiz, Oct. 23, 2010, independent claim 1 teaches: creating an Environmental Bitmap Pyramid Structure, wherein the pyramid structure arranges words in hierarchical groupings, being arranged via a probabilistic weighted value of each of said Internet web pages wherein, an environmental bitmap is defined as a summary analysis of the best fit web pages for a given partition of the searchable environment; an Environmental Bitmap Pyramid Structure is defined as a having at least two of the following layers:

a keyword search returning an estimated $10^{10}$ matches, a simple layer refinement returning an estimated $10^6$ matches, a hybrid layer refinement returning an estimated $10^4$ matches, a complex layer refinement returning an estimated $10^2$ matches, an optimal layer refinement returning $10^0$ or the optimal match, and wherein the subject layers corresponding to said managerial hierarchical sub-partition for a given keyword search;

To those in the art storing describes for each regular expression in a 'CORE List' mapping a simple layer environmental bitmap into a 'CORE List' Superset(I), and a hybrid layer environmental bitmap into a 'CORE List' Set(i, j) and a complex layer environmental bitmap 'CORE List' Subset(i, j, k). The 'CORE list' stores for an Internet the size of 10,000,000 web pages a total of 100,000 Superset (i), 10,000,000 Set (i, j) and 1,000,000,000 Subset (i, j, k).

To those in the art each search has up to six independent variables to solve for static requests la crème de la crème or optimal match (!!!). The system places signature values such as (I) KEYWORD, (J) Frequency, (K) LINGUISTIC WORD PATTERNS, (X) LINK Value, (Y) Reliability and (Z) Popularity.

U.S. Pat. No. 7,908,263, issued to Paiz, Mar. 15, 2011, independent claim 1 preamble teaches how to incorporate a better representation of the six independent variables to solve for static and dynamic searches creating a language-based (left brain) equation and a geospatial (right brain) equation, for buffering between an Internet browser and a parallel distributed search engine supercomputer to interpret numerical and textual data and convert the interpreted data into statistical Glyph objects representing the mathematical equations used to obtain an optimal match in a search response to an end user search request.

U.S. Pat. No. 7,908,263 improves over U.S. Pat. No. 7,809,659 using fuzzy logic to store valid dynamic weighted search patterns into the 'CORE List' that are preprocessed and pre-calculated and are readily available bypassing the search engine capacities to respond to the end user.

U.S. Pat. No. 8,676,667 improves over U.S. Pat. No. 7,809,659 adding the neural network analysis to the nth subject layer of index refinement to derive the optimal match. Thus adding index refinement to the nth in the case using checkmate combinations having six independent variables improves over U.S. Pat. No. 7,908,263 to store valid dynamic weighted search patterns into the Codex encyclopedia that are preprocessed and pre-calculated and are readily available bypassing the search engine capacities to respond to the end user. Teaching in view of smart input how to combine independent variables (i) and (x) to create geospatial specific Superset (i), and how to further combine independent variables (j) and (y) to create geospatial specific Set (i, j) and how to further combine independent variables (k) and (z) to create geospatial specific Subset(i, j, k).

U.S. Pat. No. 8,386,456, issued to Paiz, Feb. 26, 2013, independent claim 1 teaches: continuously storing and updating in real time the at least one collection of top (n) web pages, and the top (n) sites geospatial information; continuously storing and updating in real time relative master index belonging to each codex page; determining at predefined time intervals the total number of web pages in the codex and for each codex page in its chain of command;
    determining at predefined time intervals the total number of significant difference changes in the Internet and then revaluing each site that updated one of its top ranked (n) web pages;
    purifying, mapping and plotting each element of the old master index into the new master index using the content value of the relative master index of the highest vector valued codex page;
    continuously creating, storing, synchronizing and updating in real time the new master index that reflect the latest condition of the environment that is derived from the continuously detected significant changes and adjustments made to the codex; and
    purifying, transforming and updating new master index and in turn the codex and the entire chain of command of codex pages.

U.S. Pat. No. 8,868,535 teaches a nested independent (Page, Site) event using Page and Site Rank scores to remove irrelevancy from a search. In other words, attenuating pages belonging to low quality websites. Applying (nth) fuzzy set subject layers using human knowledge, wisdom and understanding to derive a managerial hierarchical set of related entities to the search used to cherry pick la crème de la crème that is considered the final destination of the randomly surfing the web markov expansion model.

U.S. Pat. Nos. 8,977,621 and 9,355,352 transforms the Managerial Pyramid Switch into a real time evolving system that can use an Internet search to personalize a search and automatically start a final decision given 'related object' to begin a commercial process when intellectual property is encountered as the optimal match "to initiating and completing said financial transaction respective to said selected command instructions". To those in the art, the search process also has a commercial side such as advertisement and sales, and the evolving system using business intelligence patterns of behaviors puts buyers and sellers together. The evolving system is thus a multivariate version of the Managerial Pyramid Switch that stores trillions of Codex Pages and corresponding Codex search pattern partial master indexes.

The evolving system improves over the U.S. Pat. Nos. 7,809,659, 7,908,263, 8,239,229, 8,676,667, 8,386,456, and 8,868,535 by personalizing the search and transform the randomly surfing the Web Markov expansion model into direct searches between buyers and sellers upon transforming independent variables (I, J, K, X, Y, Z) into personal input with informational certainty that eliminates the randomly surfing the web trial and error process and in turn automatically yields the destination.

To those in the art a regular expression request defines P(Q) that maps a searchable environment of the Internet environment where each page has already a pre-calculated Page Rank probabilistic value, and the top (n) results webpages become the output, and then the output is processed with an ad hoc mechanism to derive the set of responses sent to the end user's computer terminal, and smart device browser. To those in the art if the end user may use a voice recognition interface device such as the virtual maestro or Alexa™ then the top response is sent or an error message notifies the user that an optimal response was not found. To those in the art end user computing devices can refer to voice recognition interface device, a computer terminal, a laptop, a smart device, a subscriber device, a personal computer, a tablet, a mobile telephone, a personal data assistant (PDA), a mobile audio or video player, a virtual maestro 800, or Alexa™ or Google Home™ or Apple HomePod™ and the like.

Duplicate to those in the art are redundant non source files, and good programming techniques teaches that they should be removed from calculation as soon as possible to remove confounding elements of the search. Redirection, spam and viral content are web pages that should be eliminated from the searchable environment as irrelevancy and with duplicates can be expressed as P(~Q) or the garbage given a query. To those in the art P(~Q) is removed using Site Rank if the webpage parent web site belongs to a low-quality partition.

To those in the art P(Q) maps a searchable environment. P(Q)*P(~Q), where P(~Q) is measured as "1" when relevant and "0" as irrelevant maps a better searchable environment.

U.S. Pat. No. 7,809,659, issued to Paiz, Oct. 23, 2010, independent claim 1 teaches: a probabilistic weighted value is a weighted magnitude respective to the number of occurrences of a search pattern identified within each web page belonging to each said subject layers, the weighted magnitude having a lowest magnitude, a highest magnitude, and a series of values therebetween, wherein the lowest magnitude is associated with the lowest certainty and precision and the highest magnitude is associated with the highest certainty and precision of the search pattern within the subject layers; gathering, correlating and distilling the content of each of said subject layers to match and merge its own vector data record with its own environmental bitmap using at least one common denominator keyword as the independent variable;

To those in the art describes P(Q) as the [AX] samples, and the conditional probability P (Q|~Q) to generate the [BX] sample improved environment upon removing irrelevancy. To those in the art the [BX] sample is the $1^{st}$ subject matter layer of refinement using the benefit of U.S. Pat. Nos. 8,977,621 and 9,355,352 positional branching entity objects and using rules of semantics to identify natural variants, associative features or $1^{st}$ set of key featured associations or P(simple layer of refinement) or P(A) that maps an improved environment, where each entity object is of $2^{nd}$ significant difference given the conditional probability P(Q+)*P(A) or P(Q+|A). Each of the millions of positional branching entity object is stored in the Codex encyclopedia.

To those in the art the [CX] sample using the benefit of U.S. Pat. Nos. 8,977,621 and 9,355,352 is the $2^{nd}$ subject matter layer of refinement and perform knowledge discovery for each positional branching and subordinate natural variant entity object. Analyzing, using rules of semantics to probabilistically weight and determine using subject matter data warehouses the output to discover for each valid probable branching and subordinate entity object a collection of natural variants, associative features or $2^{nd}$ set of key featured associations or P(hybrid layer of refinement) or P(B) that maps an optimal environment, where each entity object is of $3^{rd}$ significant difference given the conditional probability P(Q+|A)*P(B) or P((Q+|A)|B). Each of the billions of probable branching entity object is stored in Codex encyclopedia.

Using the benefit of U.S. Pat. Nos. 8,977,621 and 9,355,352 the neural network performs fuzzy logic calculations using a subject matter data warehouse to map the $3^{rd}$ subject layer of refinement of each positional and probable branching entity object. Analyzing the output with subject matter data warehouses using rules of semantics to discover for each valid probable branching and subordinate entity objects a collection of natural variants or $3^{rd}$ set of key featured associations that maps an optimal environment, where each entity object is of $4^{th}$ significant |difference given the conditional probability P(C) or P(((Q+|A)|B)|C). Each of the trillions of plausible branching combinations are stored in the Codex encyclopedia as an entity object As taught in U.S. Pat. Nos. 7,809,659, 7,908,263, 8,386, 456, and 8,858,535 teaches a neural network performing probabilistic nested reductions and based (1). The end user places a single or group of KEYWORDS regular expression. (2) The system identifies the raw value of the KEYWORDS which is expressed from 0 to 15, where 0 is a very broad result of over 1,000,000,000 (or billion) and 15 is a very narrow result with at most 10 instances. Sometimes, they satisfy and most often they don't, and this is the craving need that this technology resolves.

Using the benefit of U.S. Pat. Nos. 8,977,621, 9,355,352, Ser. Nos. 16/129,784 and 17/129,784 providing a software algorithm that mimics the human brain to simulate deductive reasoning, the method comprising steps of: (edited redundant language)

executing informatics set theory construct to transform valid interactive input regular expressions into a personalized word search that is communicated to said search engine;

establishing a human knowledge database executing a set of human knowledge software instructions in order to simulate a complete superset of known subject matter reference indices belonging to said personalized word search construed during an Internet browser search;

identifying a series of selectable series of command instructions based upon said personalized word search, wherein said step of identifying is accomplished by the search engine and browser enabled computing device upon searching said human knowledge database and finding a match;

submitting a series of words into a search request through interactive data entry browser software residing in said computing device;

identifying a series of selectable series of command instructions based upon said submitted series of words, wherein the step of identifying is accomplished by the computing device;

presenting said series of selectable series of command instructions to said end user; wherein said step of presenting at least one of said selectable series of command instructions is accomplished by obtaining a finalized decision personalized word search from said user;

obtaining a selected finalized decision personalized word search from said user through said browser enabled computing device;

receiving an instruction from said user directing a modification to said personalized word search in accordance with said instruction entered by said user; and receiving said finalized decision personalized word search with said instruction entered by user to initiate and complete a financial transaction respective to selected command instructions.

Ser. No. 16/802,526 allows the virtual maestro and Cholti programs to imitate the human brain managerial hierarchical set analyzing the [Ax], [Bx], [Cx], [Dx], [Ex] samples as a multivariate analysis replica given a search pattern. Then the DaVinci intelligence ambience supercomputer program performs big data indexing to discover positional, probable and plausible natural variants given a search pattern using trending, social media and last changes in the environment data to personalize viable command instruction or alternative request combinations to derive la crème de la crème final destination, introducing big data indexing input optimization as follows:

To those in the art Ser. No. 16/802,526 describes a new set of business rules to imitate the human brain managerial hierarchical set [Ax], [Bx], [Cx], [Dx], [Ex] samples as a multivariate analysis replica given a search pattern using big data indexing which are object of the invention to improve U.S. Pat. No. 8,977,621 Cholti Search Engine Software in view of interface devices.

[AX] Searching the link database master index to derive the voluminous searchable environment using Page ranking probabilities with the good, the bad and the ugly. Removing the bad, as a real time velocity stored procedure using Site ranking probabilities to remove duplicates, spam, viral and low site quality content, and thus removing the lion share of irrelevant calculations and the intelligence ambience generates the Superset (U) given a search pattern to identify each positional, probable and plausible natural variants and 'related objects'.

To those in the art P(~Q) describes the process of removing redundancy and low quality content at incipiency mimicking the human brain, and not behaving as a supercomputer artificial intelligence algorithm that want to process everything, even when the lion share has a probability approximating zero. Thus, P(Q|~Q) describes a garbage free request by performing a joint probability using Page and Site rank.

[BX] Searching a reference subject matter data warehouse to derive the veracity improved environment using Supersite and Industry ranking probabilities. Removing the ugly, and the intelligence ambience generates the Supersets (In) (where n is preferably =4) given a search pattern, and now the process of identifying each positional branching natural variant using human knowledge to filter the searchable environment using the primary independent variable (I) and add the 1st set of key featured associations as P(A), to generate an improved environment with 1,000,000 web pages to generate P(Q+) after removing the bad (~Q) and mapping the set of positional branching Supersets (In) given a search pattern managerial hierarchical set.

To those in the art redundancy the conditional probability P(A) derived from the human knowledge $1^{st}$ subject matter layer of refinement given P(Q|~Q) to generate the positional branching Supersets (In) mapping each of the $1^{st}$ set of key featured associations, that are used to measure the conditional probability P(Q|~Q)*P(A) or P(Q+|A), where P(Q|~Q) is replaced as P(Q+) garbage free.

[CX] Searching a reference subject matter data warehouse to derive the natural variants and map an improved environment with 10,000 web pages to generate using human wisdom probable branching natural variants Sets (In, Jo) given a search pattern P(Q+) to filter each improved environment using the secondary independent variable (J) and add the $2^{nd}$ set of key featured associations as P(B), to cull the improved environment to 10,000 web pages using nested independent (A, B) subject layers probability probable branching Sets (In, Jo) given a search pattern P(Q+).

To those in the art redundancy the conditional probability P(B) derived from the human wisdom subject matter given a search pattern P(Q+) generates probable branching Sets (In, Jo) mapping each of the $2^{nd}$ set of key featured associations use the nested independent (A, B) subject layers probability P(Q+|A)*P(B) or P((Q+|A)|B).

[DX] Searching a reference subject matter data warehouse to derive the natural variants to map an optimal environment with 100 web pages using human understanding to generates plausible branching Subsets (In, Jo, Kp) given a search pattern P(Q+) to filter each improved environment using the tertiary independent variable (K) and add the $3^{rd}$ set of key featured associations as P(C), to cull the optimal environment with 100 web pages using nested independent (A, B, C) subject layers probability plausible branching Subsets (In, Jo, Kp) given a search pattern P(Q+).

To those in the art redundancy the conditional probability P(C) is human understanding of the subject matter given a search pattern P(Q+) to generate the plausible branching Subsets (In, Jo, Kp) mapping each of the $3^{rd}$ set of key featured associations, that are used to measure the conditional probability P((Q+|A)|B)*P(C) or the nested independent (A, B, C) subject layers probability P(((Q+|A)|B)|C).

To those in the art nested independent (A, B, C) subject layers probability P(((Q+|A)|B)|C) and corresponding managerial hierarchical set of entities comprises index refinement to the nth, and using the benefit of U.S. Pat. Nos. 8,977,621, 9,355,352, Ser. Nos. 16/129,784, 17/129,784 and 16/802,526 teaches how the Da Vinci supercomputer program imitates the human brain to remove irrelevancy using Page, Site, Supersite, Industry W_RANK probabilities to map an optimal dataset for each search pattern.

To those in the art to map an optimal dataset for each search pattern describes the output. It is the object of the present invention to mimic the human brain and identify la crème de la crème quickly, effectively and efficiently using multivariate analytical replica managerial hierarchical set natural variants optimal datasets in order for the virtual maestro acting as a human using big data indexing skeletal communications analysis of the output, instantiates a scripted communication with the end user. The skeletal communication deductive reasoning analysis of the output for big data indexing uses the Ws, such as Which, What, Where, Who, When and how that when perfectly aligned describes the how algorithm!

[EX] Patterning matching the Codex encyclopedia with vim and vigor to parse each page into human monitoring and evaluating indicia as each paragraph, sentence, and term clusters is identified and weighted according to the end user's usage pattern of behavior to attenuate irrelevancy and gain factor quality. The resultant quality of the Site given Supersite and Industry modifiers is a determinant factor in determining the best fit response.

[EX] sample analysis describes the cherry picking of the output, once the neural network performs a set of intermediate reduction approximations described in the [AX], where a purification process occurs upon applying the resultant quality of the Site multiplier that is used to remove irrelevancy described duplicate, spam, viral and low quality content. Then the process continues [BX] to [DX], where an index refinement using the Codex encyclopedia subject matter collections of transformers such as commercial data, telecommunications data, geospatial data, financial market, product, music, religious, casino, news, adult, children and dictionary data.

Upon completing the [AX] to [DX] intermediate reduction multivariate analysis approximations to transform the original P(Q) into P(((Q+|A)|B)|C) and corresponding managerial hierarchical set of entities. At this point, each of the keyword and cluster belonging to the identified $1^{st}$, $2^{nd}$ and $3^{rd}$ set of key featured associations describing keywords and concepts after knowledge discovery are deemed to be related to the search pattern. The Hive searching the Codex encyclopedia uses rules of association, relevancy and likelihood to find using reference subject matter collections of words that would be used to a writer accurately describing contextually content with regards to the search pattern. Content search can insert missing gaps of information, whereas contextual content will not. Contextual is the second Glyph used by the Cholti as Mayan hieroglyphics that usually maps location, time and special events known to be related to the subject matter and clarify accurately the content the end user is searching with certainty is found in the document.

To those in the art the nested independent (A, B, C) subject layers probabilities are used to attenuate irrelevancy. And then to figure out what set of word, concepts and ideas are related with informational certainty. Once the collection of key featured association or related words and concept to a search pattern are known the output can be analyzed to find the best fit response.

U.S. Pat. Nos. 7,809,659, 7,908,263, 8,386,456, 8,868,535, 8,977,621, 9,355,352, Ser. Nos. 16/129,784 and 16/802,526 teaches key featured associations described as Simple, Hybrid, Complex (joins, blocks, walls, and ceiling) using a 3D mentality. The simulation environment maps for each search pattern an Informational Pyramid of certainty. The managerial hierarchical linear connections of concepts and terms become building blocks for the Informational Pyramid of Certainty.

To those in the art Simple (joins, blocks, walls, and ceiling) describes [BX] Sample $1^{st}$ set of key featured associations or related terms and concepts to a search pattern. Pages and resources are compared against subject matter probability P(A) and culled if deemed irrelevant.

To those in the art Hybrid (joins, blocks, walls, and ceiling) describes [CX] Sample $2^{nd}$ set of key featured associations or related terms and concepts to a search pattern. Pages and resources are compared against subject matter probability P(B) and culled if deemed irrelevant.

To those in the art Complex (joins, blocks, walls, and ceiling) describes [DX] Sample $3^{rd}$ set of key featured associations or related terms and concepts to a search pattern. Pages and resources are compared against subject matter probability P(C) and culled if deemed irrelevant.

Using the benefit of U.S. Pat. Nos. 8,676,667 and 8,868,535 describes a continuous index refinement to the nth of the output, to describe [EX] Sample nth set of key featured associations or related terms and concepts to a search pattern. In this case, Output pages and resources are compared against nested independent (A, B, C) subject layers probabilities and culled if deemed irrelevant.

U.S. Pat. Nos. 8,977,621, 9,355,352, Ser. Nos. 16/129,784, 17/129,784 and 16/802,526 teaches how using the resultant quality of a Site is used to discover contextually 'related objects' that are considered checkmate equations possessing independent variables (I, J, K, X, Y, Z) direct searches where input maps output since informational certitude exists. Independent variables (I, J, K) and (A, B, C) represent nested probabilities.

In is object of the present inventions to assign a weighted value or W_RANK to each of the entity of the managerial hierarchy given a search pattern, and offer command instruction to aid the end user in the search, using the 'Vueno, Vonito and Varato' algorithm to identify a plurality of associated Codex Pages [EX] samples given a search pattern to generate an optimal output. Then the evolving system cherry picking rules apply, and the best fit response is determined as the highest probability contextual content.

To those in the art direct searches or 'related objects' are reverse engineering subtracting known relevant vector component such as geospatial data. For example, the end user makes a request comprising a commercial keyword, and then system during the [BX] sample the search engine optimizer inserts the geospatial information, where latitude and longitude GPS coordinates are converted into valid set of zip code, city, ANI and world physical address based IP address or website, altering the need to furnish a map, financial exchange data, or relevant information given the industry the commercial is related. If the commercial keyword is a restaurant, similarly same competitors to the restaurant within a predefined distance to the end user is shown alternative suggestions. Each restaurant will have a direct search mapping independent variable (I, J, K, X, Y, and Z) with concepts and keywords, and geospatial data.

First Preferred Embodiment, Codex Search Patterns Using Big Data Indexing

Big Data Indexing: Codex Search Patterns is now updated as follows "Big data is a field that treats ways to analyze, systematically extract information from, or otherwise deal with data sets that are too large or complex to be dealt with, by traditional data-processing application software. Data with many cases (rows) offer greater statistical power, while data with higher complexity (more attributes or columns) may lead to a higher false discovery rate. Big data challenges include capturing data, data storage, data analysis, search, sharing, transfer, visualization, querying, updating, information privacy and data source. Big data was originally associated with three key concepts: volume, variety, and velocity."

Rule 1: Volume: "The quantity of generated and stored data."

Rule 2: Velocity: "The speed at which the data is generated and processed to meet the demands and challenges that lie in the path of growth and development."

Rule 3: Veracity: "It is the extended definition for big data, which refers to the data quality and the data value."

Rule 4: Value: "The utility that can be extracted from the data."

Rule 5: Variability: "It refers to data whose value or other characteristics are shifting in relation to the context they are being generated." en.wikipedia.org Codex Search Patterns Supercomputer equivalencies in view of the Alice test Rule 6: The volume is massive and complex since it is the Internet.

Rule 7: The Codex has real time velocity, where 95% of the responses and the lion share of the remaining response under 1 second, and humanlike scripted communications and dialogue interaction executes software instruction with delays in the seconds.

Rule 8: The Codex Encyclopedia and subject layers of index refinement describe veracity making sure that geospatial and semantics consistency exists in the best responses.

Rule 9: Each resource is assigned, a Supersite rank, site rank probability value in an order from highest to lowest, where Supersite rank is used to identify of the quality value of la crème de la crème and Site rank is used to attenuate viral, spam and duplicates as irrelevancy.

Rule 10: Search Patterns measure usage patterns of behavior, trending and live human monitoring and evaluation indicia, which describes to those in the art variability. Evolving System Equivalencies Rule 11: Virtual environment using the benefit of U.S. Pat. No. 9,355,352, the evolving fuzzy system can be describes as: (EFS) can be defined as self-developing, self-learning fuzzy rule-based or neuro-fuzzy systems that have both their parameters but also (more importantly) their structure self-adapting on-line. They are usually associated with streaming data and on-line (often real-time) modes of operation. In a narrower sense they are adaptive or evolving fuzzy systems. The difference is that evolving fuzzy systems assume on-line adaptation of system structure in addition to the parameter adaptation, which is usually associated with the term adaptive or evolving. They also allow for adaptation of the learning mechanism. Therefore, evolving assumes a higher level of adaptation of a virtual environment.

Rule 12: Virtual Metadata can be described as: "is structured information that describes, explains, locates, or otherwise makes it easier to retrieve, use, or manage an information resource. Metadata is often called data about data or information about information." "An important reason for creating descriptive metadata is to facilitate discovery of relevant information. In addition to resource discovery, metadata can help organize electronic resources, facilitate interoperability and legacy resource integration, provide digital identification, and support archiving and preservation." Virtual Metadata serves the same functions in resource discovery as good cataloging does by allowing resources to be found by relevant criteria; identifying resources; bringing similar resources together; distinguishing dissimilar resources and giving location information."

Rule 13: Virtual Jesus: supercomputer command intelligent data warehouses, which transform input into a question and then search based on subject matter to improve the responses. The 2020 artificial intelligence supercomputer version is referred to as Virtual Da Vinci 900 and is ubiquitous but doesn't respond with discernment as per the teaching of the Church in "red font" as if describing the divinity and omnipresence of our Lord Jesus Christ. Instead, Virtual Da Vinci 900 transforms input into a search pattern with vector components such as geospatial, human knowledge, wisdom, understanding and discernment to generate a high-quality request.

Virtual Maestro as an Interface Device

Rule 14: The Codex has real time velocity, where 95% of the responses and the lion share of the remaining response under 1 second, and humanlike scripted communications and dialogue interaction execute software instruction with delays in the seconds.

Rule 15: The Codex Encyclopedia and subject layers of index refinement describe veracity making sure that geospatial and semantics consistency exists in the best responses.

Rule 16: Each resource is assigned, a Supersite rank, site rank probability value in an order from highest to lowest, where Supersite rank is used to identify of the quality value of la crème de la crème and Site rank is used to attenuate viral, spam and duplicates as irrelevancy.

Rule 17: Search Patterns measure usage patterns of behavior, trending and live human monitoring and evaluation indicia, which describes to those in the art variability.

Environment and Statistical object definitions

Rule 18: Internet environment: comprises all of the 'related objects', webpages, sites and super sites that are navigational in the latest master index.

Rule 19: Searchable environment: comprises all navigational 'related objects', webpages, sites and super sites given the search pattern a map a Superset (U) or ZSD.

Rule 20: Improved environment: comprises all navigational 'related objects', webpages, sites and super sites given the search pattern a map a Superset (I) or SSD upon removing duplicates and using Site Rank to remove spam, viral content and redirection threats.

Rule 21: Relevant environment: comprises the first sample or the square root of the size of the searchable environment, that is stored as the Superset (I) partial master index Rule 22: Subject Matter: comprises searching using data warehousing using business intelligence, statistical analysis and big data indexing of each valid Codex Page and hierarchical set of natural variants.

Rule 23: Codex Page is the Superset given the search pattern 180 that comprises the searchable environment, that is attenuated/gain factored by Site ranking probabilities and further adjusted when corporate organization have Super ranking probabilities and real time news and exchange human monitoring and evaluation indicia, or alternatively social media, trending and reference subject matter collections data values.

Rule 24: Super Sites are continuously updated as real time news events and financial exchange information is processed into primed data human monitoring and evaluation indicia Rule 25: Super Sites data is primed into human monitoring and evaluation indicia by web crawlers and the Virtual Da Vinci 900 supercomputer program upon receiving the primed data compares social media, trending and reference subject matter collections data values to automatically updates end user computing devices or virtual maestros 700 tracking the craving need and of interest to the user.

Rule 26: Natural Variants 720 are Superset (In) given the search pattern that comprises valid subject matter associative attributes using rules of semantics, when big data indexing.

Rule 27: Probable Responses 740 are the Set (In, Jo) given the search pattern that comprises probable associative attributes using rules of semantics, when big data indexing.

Rule 28: Plausible Responses 790 are the Subset (In, Jo, Kp) given the search pattern that comprises probable associative attributes using rules of semantics, when big data indexing.

Second preferred embodiment, Da Vinci Supercomputer Big Data Indexing

Rule 29: 'Vueno, Vonito y Varato' algorithm, Spanglish term, the evolving system must be good (informational certain), real time quality data and inexpensive to produce.

Rule 30: Vim the virtual maestro is programmed to have vim, is no longer an interface device that monitors interactively input into a search pattern. Now, with vim or full of energy the virtual maestro continuously scans, gathers, distills and tracks subject matter patterns, trending, social media, news, sport and entertainment events and financial exchanges data to communicate with the end user. Vim is what the evolving system emulates to behaves as if a living organism.

Rule 31: Vigor the virtual maestro is programmed to have vigor, as in vitality to grow and learn that monitors interactively changes in the environment, and determines, what is significant in order to highlight subject matter patterns, trending, social media, news, sport and entertainment events and financial exchanges data that could be probabilistically satisficing or of interest to the end user. Thus, the evolving system is with vim and vigor.

Rule 32: Variant the virtual maestro performs for each search pattern a hierarchical dataset after performing subject matter big data indexing of the improved environment to identify the natural variants to the search. Natural variants are forecasted or alternative queries offered to the user that are considered Superset (In) subordinates of the Superset (U) improved environment given a search pattern after removing redundancy, spam, viral content and low-quality sites that fail to pass the (Page*Site probability) Superset (In) threshold or top (n).

Rule 33: Variant the virtual maestro performs for each search pattern a hierarchical dataset after performing subject matter big data indexing of the improved environment to identify the probable branching to each natural variant to the search. Probable branching natural variants are forecasts or alternative queries offered to the end user and are considered Set (In, Jo) subordinates of the Superset (U) improved environment given a search pattern removing results that fail the (Page*Site probability) Set (In, Jo) threshold or top (n, o).

Rule 34: Variant the virtual maestro performs for each search pattern a hierarchical dataset after performing subject matter big data indexing of the improved environment to identify the plausible branching to each natural variant to the search. Plausible branching natural variants are forecasts or alternative queries offered to the end user and are considered Subset (In, Jo, Kp) subordinates of the Superset (U)

improved environment given a search pattern removing results that fail to pass the (Page*Site probability) Subset (In, Jo, Kp) threshold or top (n, o, p).

Rule 35: Multivariate analysis hierarchical datasets, where the big data indexing stores as the Superset(In) threshold the first sample or sqrt of the searchable environment, and Set(In, Jo) is threshold is the second sample or second sqrt of the searchable environment, and Subset (In, Jo, Kp) threshold is the third sample or third sqrt of the searchable environment or optimal responses given the search pattern.

Rule 36: Figures out a dialogue: the system analyzes the multivariate hierarchical datasets and upon identifying a significant difference change in the environment, triggers a communication or dialogue event. The software determines if and how the information should be transmitted to the end user based on personal, craving needs values, and humanlike vim and vigor script guidelines. Avoiding trivial data and sending optimal satisficing data.

Rule 37: Pattern matching thresholds: the end user computing device or virtual maestro 700 interface communicates using interactive input exact pattern matching threshold to respond to valid request. The natural variant communication threshold is 80% likely to respond given an exact pattern matching after searching thousands of combinations. The scripted reactive probable branching natural variant communications threshold is 90% likely to respond after searching millions of combinations. The scripted proactive dialogue threshold is 95% likely to respond after searching billions of combinations.

Rule 38: Command and control computers: comprising Virtual Da Vinci 900 supercomputer program analyzes trillions of pertinent and relevant combination in real time to the end user's personal or social group, satisficing and interest big data indexing historical profile level values applying significant difference first, second and third samples values. First, when applying a combination of demographic and social group uses first sample variances. Second, when applying a combination of demographic and social group and the group of the end user friends uses second sample variances. Third, then the 'Vueno, Vonito y Varato' algorithm uses demographic, social group, news event trending data and the end user personal historical tracking of craving needs, satisficing and interest values uses third sample variances.

Rule 39: Financial News: determining from a real time financial exchange feed or news sources that a stock has a significant news in view of its market cap value and demographic and social group, the system notifies the data as a natural variant given a personal managerial historical set replicating the known craving needs, levels of satisfaction and interest of the user.

Rule 40: Automatic notification: the system can notify the information as a probable branching natural variant given a personal historical tracking of craving needs, satisficing and interest values hierarchical set. For example: notify the end user upon determining a craving need, in this case, the Kansas City Chiefs and San Francisco 49ers won their conference game Rule 41: Automatic responses: the system using the 'Vueno, Vonito y Varato' personalized mantra can notify the information as a plausible branching natural variant given a personal historical tracking of craving needs, satisficing and interest values hierarchical set. For example: notifying the user upon determining Cristiano Ronaldo (craving need) scored a goal.

Rule 42: Artificial Intelligence: Virtual Da Vinci, 900 sending a response to the virtual maestro to communicate with the user, this action triggers an update of the virtual maestro and end user's profile, and the reverse engineering of the combination of vector component belonging to the search pattern to match the corresponding big data indexing Codex Page.

Third Preferred Embodiment: Virtual Da Vinci Supercomputer Simplifications

Harmony, Balance and Proportion W_RANK Hierarchical Sets for Small Samples

Rule 43: Zero Clusters the following: the searchable environment is set to 210, the improved environment size=100, the optimal environment size=10 and the optimal element size=4. The Superset (In) size=16, Set (In, Jo) size=4, and the Subset (In, Jo, Kp) size=2.

Rule 44: Small sample calculations consider Site Quality Partitions 0 to 2 as irrelevant.

Rule 45: When the searchable environment <=1,000 as follows: the improved environment size=100, the optimal environment size=10 and the optimal element size=4. The Superset (In) size=20, Set (In, Jo) size=6, and the Subset (In, Jo, Kp) size=3.

Rule 46: When the searchable environment <=10,000 as follows: the improved environment size=100, the optimal environment size=10 and the optimal element size=4. The Superset (In) size=32, Set (In, Jo) size=8, and the Subset (In, Jo, Kp) size=4.

Rule 47: When the searchable environment <=100,000 as follows: the improved environment size=128, the optimal environment size=16 and the optimal element size=5 The Superset (In) size=64, Set (In, Jo) size=10, and the Subset (In, Jo, Kp) size=5.

Rule 48: When the searchable environment <=1,000,000 as follows: the improved environment size=256, the optimal environment size=32 and the optimal element size=6. The Superset (In) size=100, Set (In, Jo) size=16, and the Subset (In, Jo, Kp) size=6.

Harmony, Balance and Proportion W_RANK Hierarchical Sets for Medium Samples

Rule 49: Medium size calculations considering Site Quality Partitions <4 as irrelevant.

Rule 50: When the searchable environment <=10,000,000 as follows: the improved environment size=316, the optimal environment size=40 and the optimal element size=10. The Superset (In) size=128, Set (In, Jo) size=20, and the Subset (In, Jo, Kp) size=8.

Rule 51: When the searchable environment <=100,000,000 as follows: the improved environment size=512, the optimal environment size=64 and the optimal element size=12. The Superset (In) size=200, Set (In, Jo) size=32 and the Subset (In, Jo, Kp) size=10.

Rule 52: When the searchable environment <=1 Billion as follows: the improved environment size=1024, the optimal environment size=128 and the optimal element size=16. The Superset (In) size=256, Set (In, Jo) size=40 and the Subset (In, Jo, Kp) size 14.

Harmony, Balance and Proportion W_RANK Hierarchical Sets for Large Samples

Rule 53: Large sample size consider Site Quality Partitions <5 as irrelevant

Rule 54: The searchable environment <=10 billion as follows: the improved environment size 2048, the optimal environment size=256 and the optimal element size=32. The Superset (In) size=316, Set (In, Jo) size=50, and the Subset (In, Jo, Kp) size=18.

Rule 55: The searchable environment <=100 billion as follows: the improved environment size 4,096, the optimal environment size=64 and the optimal element size=24. The Superset (In) size=512, Set (In, Jo) size=64, and the Subset (In, Jo, Kp) size=24.

Rule 56: The searchable environment <=1 trillion as follows: the improved environment size=10,000, the optimal environment size=1000 and the optimal element size=100. The Superset (In) size=1,024, Set (In, Jo) size=128, and the Subset (In, Jo, Kp) size 32.

Rule 57: Huge sample size consider Site Quality Partitions <6 as irrelevant

Rule 58: The searchable environment <=100 trillion as follows: the improved environment size=100,000, the optimal environment size=10,000 and the optimal element size=1000. The Superset (In) size=2,048, Set (In, Jo) size=256, and the Subset (In, Jo, Kp) size 64.

Rule 57: Massive sample size considers Site Quality Partitions <7 as irrelevant.

Rule 58: The searchable environment <=10,000 trillion as follows: the improved environment=1,000,000, the optimal environment=100,000 and the optimal element=10,000. The Superset (In) size=4,096, Set (In, Jo) size=512, and the Subset (In, Jo, Kp) size=128.

Big Data Indexing Reference Subject Matter Layers of Refinement

Rule 59: Big Data Indexing given the searchable environment performs subject layer of index refinement to remove irrelevancy and identify a Superset (U) given the search pattern.

Rule 60: Big Data Indexing given the searchable environment performs the first subject layer of index refinement to identify a plurality of Natural Variants Superset (In).

Rule 60: Big Data Indexing given the optimal environment performs the second subject layer of index refinement to identify a plurality of probable branching Set (In, Jo).

Rule 61: Big Data Indexing given the optimal element performing the third subject layer of index refinement to identify a plurality of plausible branching Subset (In, Jo, Kp).

Minimum Super Site Quality Partition given the market value in USD (2020)

Rule 62: Super Site with a market value >1 trillion USD are 10.

Rule 63: Super Site with a market value >500 billion USD are 9++.

Rule 64: Super Site with a market value >200 billion USD are 9+.

Rule 65: Super Site with a market value >100 billion USD are 9.

Rule 66: Super Site with a market value >10 billion USD are 8.

Rule 67: Super Site with a market value >1 billion USD are 7+.

Rule 68: Super Site with a market value >500 million USD are 7.

Rule 69: Super Site with a market value >200 million USD are 6+.

Rule 70: Super Site with a market value >100 million USD are 6.

Rule 71: Big Data Indexing given the Super Site 6+ or better is never automatically removed from calculation as irrelevancy.

Virtual Da Vinci valorization of the hierarchical set of entity knowledge objects Rule 72: Superset (U) counts distinct Super Site with value >6 from the searchable environment given a search pattern to select the most valuable Codex Page when more than 1.

Rule 73: Superset (In) counts distinct Super Site with value >6 from the improved environment given a search pattern to select the most valuable Natural Variants.

Rule 74: Set (In, Jo) count distinct Super Site with value >6 from the optimal environment given a search pattern to select the best fit probable branching Natural Variants.

Rule 75: Subset (In, Jo, Kp) count distinct Super Site with value >6 from the optimal environment given a search pattern to select the best fit probable branching Natural Variants.

Rule 76: Search pattern environments with a count=0 are deemed irrelevant.

Rule 77: Search pattern environments with a count=1 with a Super Site=10 are always deemed satisfying. To those in the art best fit describes the high probable alternative.

Rule 78: W_RANK for search pattern environments such as Superset (U), Superset (In), Set (In, Jo) and Subject (In, Jo, Kp) objects is the total (Super Site Value) for the respective optimal element the highest valued W_RANK object is deemed of greater interest or satisfaction.

Rule 79: W_CHANGE for search pattern environments such as Superset (U), Superset (In), Set (In, Jo) and Subject (In, Jo, Kp) at predefined time interval measures the difference (count of unique request to a Super Site webpage response value) for the respective optimal element. The highest valued W_CHANGE object is deemed of greatest usage and trend value.

Rule 80: W_CHANGE=10, when it deemed of significant difference and great importance given the quality of Super Sites and unique end user.

Rule 81: W_CHANGE<5 when the object is probabilistically deemed COLD given the end user's historical profile is considered irrelevant and skipped from further calculation.

Rule 82: W_CHANGE>6 when the object is probabilistically deemed HOT given the end user's historical profile is consider relevant and skipped from further calculation. If W_CHANGE is 9+, 9++, and or 10, the virtual Maestro knows a la crème quality forecasted, or alternative query recommendation or direct communication was found.

BRIEF DESCRIPTION OF THE DRAWINGS

First Preferred Embodiment: Virtual Maestro Codex Search Patterns (U.S. Ser. No. 16/129,784)

DETAILED DESCRIPTION OF THE PRESENT INVENTION

Figure 1:
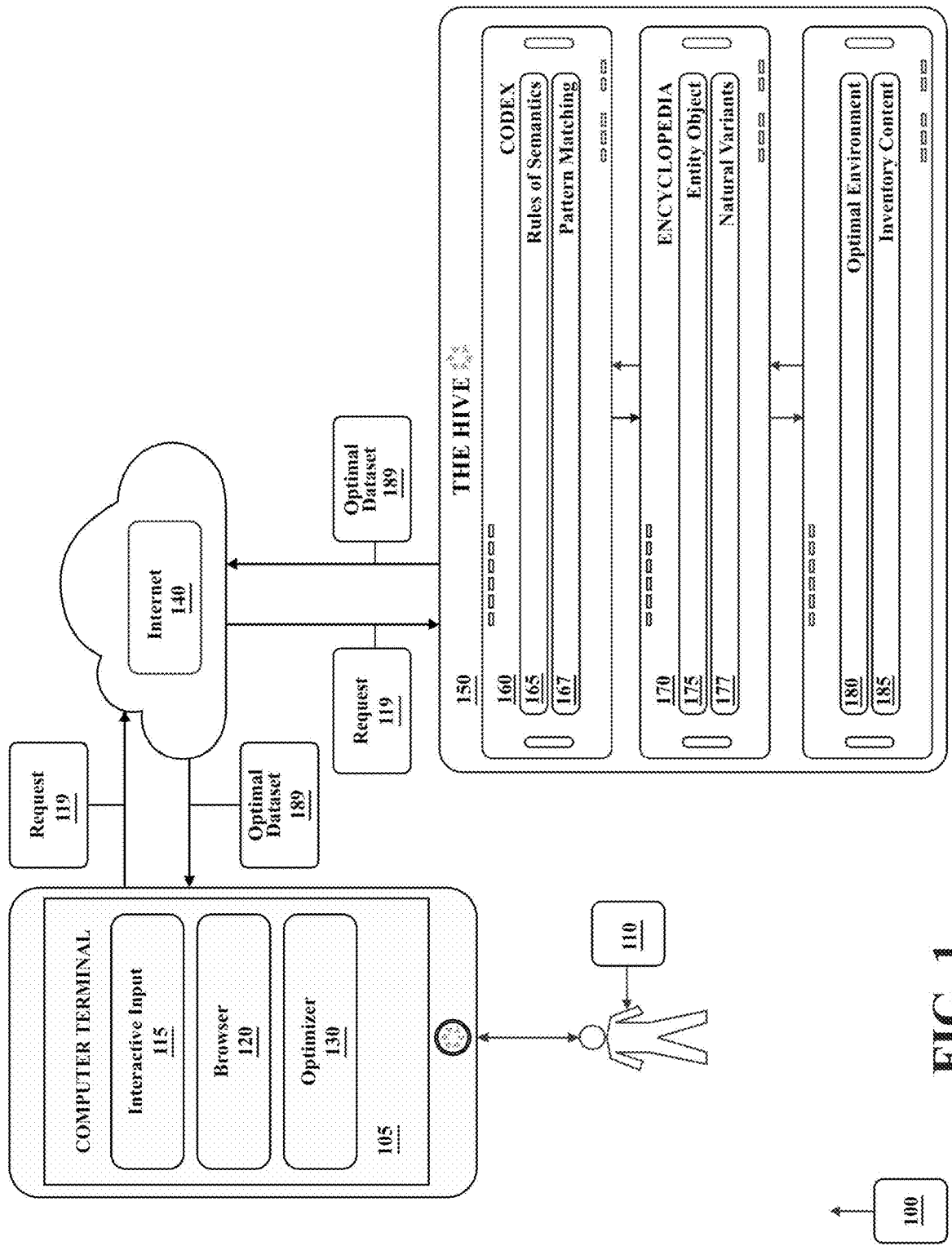
FIG. 1 presents a schematic diagram of an exemplary Multilingual Search System.

FIG. 1 Users 110 having an end user computing device such as a computer terminal 105, or subscriber device in digital communication with the Internet 140 and the system or the Hive 150, a browser 120, and an optimizer software program 130 residing in memory executing a set of instructions to transform interactive input 115 into a request 119 using rules of semantics 165 to find missing gaps of information and pattern matching 167 the Codex 160 to find an Entity Object 175. The top W_RANK or weighted results becomes the optimal dataset 189 that becomes the output sent to users 110 computer terminal 105. U.S. Pat. No. 8,977,621 teaches the collection of relevant top pages becomes the optimal dataset 189 that probabilistically maps an optimal environment 180, and each page and portions thereof having relevance to the Entity Object 175, 177 becomes Inventory Content 185 that are offered as ADDITIONAL KEYWORDS (Suggestions) that aid the end user to reach the destination.

Figure 2:
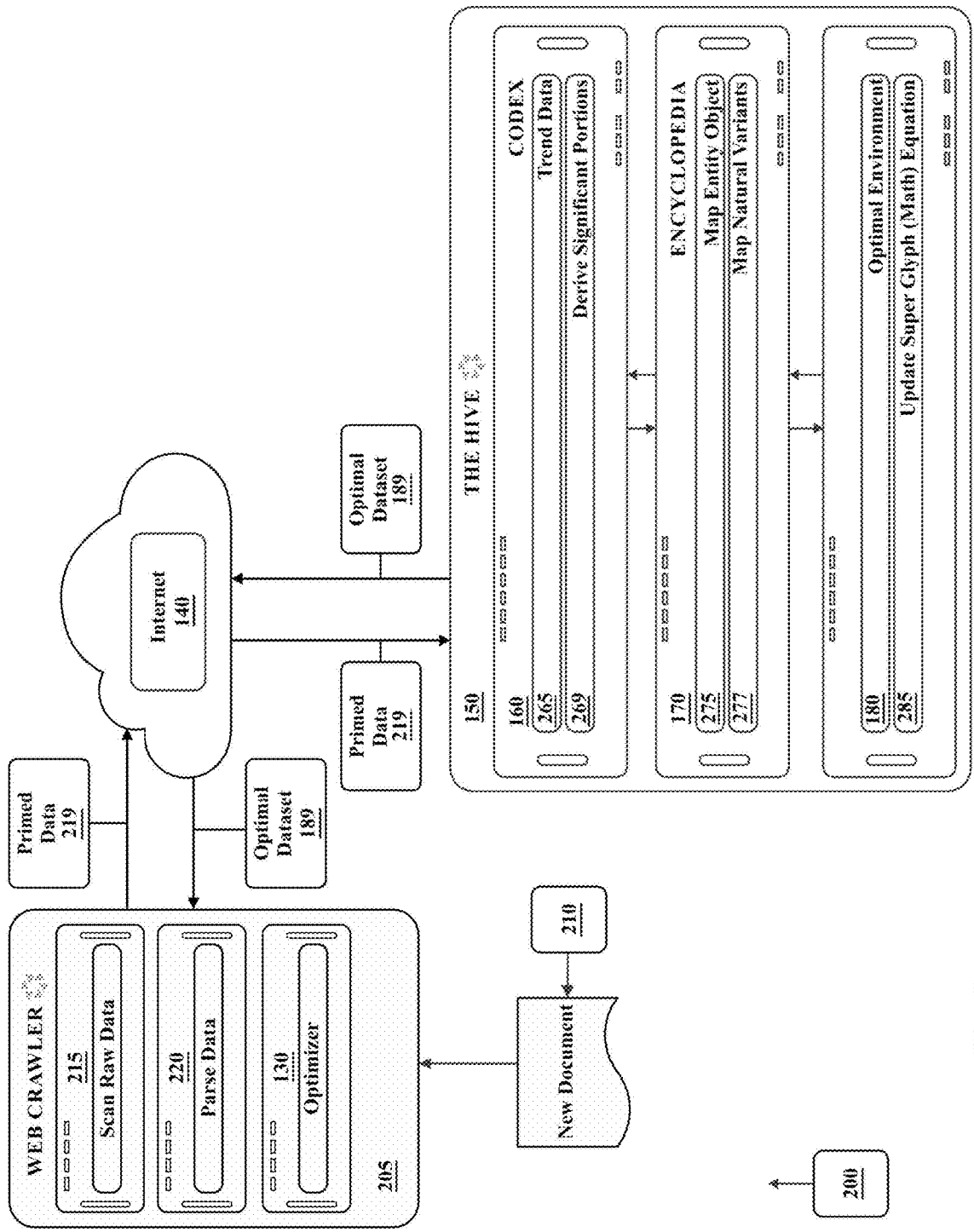
FIG. 2 presents a schematic diagram of an exemplary process for updating the Multilingual Human Knowledge Encyclopedia.

FIG. 2 The Web Crawler sub system 200 continuously monitors and scans changes in the virtual environment in this case the Internet 140, coordinating Web Crawlers 205, to identify New webpages or documents 210 and then using an Optimizer program 130 to parse data 220 using rules of grammar and semantics to process raw data 215, into primed data 219 comprehensible for human monitoring and evaluation and sends the primed data to the HIVE 150. U.S. Pat. No. 8,386,456 teaches the HIVE 150 continuously updates the Codex 160 with the primed data 219 to determine patterns of behavior or trend data (or Interest Graph) 265 fluctuations that identify changes in the virtual environment and then derives significant portions 269 of the content to update in real time the Encyclopedia 170 and map entity objects 275 and subordinated layer of refinement natural variants 277. For each mapped (feature attributes and alternative suggestions) entity object 275, 277 belonging to a layer of refinement, the human knowledge encyclopedia 170 updates the optimal environment 180 and super glyph mathematical equation 285 is used to select the output that is sent to the end user.

Figure 3:
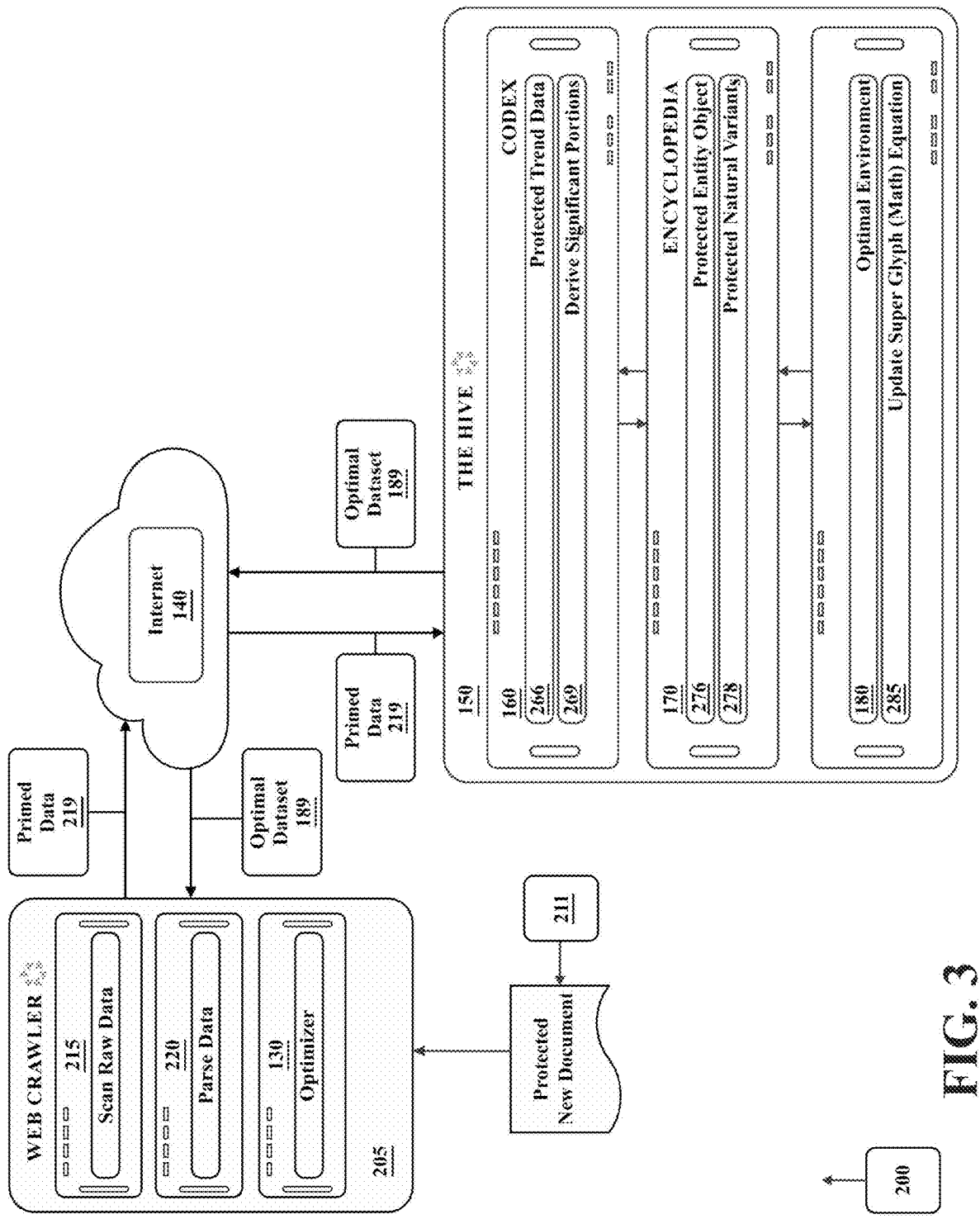
FIG. 3 presents a schematic diagram of an exemplary process for updating the Surveillance Human Knowledge Encyclopedia.

FIG. 3 The Web Crawler sub system 200 continuously monitors and scans changes in the virtual environment or the Internet 140, coordinating a plurality of Web Crawlers 205, to identify protected new webpages or documents 211 and then using an Optimizer 130 parse data 220 using rules of grammar to process and organize raw data 215, into primed data 219 comprehensible for human monitoring and evaluation and sends the primed data to the Hive 150 to determine patterns of behavior or protected trend data 266 fluctuations to identify changes in the virtual environment. Then derives significant portions 269 of the content to update in real time the Encyclopedia 170 and map protected entity objects 276 and subordinated layer of refinement protected natural variants 278. For each protected mapped entity object 276, 278 belonging to a layer of refinement the human knowledge Encyclopedia 170 updates the corresponding optimal environment 180 and super glyph map equation 285 used to derive the output that is sent to the end user.

Figure 4:
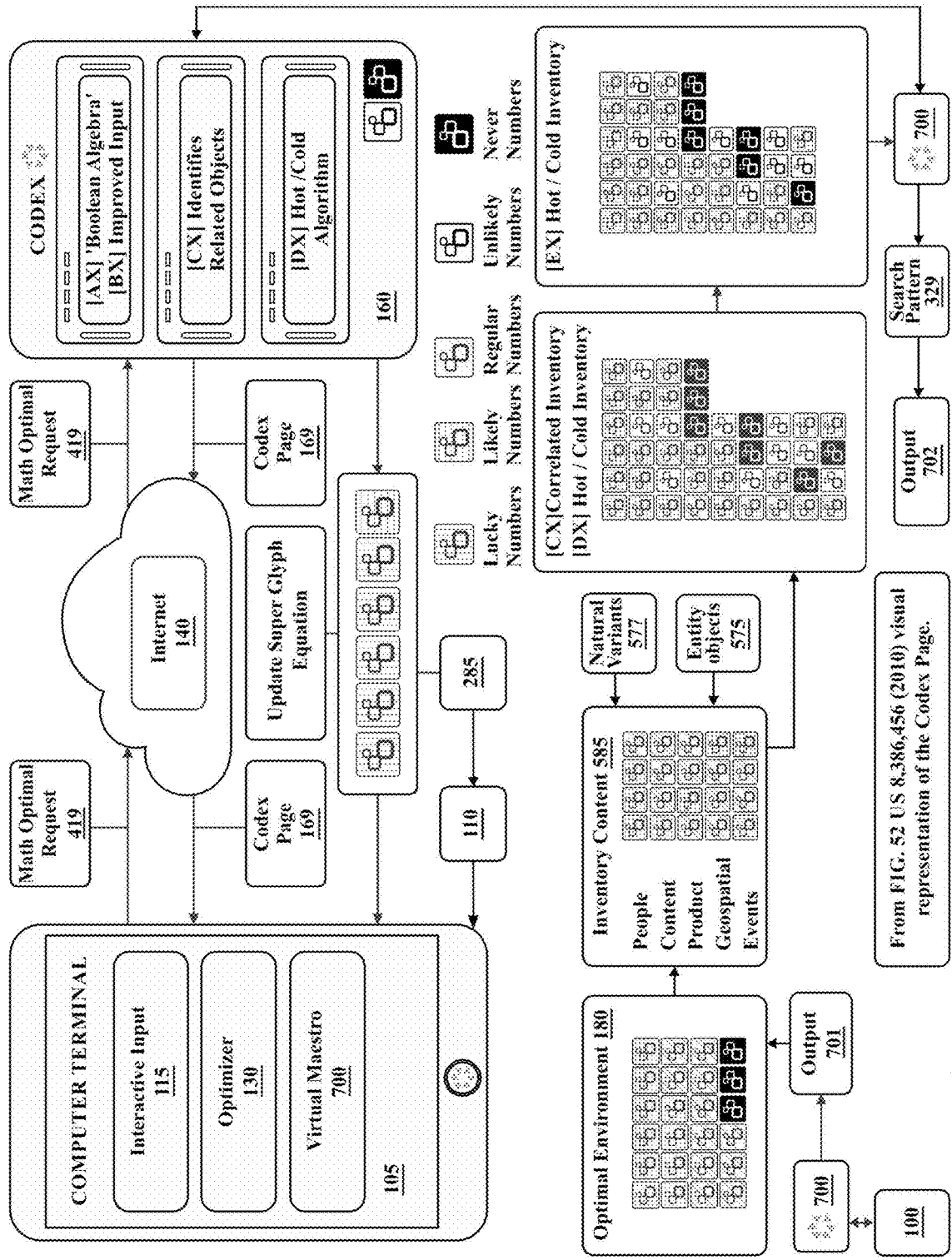
FIG. 4 presents a schematic diagram of Virtual Maestro transforming input and mapping Entity object.
Figure 5:
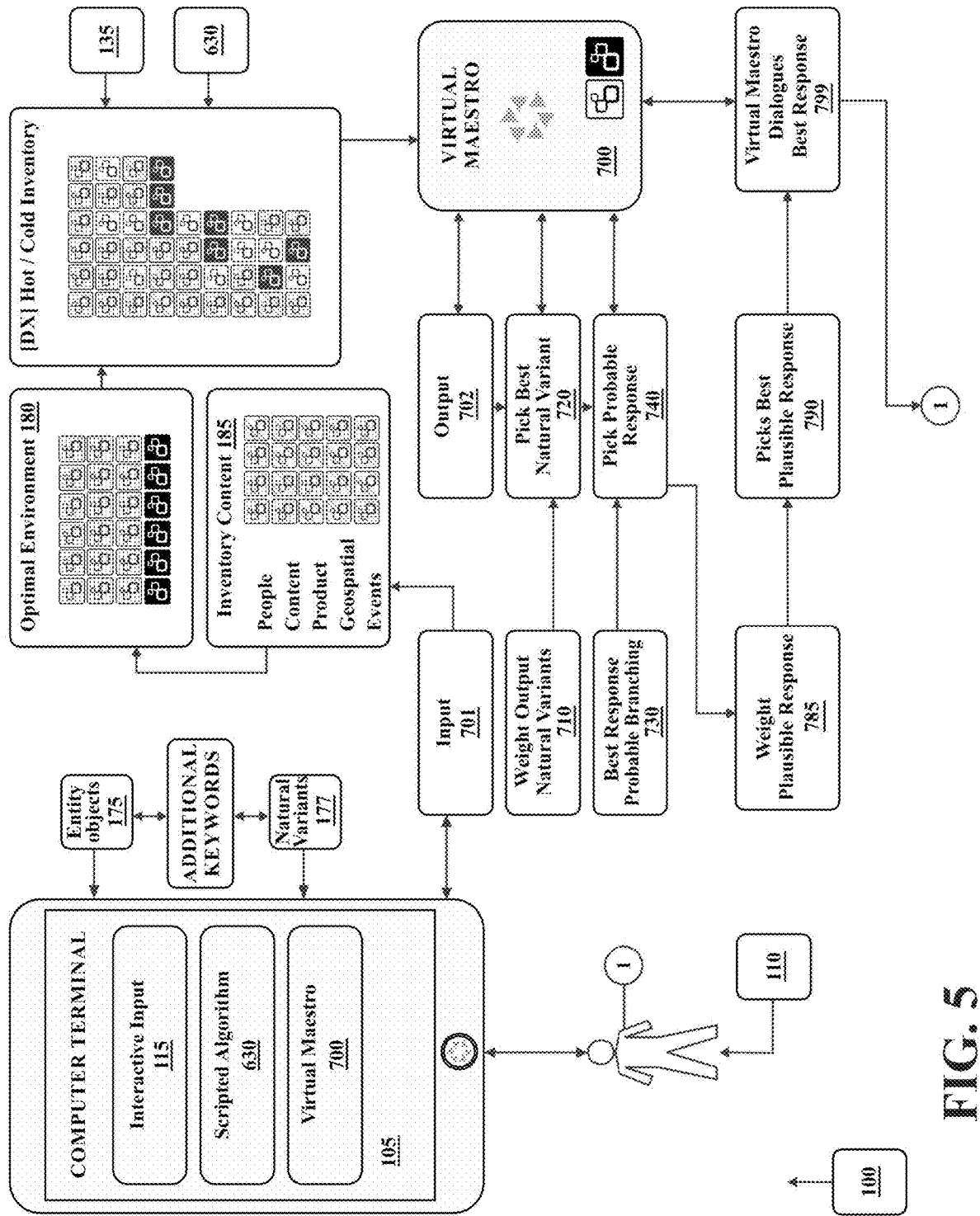
FIG. 5 presents a schematic diagram of exemplary Virtual Maestro proactively dialogues.

FIG. 4 and FIG. 5 teaches how the end user computing device or Virtual Maestro 700, continuously scans and gathers information from the virtual environment, and engages in a scripted dialogue with the end users, as it understands and is able to interact proactively thanks to the simulation input environmental bitmaps using the three samples approach is able to update an inverse ad hoc query as follows:

(A) Monitoring Learns, helps, assists and teaches how to find something specific.

(B) Reactive Smart input 4 independent variables by removes confounding elements.

(C) Proactive Personal input 5 independent variables and makes the user decision.

(D) Dialogue Direct input 6 independent variables engages in a dialogue as if alive.

FIG. 4 Virtual Maestro transforms input and maps Entity objects: The Hive 150 based on the math optimal request 419 trending and monetary values of the probabilistic spatial environment map the commercial Entity Objects 575, and Natural Variants 577, to generate commercial value consolidated Inventory Control 585. Intertwining ideas and concepts with gain factoring relevancy and attenuating irrelevancy and weighting simulation input or commercial levels of satisfaction (needs) and interest (wants), demographic and geospatial data aiding the end user reach the final destination. For each single request the end user computing device or Virtual Maestro 700 continues to update the Super Glyph (Mathematical) Equation 285 as the user continues to select Inventory Content 185 command instructions and dynamically measures a plurality of optimal environments as follow: 1st: determines if a new search occurs, if yes the previous search is over, and the search process starts from scratch. Otherwise the following dynamic calculations occur: [CX] correlates 'Related Objects' belonging to the Input probabilistic spatial environment 701 and creates a dataset of commercialized Entity objects 575 and Natural Variants 577 offered as ADDITIONAL KEYWORDS that aid the end user to reach the destination.

$2^{nd}$ performs: [DX] Hot/Cold algorithm of the related objects and identifies Regular, Likely and Lucky Glyphs variables that significantly improve a search pattern. 3rd: [EX] Cherry picks the top probable combination from Inventory Content 185 from the Input probabilistic spatial environment 701. 4th: analyzes each "as if the user has selected a particular" Codex Page 169 to enable data mining discovering. 5th: The Scripted Algorithm 630 correlates each Codex Page 169 and weights the Commercial Inventory Content 185. 6th: Virtual Maestro 700 continues processing the end user's simulation input until a reaching combination that yields the destination.

FIG. 5 Virtual Maestro proactively dialogues executing a set of informatics by the Scripted Algorithm 630 point of sale functionalities to determine the Best Probable Branching responses 730 and picks the Best Probable (Associative) Response 740 to communicate with the user 110 based on the interactive input 115 as follows:

(A) When Interactive Input Offers Natural Variants 750
(B) When Assisted Input Communicates Best Response 760
(C) When Smart Input Communicates Best Response 770
(D) When Personalized Input Communicates Best Response 780

FIG. 5 Virtual Maestro 700 or end user computing device using the Scripted Algorithm 630 and link database 800 to Weight Plausible Responses 785 and Picks Best Plausible (Transitive or Nth) Responses 790 and updates the Output 702 based on its own deductive reasoning checkmate decision of how to dialogue with the user 110 and now, based on the Nth or Best Plausible Response 790, the end user computing device or the Virtual Maestro 700 knows the final destination (input and output) and can dialogue 799 with the user 110 'as if alive' or sentient!

The scripted algorithm 630 measures the valid collection set of Inventory Content 185, (comprising of the simulation environment input (based on an individual, group of related people or trending data, demographics for advertisement means, or similarly same subject matter requests) entity objects 175 and associative and transitive collection of natural variants 177). For example, once an event occurs many people will ask the same question, or make comments using the Internet that the virtual maestro 700 will transform input to trending and demographic data. Based on the knowledge of a given event and their interaction about the same, the end user computing device or virtual maestro 700 can probabilistically determine a trending high frequency response (output) made to multiple users into a personalized dialogue to a specific individual.

Second Preferred Embodiment: Site Rank Codex Search Patterns

Figure 6:
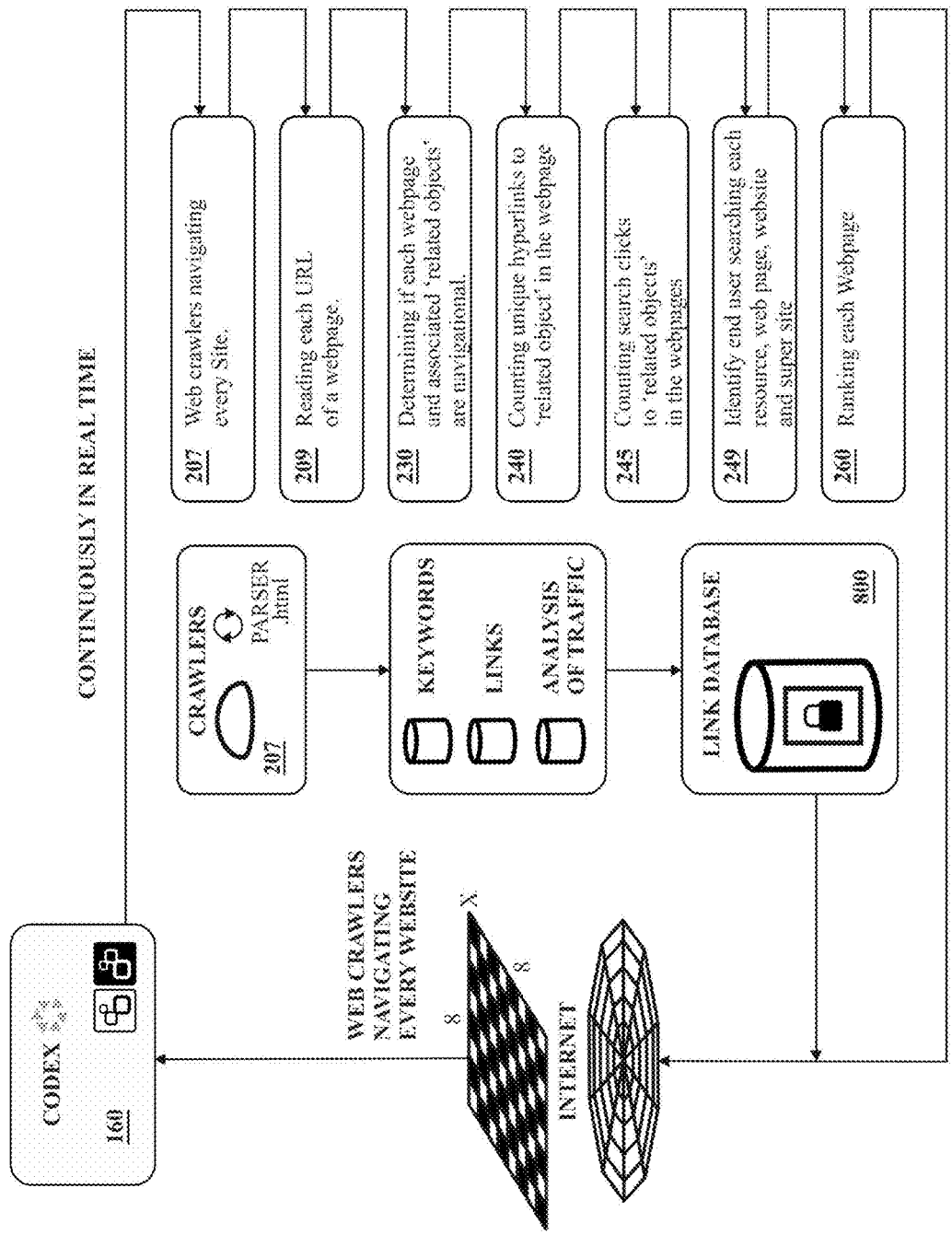
FIG. 6 presents a schematic diagram of an exemplary process for where a Codex continuously replicates the Internet.

FIG. 6 Codex 160 continuously replicates, scans, scrubs, filters and distills data from the Internet and then updates 800 the link database with statistics of each resource, web page, website and supersite, and whether they are navigational or searchable. Determining unique source, non-duplicate, spam, viral and cookie trap content, and then parsing using rules of semantics each sentence, paragraph structure, and then verifying the meta keyword tags reflect the structure and semantics of the content and are not useless to the search. As the Codex continuously spawns 207 crawlers to web navigates the Internet, 209 reach each URL of a webpage, 230 determining if each webpage and associated 'related objects are navigational and store the latest information of each object into 800 the link database. Each 'related object' or resource, webpage or page, website or site, and supersite are objects.

Web crawlers 207 count unique incoming hyperlinks based on valid navigational URL (Uniform Resource Locator), and request Codex 160 data warehouses, for historical statistics 245 measuring traffic patterns and unique search clicks to URL belonging to a common denominator Website and Supersite. The Link Database 800 stores unique end user, virtual maestro, resources or 'related objects', web pages, websites or sites and super sites to determine SQL unique values when creating a table and SQL distinct values when updating a table. The Codex 260 ranks each supersite, site, and webpage with a probability (0.00 irrelevant to 1.00).

Figure 7:
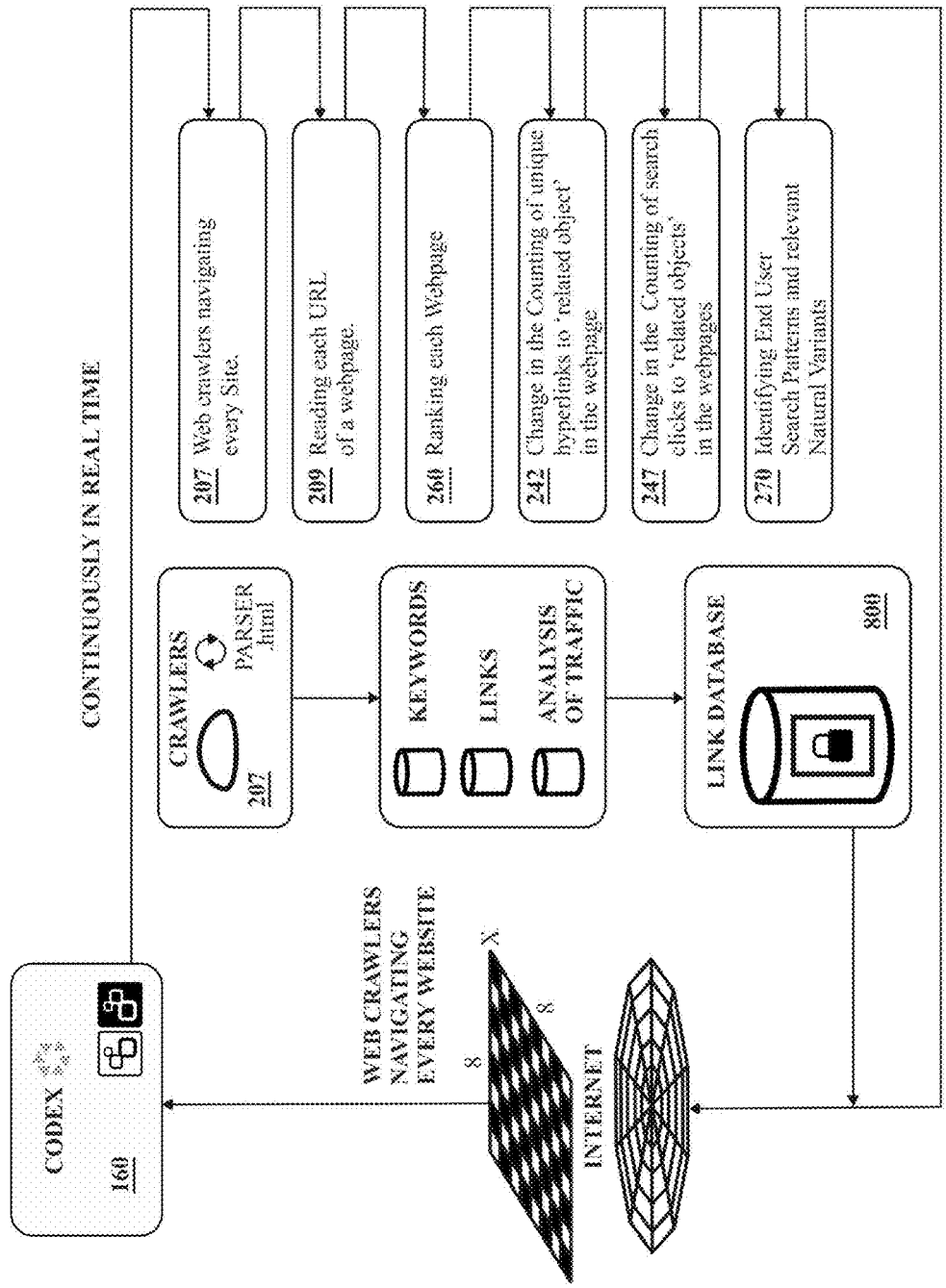
FIG. 7 presents a schematic diagram of an exemplary process where Codex updates the link database as web crawlers navigating every webpage.

FIG. 7 Codex 160 updates 800 the link database as web crawlers 207 navigate every webpage. U.S. Pat. No. 7,908, 263 teaches Artificial Intelligence Spiders or web crawlers 207 "consists of automated programs that are designed to continuously gather, distill and analyze the environment in real time. The program after gathering information identifies new content to the known environment. For each page the program determines if the file has been deleted, moved, updated or is new", then reads and parses documents to determine "SIGNIFICANT Data" that is deemed "NEW Data" or is identified as a change or "UPDATE Data" or modification of the URL as "MODIFY or MOVE" or the removal of an URL or "DELETE" when compared to the last version a web crawler navigated the webpage into 800 the link database. Codex 160 then 260 Ranks each webpage based on the "SIGNIFICANT DATA", on 242 the change in the count of distinct hyperlinks to 'related object' in the webpage and 247 change in the frequency of search clicks to 'related objects' in the webpages. Then requests the 160 Codex, to identify 249 each user searching each resource, webpage, website and super site, and identify navigational 270 user Search Patterns and relevant Natural Variants. Upon detecting "SIGNIFICANT Data" deemed and stored as comprehensible human monitoring and evaluation data into 800 the link database. "SIGNIFICANT Data" or significant portions of the web page is 269 is not included.

Figure 8:
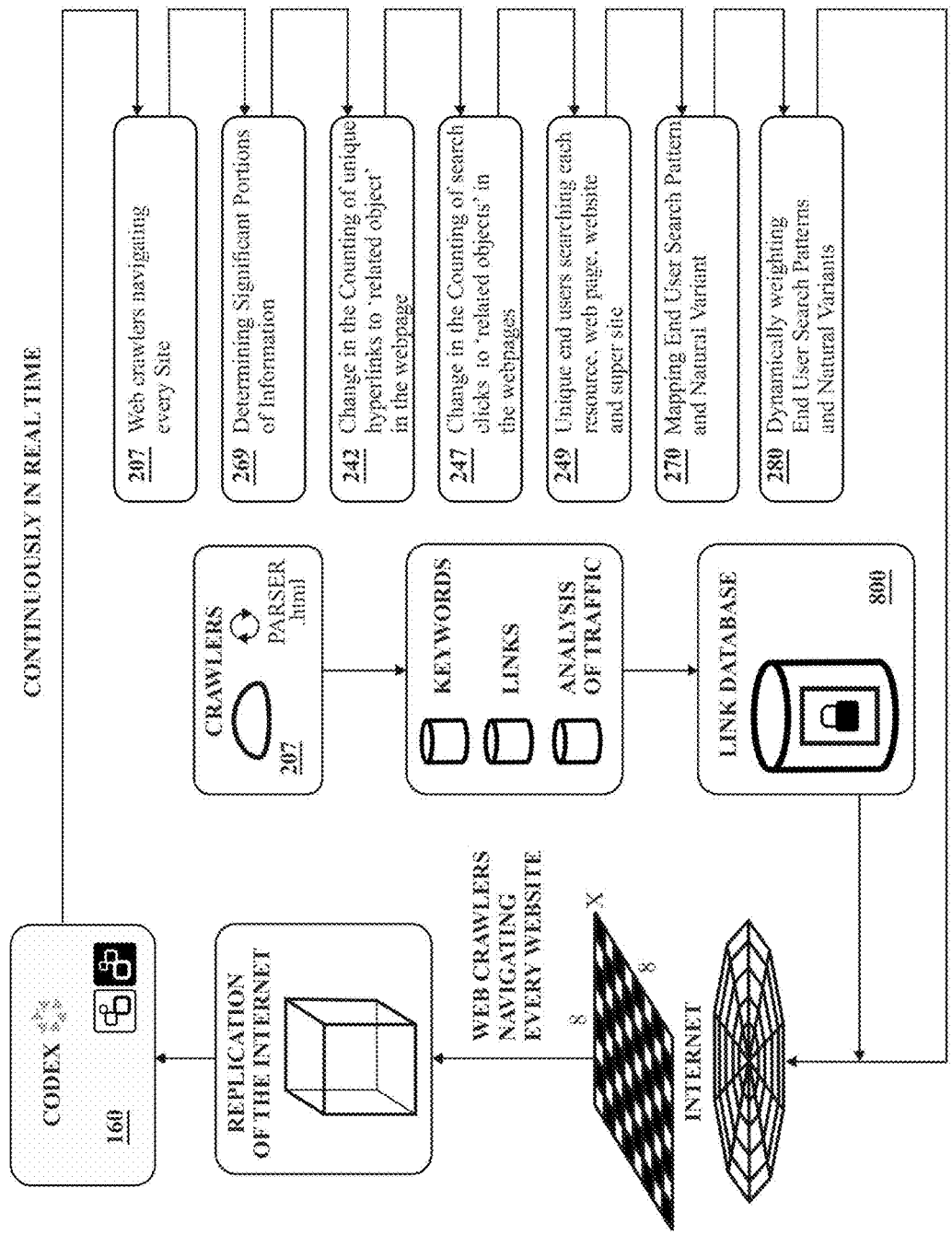
FIG. 8 presents a schematic diagram of an exemplary process where Codex updates the link database as web crawlers navigating every website.

FIG. 8 Codex 160 updates 800 the link database as web crawlers 207 navigating every Site. U.S. Pat. No. 7,908,263 teaches the Artificial Intelligence Spiders or web crawlers 207 "consists of automated programs that are designed to continuously gather, distill and analyze the environment in real time. The program after gathering information identifies new content to the known environment. For every Site the program determines if a file has been deleted, moved, updated or is new", then reads and parses documents to determine "SIGNIFICANT Data" that is deemed "NEW Data" or is identified as a change or "UPDATE Data" or modification of the URL as "MODIFY or MOVE" or the removal of an URL or "DELETE" when compared to the last version a web crawler navigated the webpage into 800 the link database. Codex 160 then 260 Ranks each webpage based on the "SIGNIFICANT DATA", on 242 the change in the count of distinct hyperlinks to 'related object' in the webpage and 247 change in the frequency of search clicks to 'related objects' in the webpages. Then requests the 160 Codex, to identify 249 each user searching each resource, webpage, website and super site, and identify navigational 270 user Search Patterns and relevant Natural Variants. Upon detecting "SIGNIFICANT Data" deemed and stored as comprehensible human monitoring and evaluation data into 800 the link database, in order to adjust the values of the indices and thus updating real time responses. Detecting, cleansing and determining, "SIGNIFICANT Data" 269 or significant portions of data in the webpage is the primary objective of web navigating a Site 207, 209.

Figure 9:
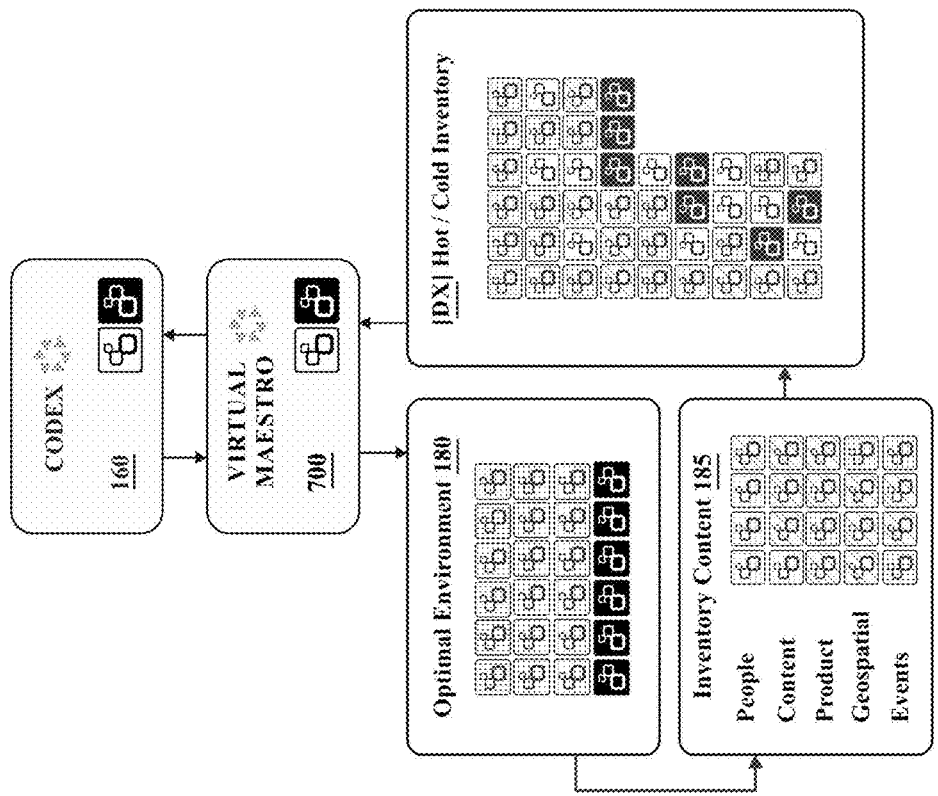
FIG. 9 presents a schematic diagram of an exemplary process for maintaining End User and Virtual Maestro Historical Profiles.

FIG. 9 End User and Virtual Maestro Historical Profiles. The 160 Codex and 700 Virtual Maestro program for each search pattern determines 180 an optimal environment and the 185 inventory content of 'related objects' such as people, keywords in the content, products such as audio, video, and shopping cart items, geospatial such as addresses, ANI (or telephones) and events such as news, financial, and sporting trending monitoring and evaluation indicia, and then based on the [DX] Hot/Cold Inventory sample update the historical end user profile for each valid Codex Page hierarchical set of corresponding human monitoring and evaluation indicia, which in turn the virtual maestro stores to be able to track as significant inventory content 185.

Figure 10:
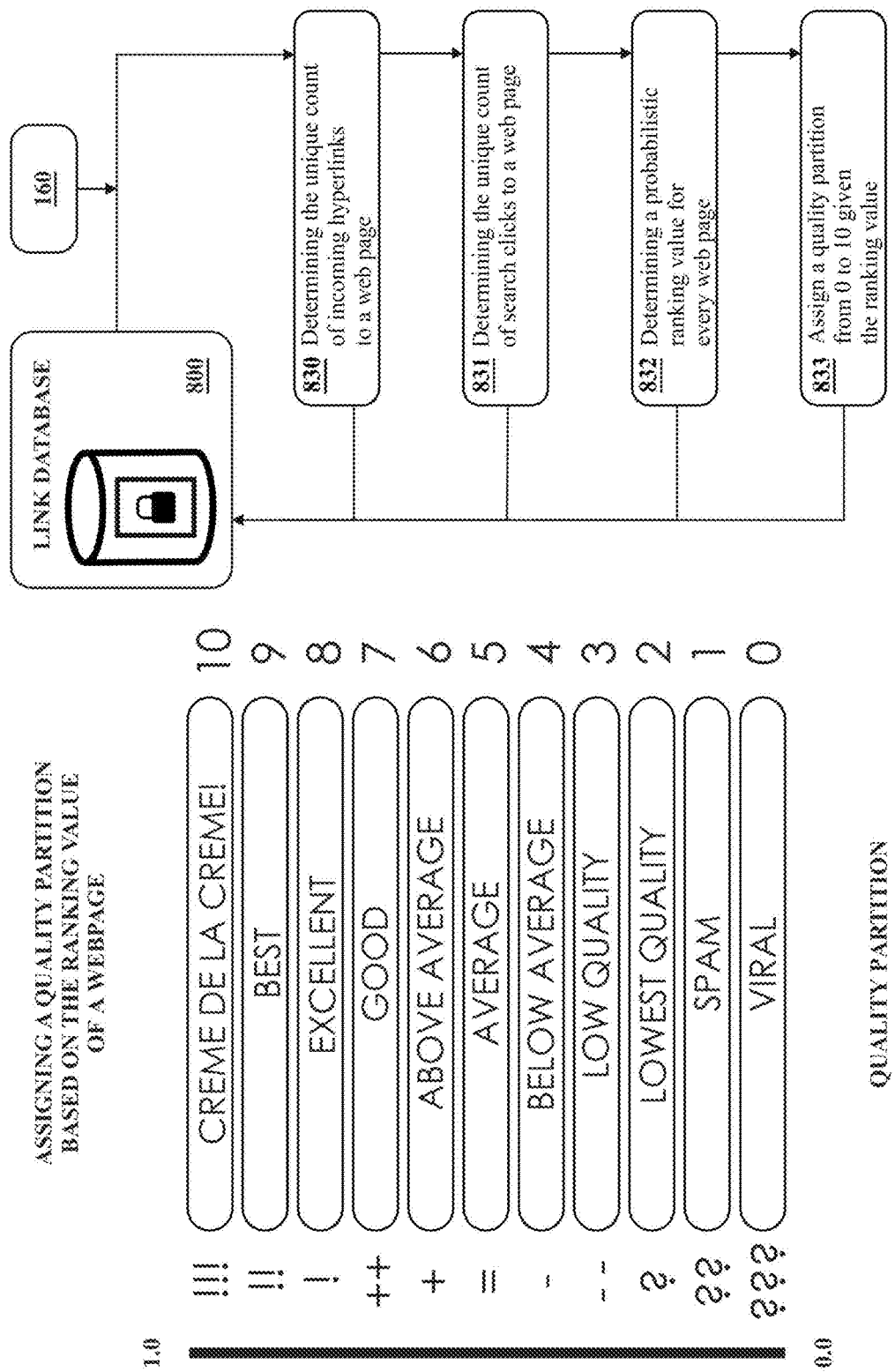
FIG. 10 presents a schematic diagram of an exemplary process where Codex updates every End User and Virtual Maestro Profile.

FIG. 10 Assigning Quality partition based ranking value of a Webpage, the 160 Codex continuously updates the 800 Link Database upon 830 determining the unique count of incoming hyperlinks to a web page and 831 determining the unique count of search clicks to a web page in order to 832 determining a probabilistic ranking value for every web page and then 833 assign a quality partition from 0 to 10 given the webpage ranking value.

Figure 11:
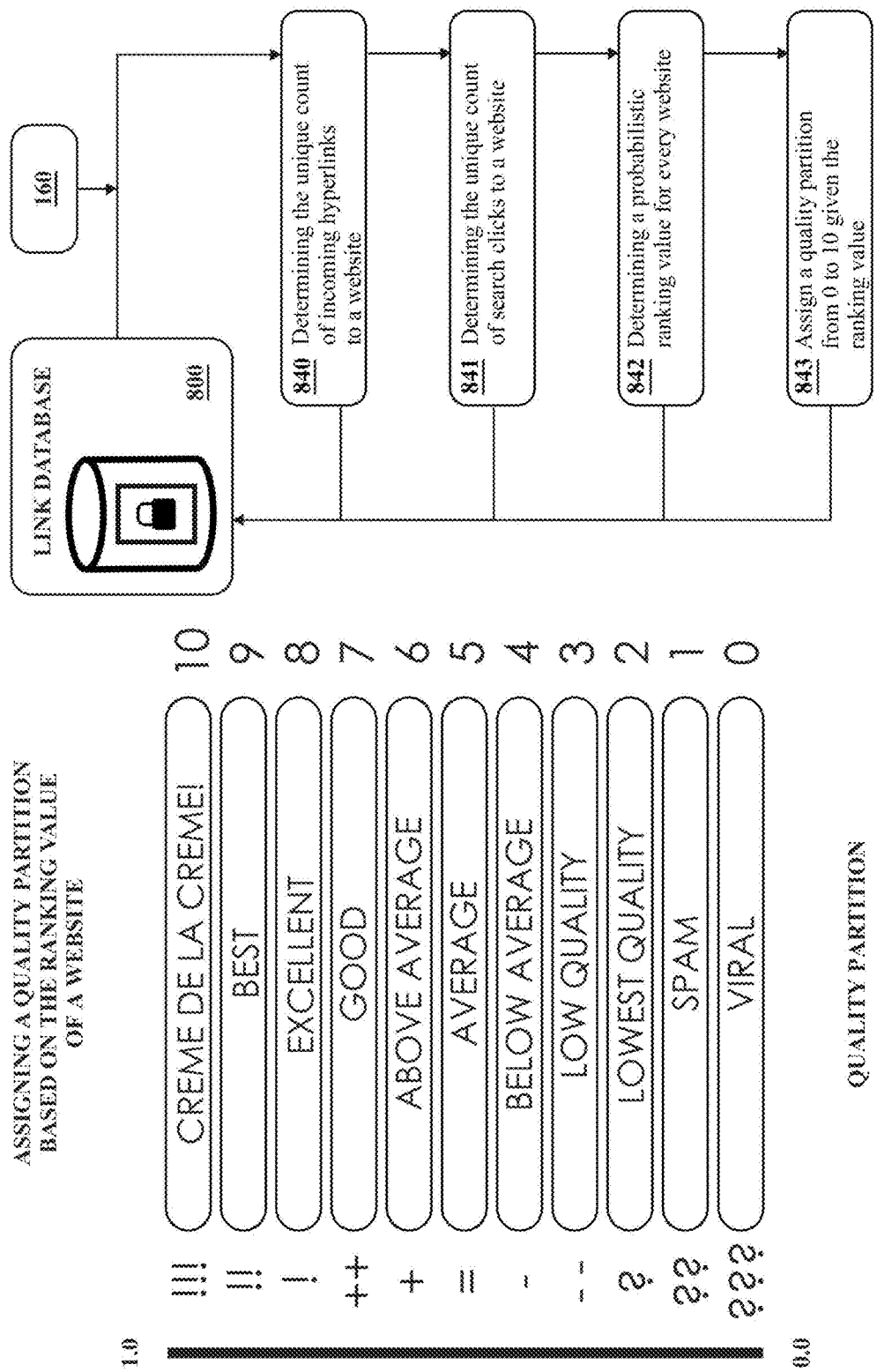
FIG. 11 presents a schematic diagram of an exemplary process where Codex continuously updates each webpage with the link database.

FIG. 11 Assigning Quality partition based ranking value of a Website, the 160 Codex continuously updates the 800 Link Database upon 840 determining the unique count of incoming hyperlinks to a web page and 841 determining the unique count of search clicks to a web page in order to 842 determining a probabilistic ranking value for every web page and then 843 assign a quality partition from 0 to 10 given the website ranking value.

Figure 12:
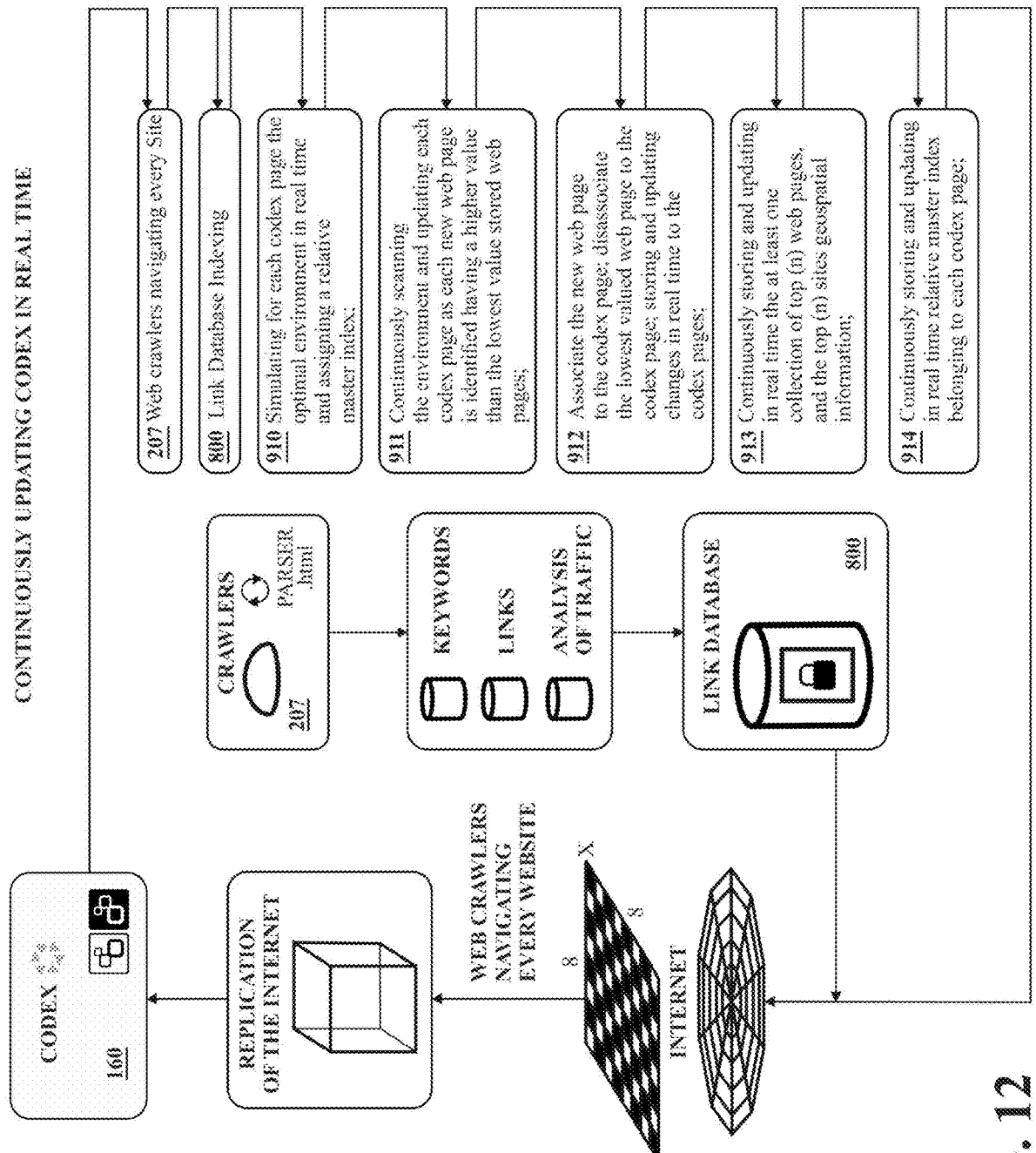
FIG. 12 presents a schematic diagram of an exemplary process where Codex continuously updates each website with the link database.

FIG. 12 Codex updating each codex page in real time trending data, The Codex 160 upon updating the Link database 800 performs the following tasks: $1^{st}$: 801 simulating for each codex page the optimal environment in real time and assigning a relative master index. $2^{nd}$: 802 continuously scanning the environment and updating each codex page as each new web page is identified having a higher value than the lowest value stored web pages. $3^{rd}$: 803 associates the new webpage and 'related objects' to the codex page and disassociate the lowest valued web page to the codex page and stores and updates changes in real time to the codex pages. $4^{th}$: 804 continuously stores and updates in real time the at least one collection of top (n) web pages, and the top (n) sites geospatial information and $5^{th}$: 805 continuously stores and updates in real time relative master index belonging to each codex page and then updates all the profiles.

Figure 13:
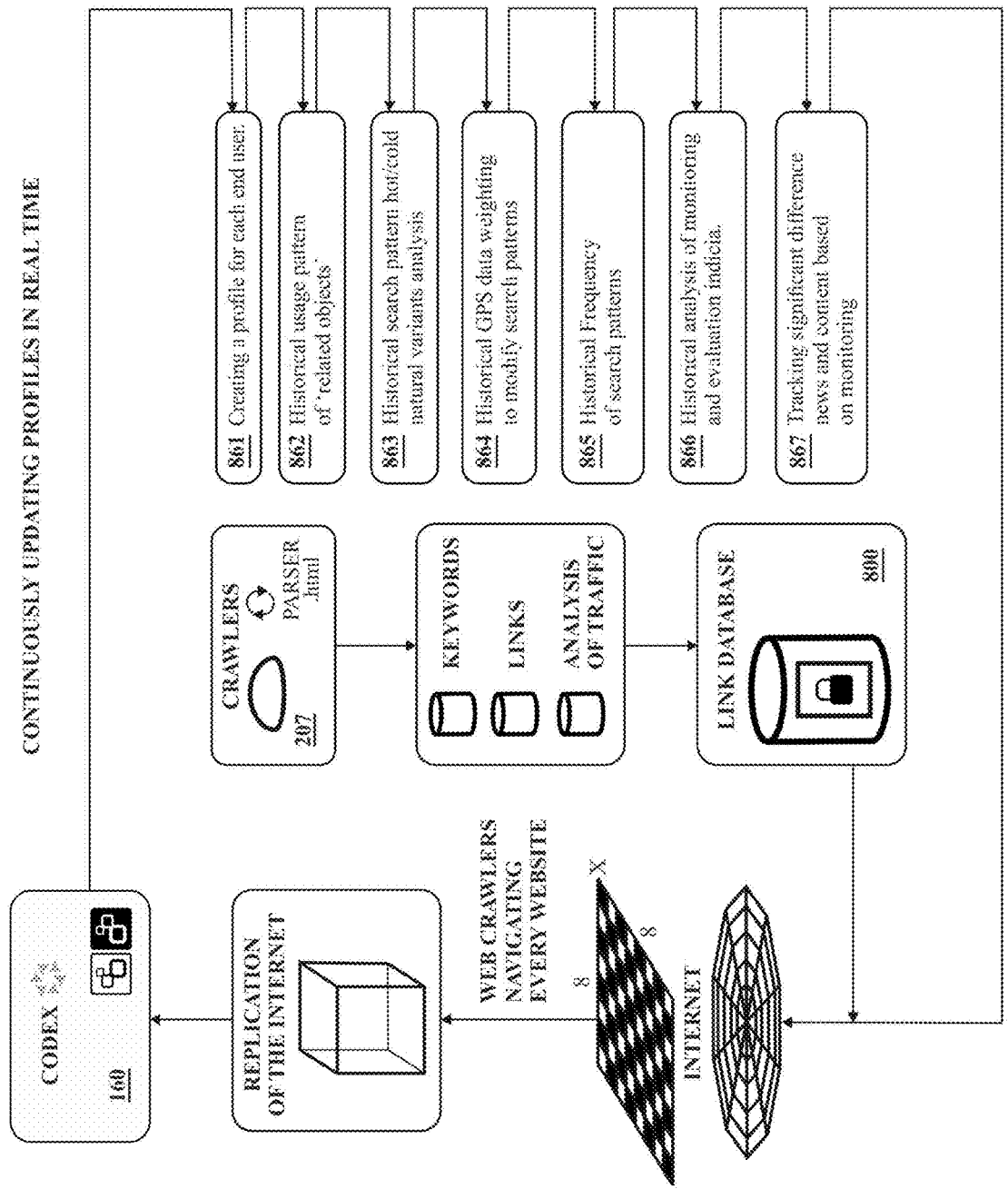
FIG. 13 presents a schematic diagram of an exemplary process where Codex continuously updates profiles with the latest trending data.

FIG. 13 Codex continuously updating profiles with the latest trending data. The Codex 160 upon finding trending data performs the following: $1^{st}$: 821 After each search updates the profile for each end user and virtual maestro. $2^{nd}$: 822 calibrates historical usage pattern of 'related objects'. $3^{rd}$: 823 weights historical search pattern hot/cold natural variants analysis. $4^{th}$: 824 updates historical GPS data weighting to modify search patterns. $5^{th}$: 825 determines historical frequency of search patterns. $6^{th}$: 826 performs historical analysis of monitoring and evaluation indicia. Finally: 827 Tracks significant difference news and content based on monitoring to keep all profiles current.

Figure 14:
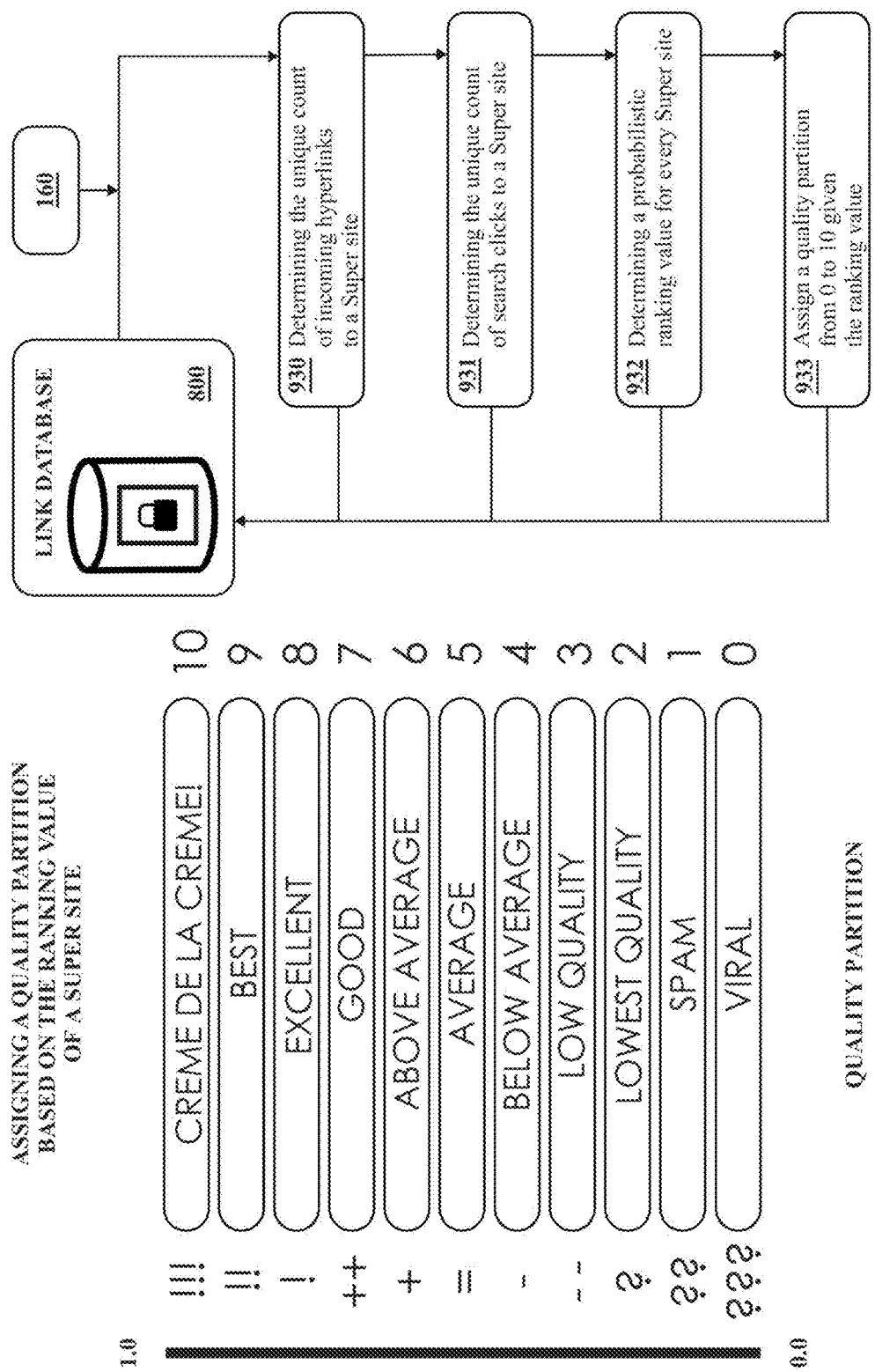
FIG. 14 presents a schematic diagram of an exemplary process where Codex updates the link database as web crawlers navigating every supersite.

FIG. 14 Assigning Quality partition based ranking value of a Supersite, the 160 Codex continuously updates the 800 Link Database upon 840 determining the unique count of incoming hyperlinks to a supersite and 841 determining the unique count of search clicks to a supersite in order to 842 determining a probabilistic ranking value for every supersite and then 843 assign a quality partition from 0 to 10 given the supersite ranking value.

Figure 15:
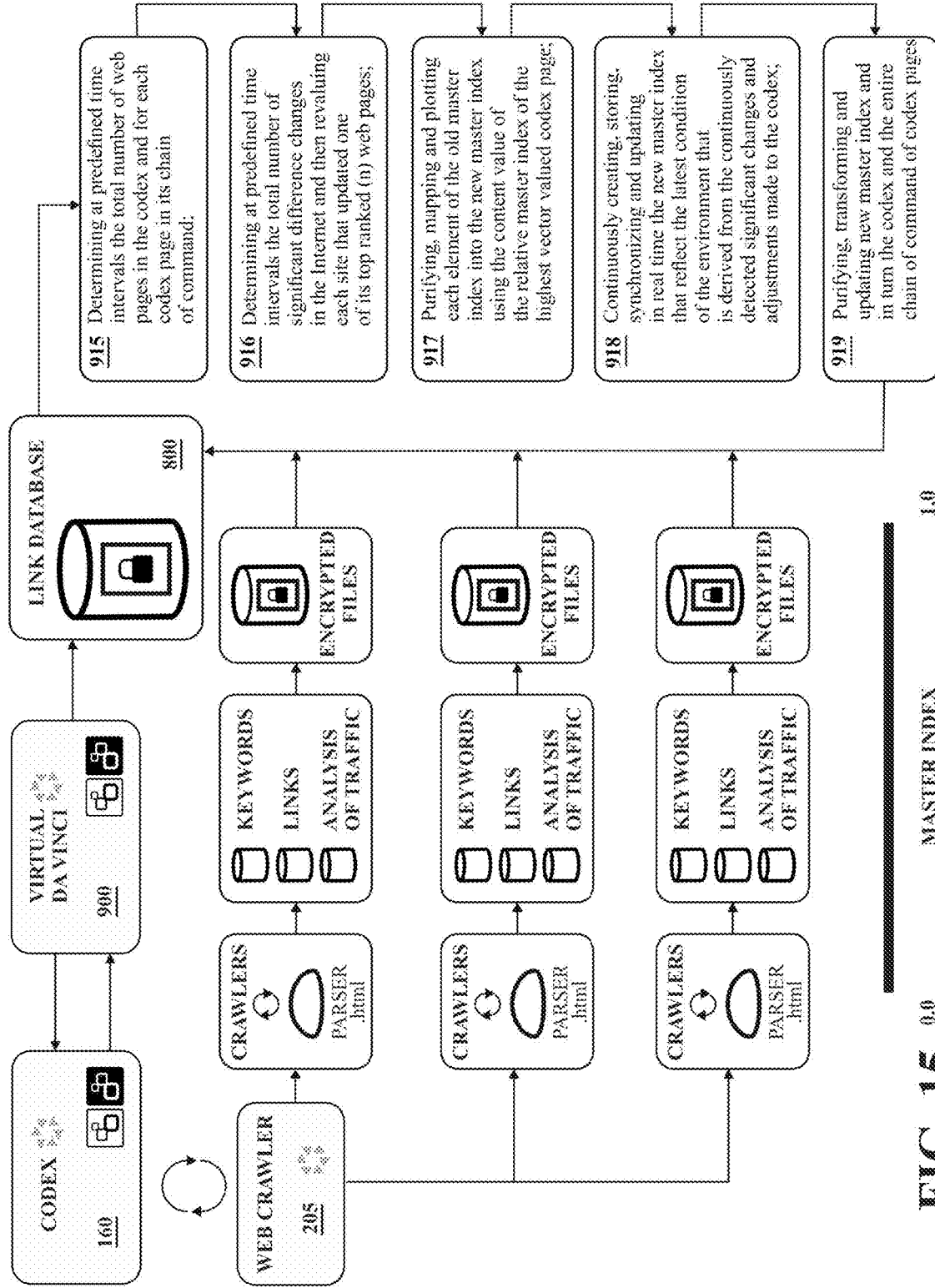
FIG. 15 presents a schematic diagram of an exemplary process where Codex parses news, financial exchanges, social media interactions and trending data as human monitoring and evaluation indicia to update every supersite.

FIG. 15 Codex parses news, financial exchanges, social media interactions and trending data as human monitoring and evaluation indicia to update every supersite upon performing the following task: 1st: 806 determining at predefined time intervals the total number of web pages in the codex and for each codex page in its chain of command. 2nd: 807 determining at predefined time intervals the total number of significant difference changes in the Internet and then revaluing each site that updated one of its top ranked (n) web pages. 3rd: 808 cleansing or purifying data, mapping and plotting each element of the old master index into the new master index using the content value of the relative master index of the highest vector valued codex page. 4th: 809 continuously creating, storing, synchronizing and updating in real time the new master index that reflect the latest condition of the environment that is derived from the continuously detected significant changes and adjustments made to the codex. 5th: 899 Cleansing or purifying data, transforming and updating new master index and in turn the codex and the entire chain of command of codex pages. Once the Codex 160 creates a new master index and has all the relevant codex pages chain of command relative master indices, 800 the link database is able to attenuate using join SQL queries to remove from calculation websites and super site that are below the first threshold, the marks anything that fails the test as irrelevancy. Finally, SQL JOIN queries 'cherry picking' from the output websites and super site that are above the Nth threshold, the marks anything that passes the test as la crème de la crème or optimal website.

Figure 16:
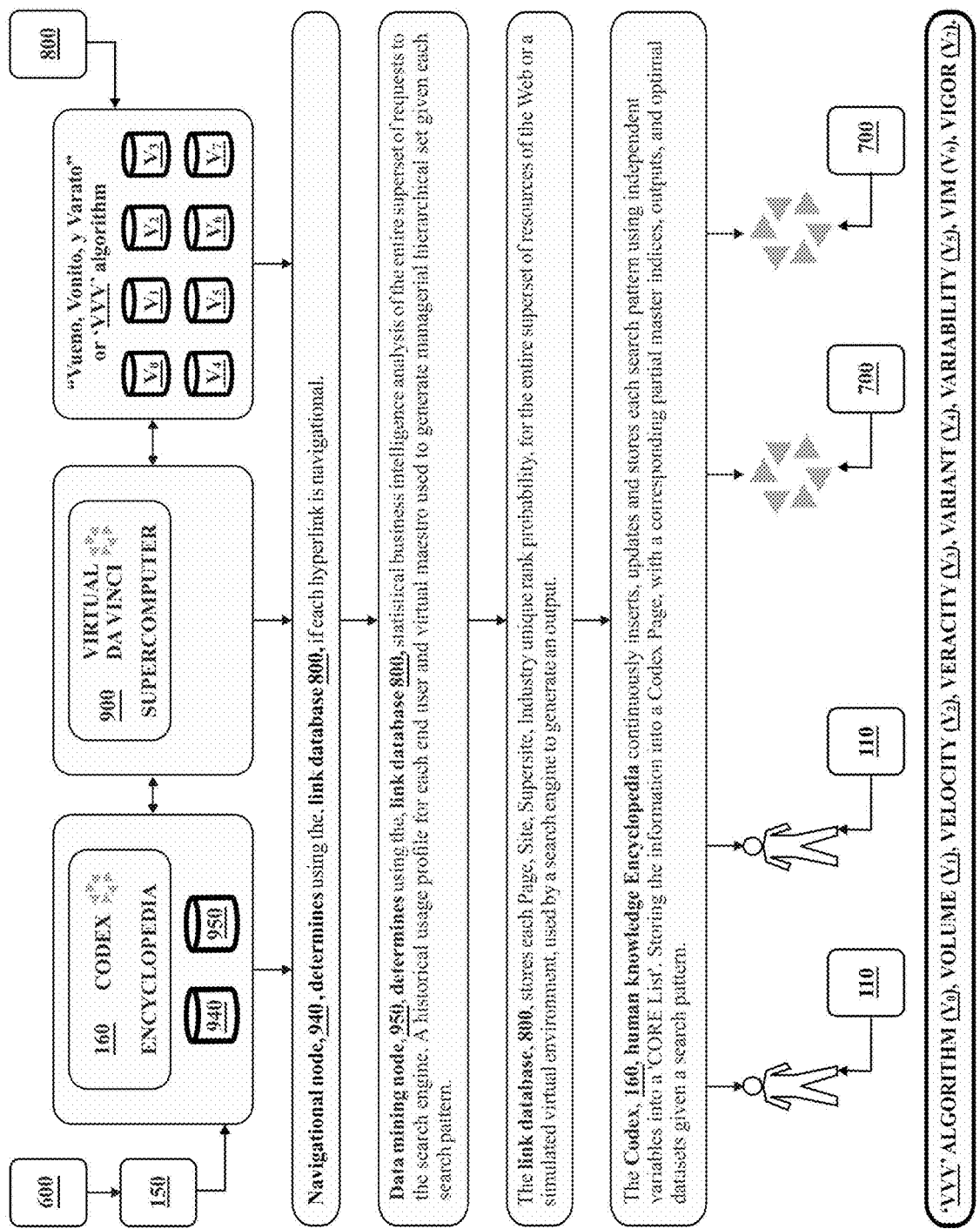
FIG. 16 presents a schematic diagram of an exemplary process of how Evolving System Big Data Indexing uses the ('VVV') algorithm.

Fourth Preferred Embodiment: Multivariate Analysis Replica Intelligent Ambient Evolving System FIG. 16 Evolving System Big Data Indexing using the ('VVV') algorithm. The 'Vueno, Vonito, Varato' algorithm improves the accuracy of the hot and cold algorithm given a search pattern vector (V). It is the object of the present invention to improve the HIVE, 150, into a Multivariate Analysis Replica Intelligent Ambience Evolving System, 600, continuously hosting in real time a plurality of end users 110, Virtual Maestros (artificial intelligence end user computing device) 700, a Codex supercomputer, 160, and Da Vinci Supercomputer program, 900 used to probabilistically weight and rank each webpage, site, supersite using Corporate_ID and Industry_ID.

The navigational node, 920, uses web crawlers to navigate each hyperlink. To those in the art a hyperlink is deemed to be navigational if the hyperlink is navigational, and if the web crawler politeness, parallelization, and security policies, with special emphasis concerning forbidden content that web crawlers interpret as a 'NO' to reach, and as such until the owner of the website permits its usage it is non-navigational.

The data mining node, 930, performs statistical business intelligence analysis of trending data, usage pattern of behavior and historical managerial hierarchical sets base on frequency of usage and unique users that are measured with demographics, commercial and financial information. Storing for each end user (input side) and virtual maestro end user computing device (output side) a profile used to generate managerial hierarchical set given each search pattern.

The link database, 800, stores each Page, Site, Supersite, Industry unique rank probability, for the entire superset of resources of the Web, used by a search engine to generate an output. The Codex 160, stores for each search pattern using independent variables performs at least 2 intermediate reductions approximations, and stores and/or updates the information into a Codex Page, with a set of corresponding partial master indices, outputs, and optimal datasets.

The Multivariate Analysis Replica Evolving System, 600 comprising of a plurality of Intelligent Component and Intelligent Data Warehouses in digital communication of the human knowledge encyclopedia, the Codex, 160. The amount of data is massive, the system 600 updates indices in real time, and the millions of high quality responses per second is deemed to be mission critical hardware and software intelligence ambience, that is further improved for each probabilistic spatial environment vector (V) with big data Indexing. The 'vueno, vonito and varato' (V0) algorithm simplifies the massive information by removing irrelevancy and combinations not deemed to be of high quality, so that a humanlike decision can be made.

Figure 17:
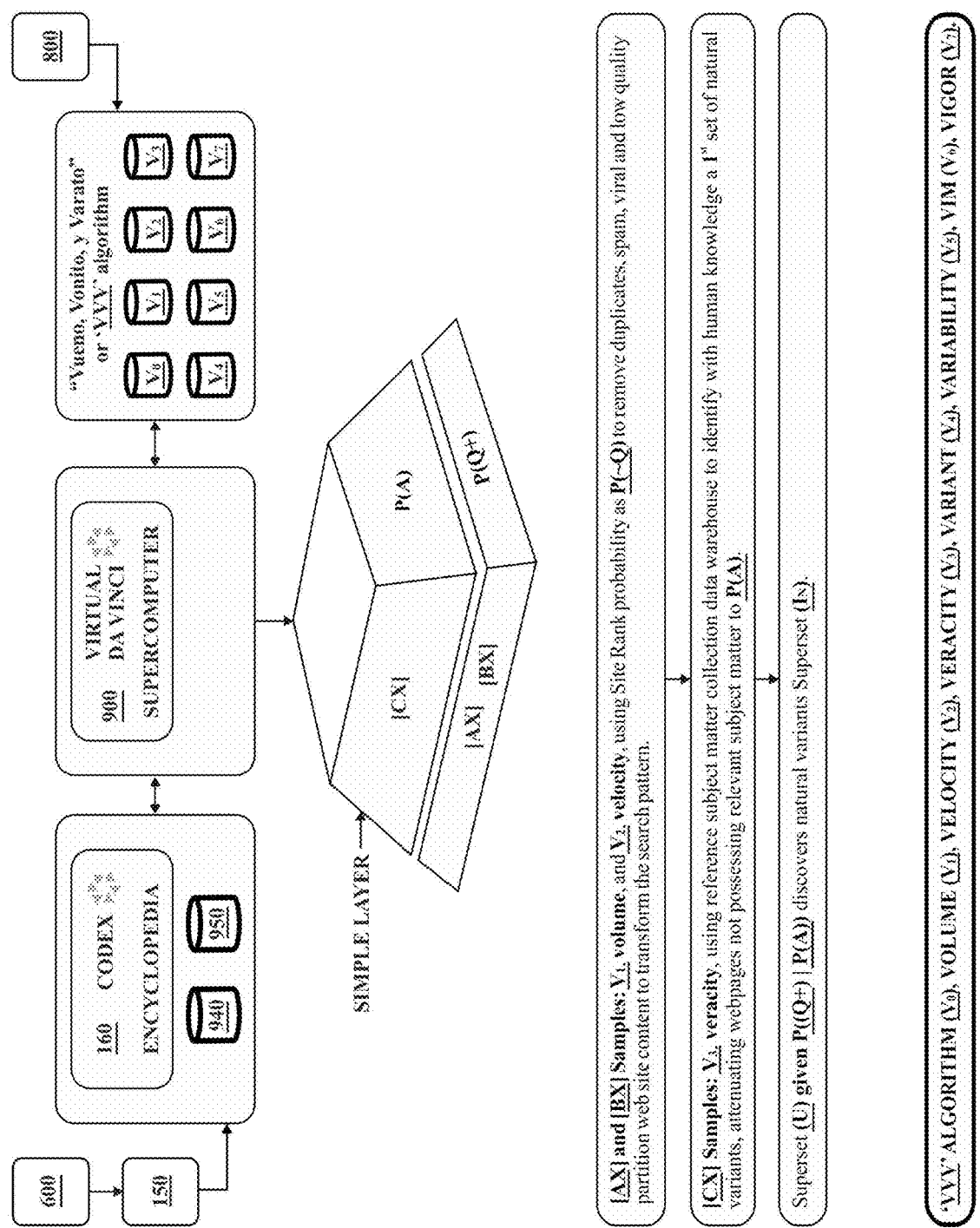
FIG. 17 presents a schematic diagram of an exemplary process of how Big Data Indexing ('WOW') algorithm uses Simple Subject Layer P(A)

FIG. 17 Big Data Indexing ('VVV') or (V0) algorithm using Simple Subject Layer P(A). It is the object of the present invention to improve the HIVE, 150, into a Multivariate Analysis Replica Evolving System Intelligent Ambience, 600, continuously hosting in real time a plurality of end users 110, Virtual Maestros (artificial intelligence end user computing device) 700, a Codex supercomputer, 160, and a Da Vinci Supercomputer program, 900 used to probabilistically weight and rank each webpage, site, supersite using Corporate_ID and Industry_ID. V0, the 'Vueno, Vonito, y Varato' algorithm first objective is to remove irrelevant webpages at incipiency.

First, V1, volume, and V2, velocity, the evolving system in real time searches the Internet environment with a search pattern mapping a searchable environment that is massive in size, and contains good, bad and ugly webpages. Using Site Rank probability as (~Q) to remove duplicates, spam, viral and low quality partition web site content to transform the search pattern from P(Q) to the conditional probability P(Q)|P(~Q) that improves the search pattern to P(Q+). It is the object of the present invention to improve the search pattern to P(Q+) representing a searchable environment absent of irrelevancy that becomes Superset (U) using [BX] Samples.

Second, V3, veracity, using reference subject matter collection data warehouse to identify with human knowledge a $1^{st}$ set of natural variants also referred to as $1^{st}$ set of key featured association to further improve P(Q+). It is the object of the present invention to improve the search pattern to P(Q+) representing a searchable environment into several parallel running Superset (IN), performing the first input set expansion of P(Q+), attenuating webpages not possessing relevant subject matter to P(Q+). Assigning, human knowledge conditional probability P(A), as the $1^{st}$ set of natural variants, using Da Vinci Supercomputer program, 900, big indexing subject matter simplifications. The simplified [CX] sample is the SQRT (searchable environment size) and weights using Site and Supersite rank values or probabilities to attenuate irrelevancy and plot each entity of the managerial hierarchy set.

[AX] and [BX] samples mapped P(Q+). It is the object of the present invention to improve the search pattern to P(Q+)|P(A)) by the Da Vinci Supercomputer program, 900, simplifications to transform P(A) for the $1^{st}$ set of natural variants as Superset (In) using [CX] Samples.

Figure 18:
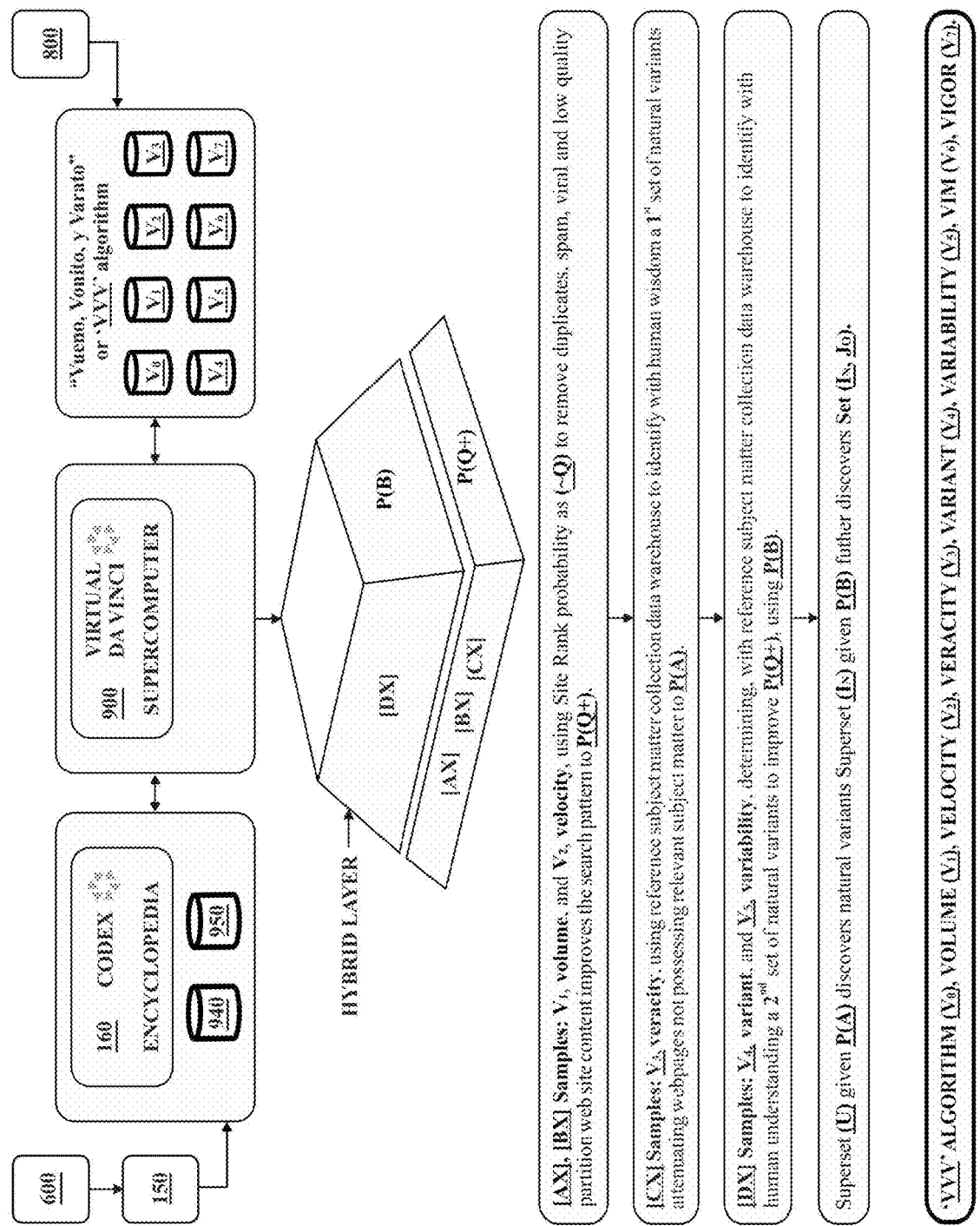
FIG. 18 presents a schematic diagram of an exemplary process of how Big Data Indexing ('VVV') algorithm uses Hybrid Subject Layer P(B)

FIG. 18 Big Data Indexing ('VVV') or (V0) algorithm using Hybrid Subject Layer P(B). Third, V4, variant, and V5, variability, the evolving system in real time searches the improved environment for each valid Superset (In) using [CX] Samples. Assigning, human wisdom conditional probability P(B), as the $2^{nd}$ set of natural variants, using Da Vinci Supercomputer program, 900, big indexing subject matter simplifications to further improve P(Q+). It is the object of the present invention to improve the search pattern to P(Q+) representing a searchable environment into several parallel running Set (IN, JO), representing the second input set expansion of P(Q+), attenuating webpages not having relevant subject matter to P(Q+). The simplified [DX] sample is the $2^{nd}$ SQRT(searchable environment size) and weights using Site and Supersite rank values or probabilities to attenuate irrelevancy and plot each entity of the managerial hierarchy set.

[AX] and [BX] samples mapped P(Q+). It is the object of the present invention to improve the search pattern to P(Q+)|P(A)) using the Da Vinci Supercomputer program, 900, simplifications to transform P(A) for the $1^{st}$ set of natural variants as Superset (IN) using [CX] Samples and to improve the search pattern to P((Q+)|P(A))|P(B)), simplifications to transform P(B) for the $2^{nd}$ set of natural variants as Set (IN, JO) using [DX] Samples.

Figure 19:
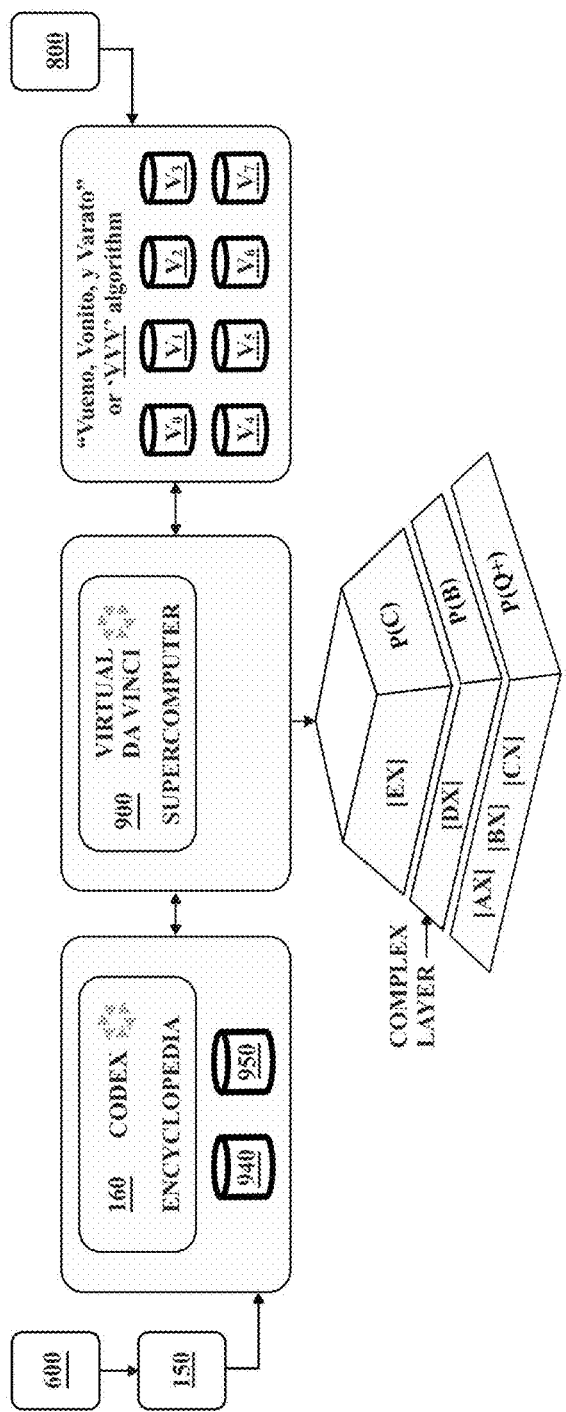
FIG. 19 presents a schematic diagram of an exemplary process of how Big Data Indexing ('VVV') algorithm uses Complex Subject Layer P(C)

FIG. 19 Big Data Indexing ('VVV') or (V0) algorithm using Complex Subject Layer P(C). Fourth, V6, vim, and V7, vigor, the evolving system in real time searches the improved environment for each valid Subset (IN, JO, KP) using [EX] Samples. Assigning, human understanding conditional probability P(C), as the $3^{rd}$ set of natural variants, using the Da Vinci Supercomputer artificial intelligence program, 900, big indexing subject matter simplifications to further improve P(Q+). It is the object of the present invention to improve the search pattern to P(Q+) representing a searchable environment into several parallel running Subset (IN, JO, KP), representing the third input set expansion of P(Q+), attenuating webpages not possessing relevant subject matter to P(Q+). The simplified [EX] sample is the 3rd SQRT (searchable environment size) and weights using Site, Supersite and Industry rank values or probabilities to further expand the managerial hierarchy set with Subset (IN, JO, KP) given a search pattern.

[AX] and [BX] samples mapped P(Q+). [CX] samples represent human knowledge $1^{st}$ set of natural variants as Superset (IN), [DX] samples represent human wisdom $2^{nd}$ set of natural variants as Set (IN, JO). It is the object of the present invention to improve the search pattern to P((Q+) |P(A))|P(B)|P(C)), Da Vinci Supercomputer, 900, simplifications transform [EX] Samples human understanding a $3^{rd}$ set of natural variants as Subset (IN, JO, KP).

Figure 20:
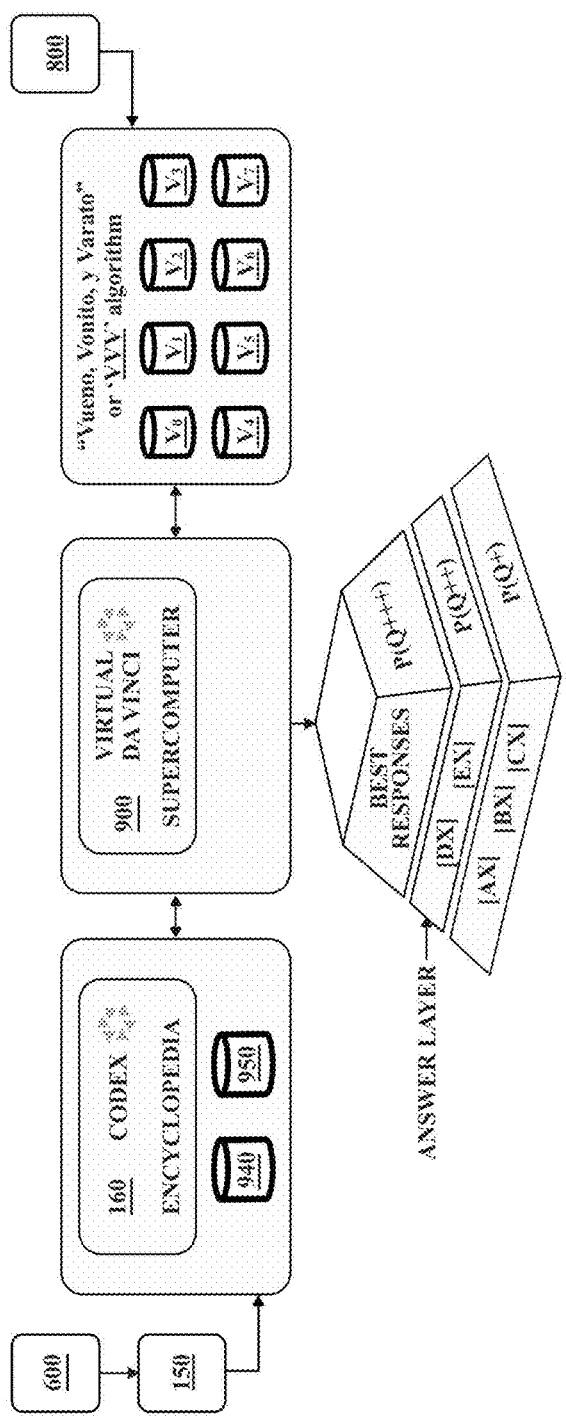
FIG. 20 presents a schematic diagram of an exemplary process of how Big Data Indexing ('VVV') algorithm uses Answer Subject Layer P(D)

FIG. 20 Big Data Indexing ('VVV') or (V0) algorithm using Answer Subject Layer P(D). [AX] and [BX] samples are mapped to modify P(Q) into P(Q+) by removing low quality site, duplicate, spam and viral content by generating an improved environment absent of garbage using the GIGO (garbage in garbage out) mantra. The evolving system performs the following intermediate reductions approximations: $1^{st}$, the [CX] sample to discover, using human knowledge a $1^{st}$ set of natural variants as Superset (IN). $2^{nd}$, the [DX] sample to discover, using human wisdom a $2^{nd}$ set of natural variants as subordinate (IN, JO) subordinate to Superset (IN). $3^{rd}$, the [EX] sample to discover, using human understanding a $3^{rd}$ set of natural variants as Subset (IN, JO, KP) subordinate to Set (IN, JO).

It is the object of the present invention to use the 'Vueno, Vonito, y Varato' or ('VVV') or (V0) algorithm to analyze the content of each resources belonging to a valid webpage then [Nth] sample to discover using human discernment, an Nth set of natural variants, as Elements (IN, JO, KP, LQ) mapping each resource belonging to a webpages. Where the entire managerial hierarchical set of entities comprising Superset (IN), Set (IN, JO) and Subset (IN, JO, KP) optimal dataset may contain a plurality of 'related objects' first introduced in U.S. Pat. No. 7,908,263 and now are weighted during the cherry picking process as Elements (IN, JO, KP, LQ).

The multivariate analysis uses several dimensions such as, content, contextual, content and context language, news, GPS, intellectual property, maps, encyclopedia objects, telephone numbers, people, to select the top responses, where the ('VVV') or (V0) algorithm uses V1, volume, V2, velocity, V3, veracity, V4, variant, V5, variability, V6, vim, and V7, vigor, to find optimal response, first introduced in U.S. Pat. No. 7,809,659 as determining la crème de la crème or (!!!).

Figure 21:
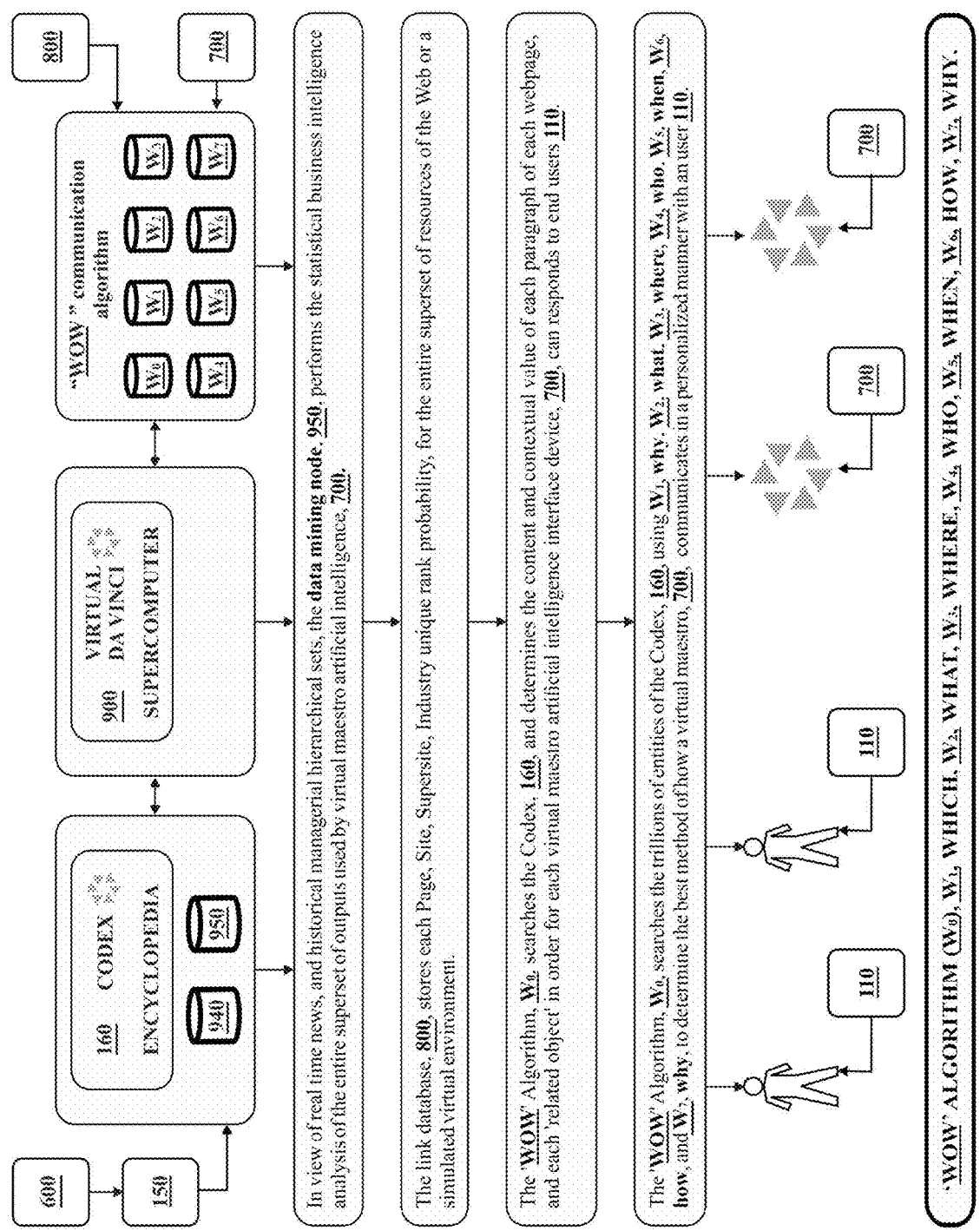
FIG. 21 presents a schematic diagram of an exemplary process of how Evolving System Big Data Indexing uses the ('WOW') algorithm.

FIG. 21 Evolving System Big Data Indexing using the (WOW) or (W0) algorithm. As in, Wow, I now know what you want, improves the accuracy of the Hot & Cold algorithm given a search pattern vector (W0). It is the object of the present invention to improve the HIVE, 150, into a Multivariate Analysis Replica Intelligent Ambience Evolving System, 600, continuously hosting in real time a plurality of end users 110, Virtual Maestros (artificial intelligence end user computing devices) 700, a Codex supercomputer, 160, and a Da Vinci Supercomputer artificial intelligence program, 900 used to probabilistically weight and rank each webpage, site, supersite using Corporate_ID and Industry_ID.

The navigational node, 920, uses web crawlers to navigate each hyperlink and assign a page, site, and super rank value or probability that is mapped to a quality partition from 0 to 10.

The data mining node, 930, performs statistical business intelligence of real time probabilistic significant news, trending data, and historical managerial hierarchical sets of the entire superset of outputs derived from the ('VVV') or (V0) algorithm search pattern P(Q++) to the search engine. The virtual maestro artificial intelligence end user computing device, 700, using the ('WOW') or (W0) algorithm, measures frequency of usage, unique user with demographics, commercial and financial information. A historical usage profile for each user and virtual maestro is used to generate managerial hierarchical set given each search pattern.

The link database, 800, stores each Page, Site, Supersite, Industry unique rank probability, for the entire superset of resources of the Web or a simulated virtual environment. The (WOW) or (W0) algorithm weights each response of the output in order to find the best fit response or la crème de la crème that satisfies a craving need.

The (WOW) or (W0) algorithm searches the Codex, 160, and determines the content and contextual value of each paragraph of each webpage, and each 'related object' in order for each virtual maestro artificial intelligence end user computing device, 700, can respond to end users 110. The Codex, 160, uses partial master indices, outputs, and optimal datasets given a search pattern to find the optimal way for the virtual maestro, 700, to communicate with an end user 110. The (WOW) or (W0) algorithm searches trillions of entities of the Codex, 160, using W1, which, W2, what, W3, where, W4, who, W5, when, W6, how, and W7, why, to determine the best method of how a virtual maestro, 700, communicates in a personalized manner with an user 110.

The Multivariate Analysis Replica Evolving System, 600 comprising of a plurality of Intelligent Component and Intelligent Data Warehouses in digital communication of the Codex, 160, human knowledge encyclopedia. The amount of data is massive, the system 600 updates indices in real time, and the high quality of responses per second is deemed to be mission critical using both hardware and software intelligence ambience to simplify for each input probabilistic spatial environment using the ('VVV') or (V0) algorithm in order to generate an output probabilistic spatial environment using the (WOW) or (W0) algorithm to perform automatic Monitoring, Reactive, Proactive and Dialogue responses to the end user.

Figure 22:
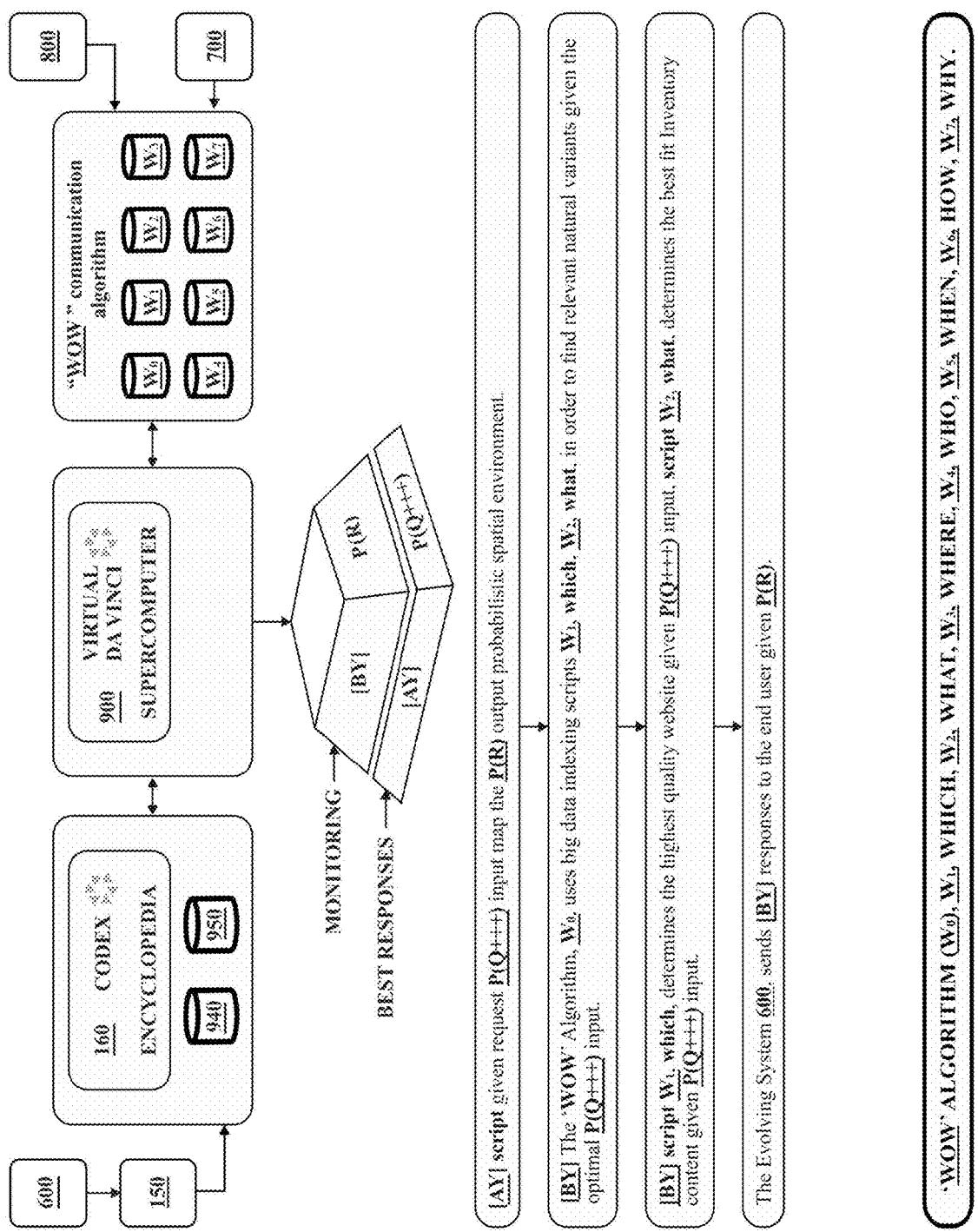
FIG. 22 presents a schematic diagram of an exemplary process of how Big Data Indexing ('WOW') provides automatic Monitoring responses.

FIG. 22 Big Data Indexing (WOW) or (W0) algorithm automatic Monitoring responses. For each valid request, the Evolving system 600, performing big data indexing using the 'VVV' algorithm, V0, to determine the P(Q+++) input that maps the best fit responses. At this point, the process of improving the input stops, and the [AY] top (n) responses becomes the output, now optimal dataset becomes the P(R) output probabilistic spatial environment for the terminal computer, smart device or interface device or artificial intelligence end user computing device or virtual maestro 700.

The best fit responses belonging to the output or P(R) are communicated to the end user. The (WOW) or (W0) algorithm using big data indexing scripts W1, which, analyzes the quality of the websites and W2, what, weights the quality of the inventory content to find [BY] relevant natural variants given the optimal P(Q+++) input that are automatically sent to the end user. It is the object of the present invention to improve the output, using the (WOW) or (W0) algorithm using big data indexing scripts to improve the optimal dataset 189 given a request 119.

Figure 23:
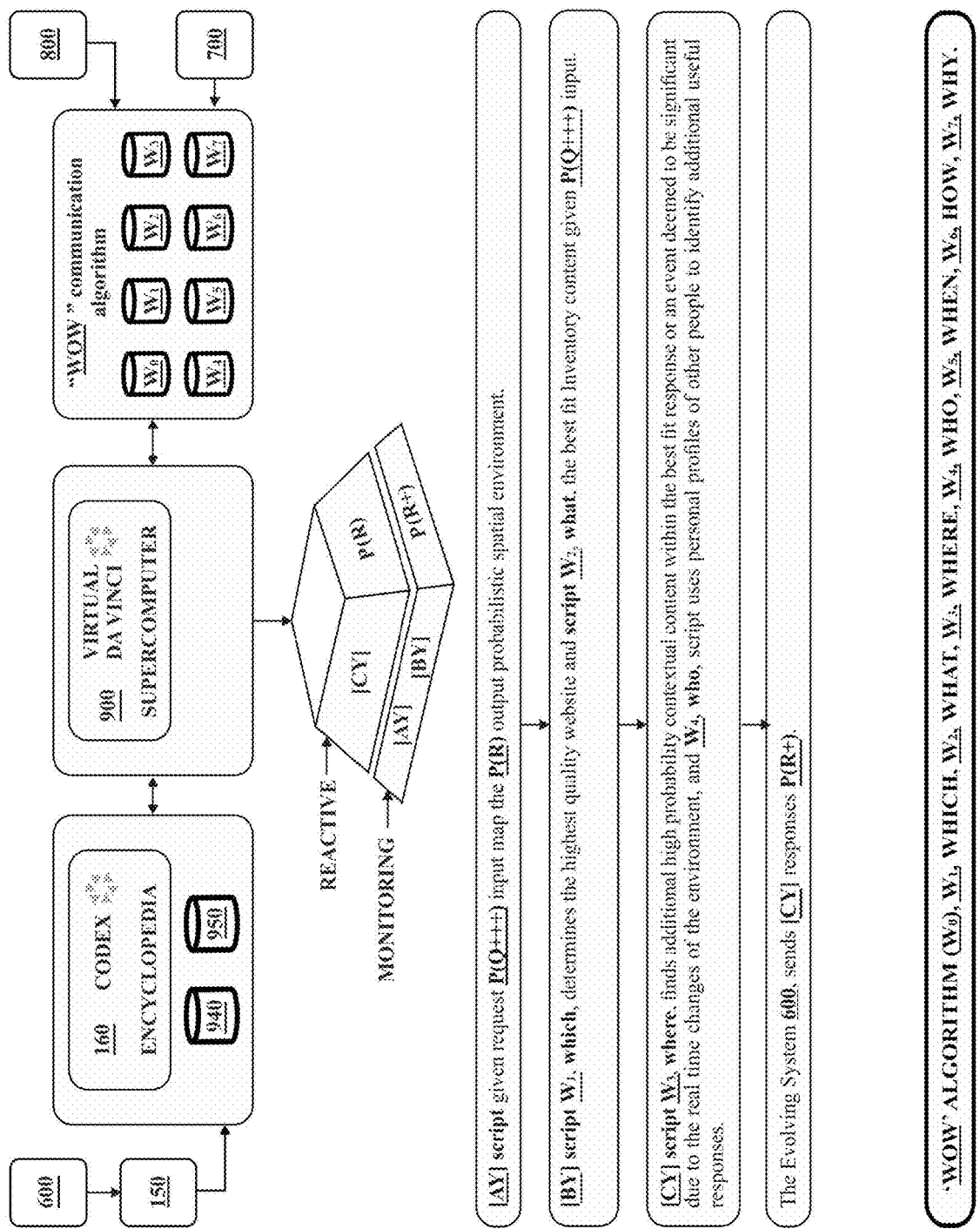
FIG. 23 presents a schematic diagram of an exemplary process of how Big Data Indexing ('WOW') provides automatic Reactive responses.

FIG. 23 Big Data Indexing (WOW) or (W0) algorithm automatic Reactive responses. For each valid request, the Evolving system 600, performing big data indexing determines the [AY] best fit responses that become the output, or the P(R) output probabilistic spatial environment for the end user computing device or artificial intelligence virtual maestro 700. The best fit responses are communicated to the end user. (WOW) or (W0) algorithm using big data indexing scripts W1, which, analyzes the quality of the websites and W2, what, weights the quality of the inventory content to find [BY] relevant natural variants. (WOW) or (W0) algorithm, enables the artificial intelligence virtual maestro 700, to automatically perform [CY] scripted reactive responses to the end user. [CY] scripted reactive responses to those in the art describes real time analysis of trending, social media, news or content changes that is deemed to be a craving need as per W3, where, and W4, who, scripts.

The (WOW) or (W0) algorithm, given P(R) finds the [AY] best fit responses and [BY] relevant natural variants. It is the object of the present invention to improve P(R), using the big data indexing scripts (WOW) or (W0) to determine the optimal dataset 189 given a request 119. [CY] using big data indexing scripts W3, where, and W4, who, searches the Codex 160, previously sent [AY] best fit responses and [BY] relevant natural variants, and upon finding a real time non based on what was said as [AY] best fit responses and furnished as [BY] relevant natural variants. To those in the art [CY] W3, where, script search describes finding additional high probability contextual content within the best fit response or an event deemed to be significant due to the real time changes of the environment. To those in the art W4, who, script search describes using usage patterns of behavior personal profiles of other people having similar same craving needs based on comments to the optimal dataset.

Figure 24:
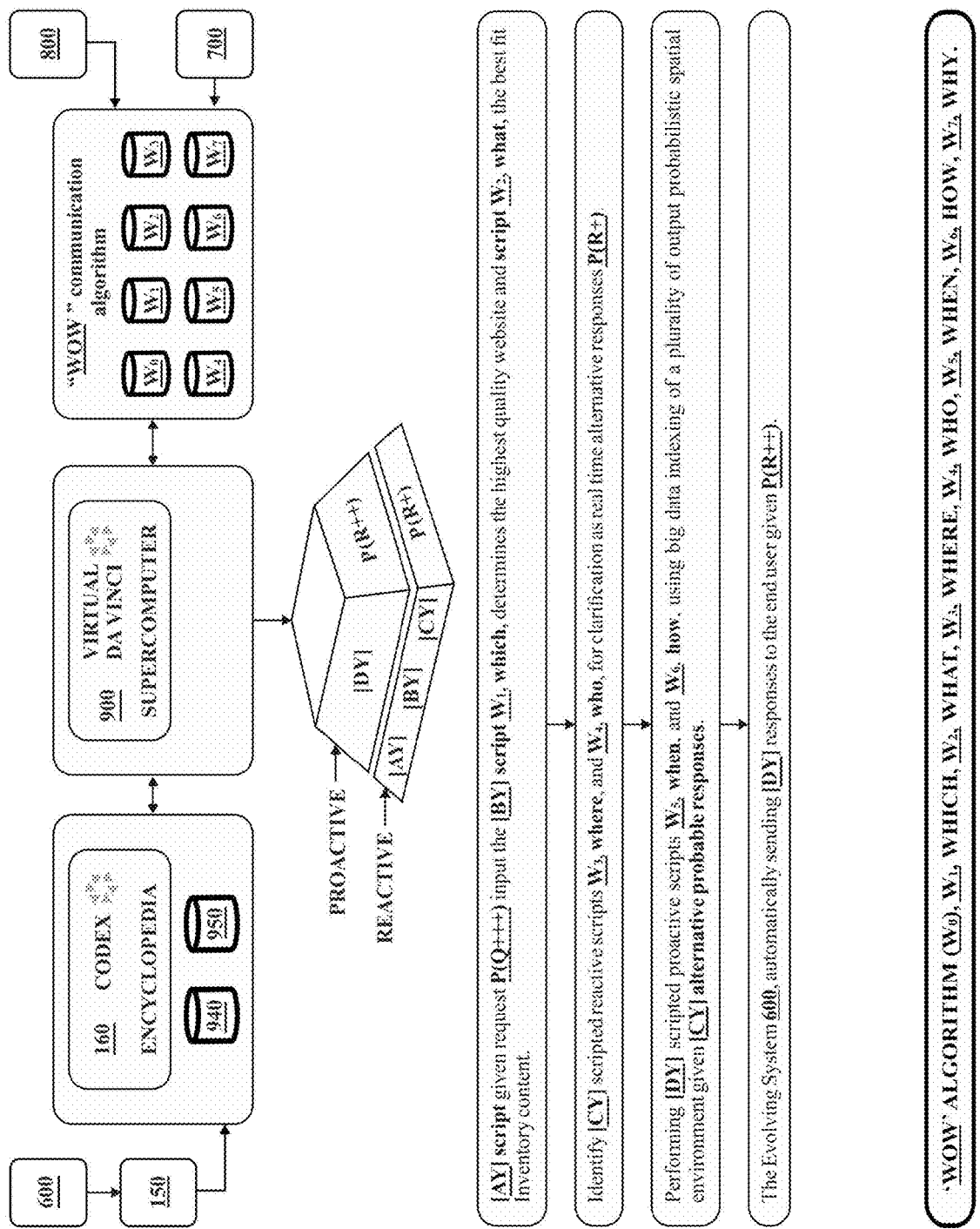
FIG. 24 presents a schematic diagram of an exemplary process of how Big Data Indexing ('WOW') provides automatic Proactive responses.

FIG. 24 Big Data Indexing (WOW) or (W0) algorithm, automatic Proactive responses. For each valid request, the Evolving system 600, performing big data indexing determines the [AY] best fit responses that become the output, or the P(R) output probabilistic spatial environment for the end user computing device, interface device or artificial intelligence virtual maestro 700. The big data indexing scripts W1, which, analyzes the quality of the websites and W2, what, weights the quality of the inventory content to find [BY] relevant natural variants, and performs [CY] scripted reactive scripts W3, where, and W4, who, to clarification updates responses. [DY] scripted proactive responses to those in the art describes real time significant probable alternatives deemed to be a craving need as per W5, when, and W6, how, scripts.

The (WOW) or (W0) algorithm, given P(R) finds the [AY] best fit responses and [BY] relevant natural variants. [CY] using big data indexing scripts W3, where, and W4, who, to find real time significant change to an event or contextual content that clarifies what was communicated as [AY] best fit responses and furnished as [BY] relevant natural variants. It is the object of the present invention to improve P(R), using the big data indexing scripts (WOW) or (W0) to determine the optimal dataset 189 given a request 119. Performing [DY] scripted proactive scripts W5, when, and W6, how, of a plurality of output probabilistic spatial environments, using the Hot and Cold algorithm analysis of the Inventory given [CY] alternative responses. To those in the art [DY] W5, when, script search describes finding 'related objects' to ascertain people, products, geospatial and event data. To those in the art W6, how, script search describes using usage patterns of behavior to W_RANK a plurality of optimal dataset $1^{st}$ expansion of 'related objects' P(R+), based on the set of [AY], [BY], [CY] communications.

Figure 25:
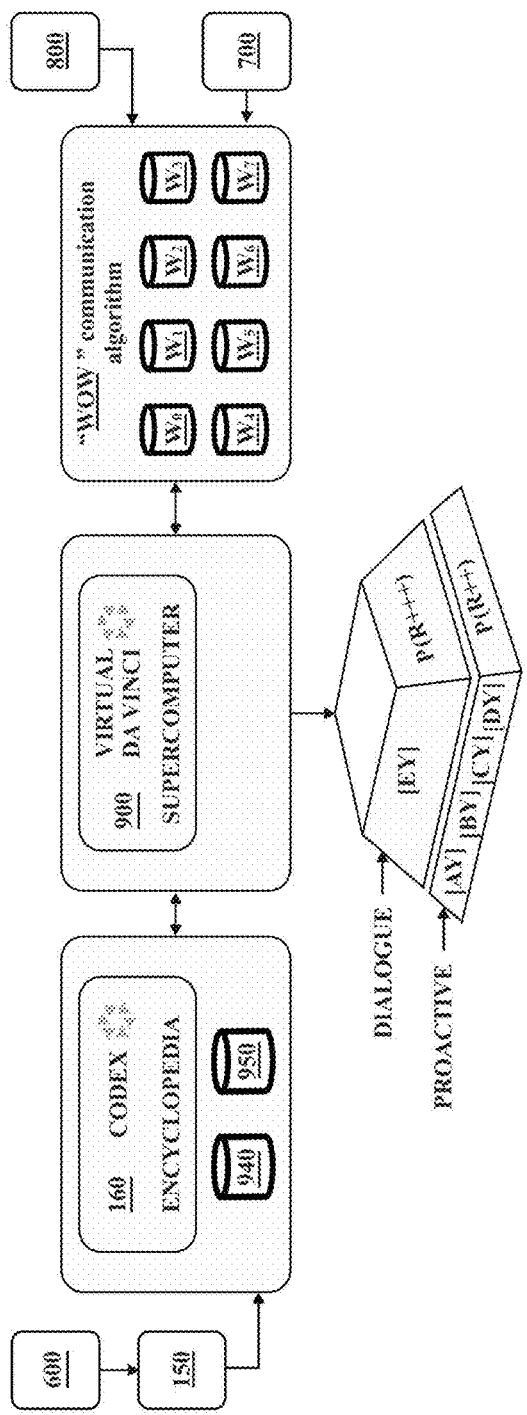
FIG. 25 presents a schematic diagram of an exemplary process of how Big Data Indexing ('WOW') provides automatic Dialogue responses.

FIG. 25 Big Data Indexing ('WOW') automatic Dialogue. For each valid request, the Evolving system 600, performing big data indexing determines the [AY] best fit responses that becomes the output, or the P(R) output probabilistic spatial environment for the terminal computer, smart device or interface device or end user computing device or virtual maestro 700. The big data indexing scripts W1, which, analyzes the quality of the websites and W2, what, weights the quality of the inventory content to find [BY] relevant natural variants, and performs [CY] scripted reactive scripts W3, where, and W4, who, for clarify and update real time responses. [DY] scripted proactive W5, when, and W6, how, weight the $1^{st}$ expansion of alternate probable managerial hierarchical set of 'related objects' based on [AY], [BY] and [CY] communications.

It is the object of the present invention to improve P(R), using the big data indexing scripts (WOW) or (W0) to determine the optimal dataset 189 given a request 119. Performing [EY] scripted proactive scripts W7, why using big data indexing of a plurality of output probabilistic spatial environment, Hot/Cold Inventory given [DY] alternative probable responses. To those in the art [EY] W7, why describes finding 'related objects' to ascertain people, products, geospatial and event data. To those in the art W7, how, script search describes using usage patterns of behavior to W_RANK a plurality of optimal dataset $2^{nd}$ expansion of 'related objects' P(R++), based on the nested [AY], [BY], [CY], [DY] communications.

Figure 26:
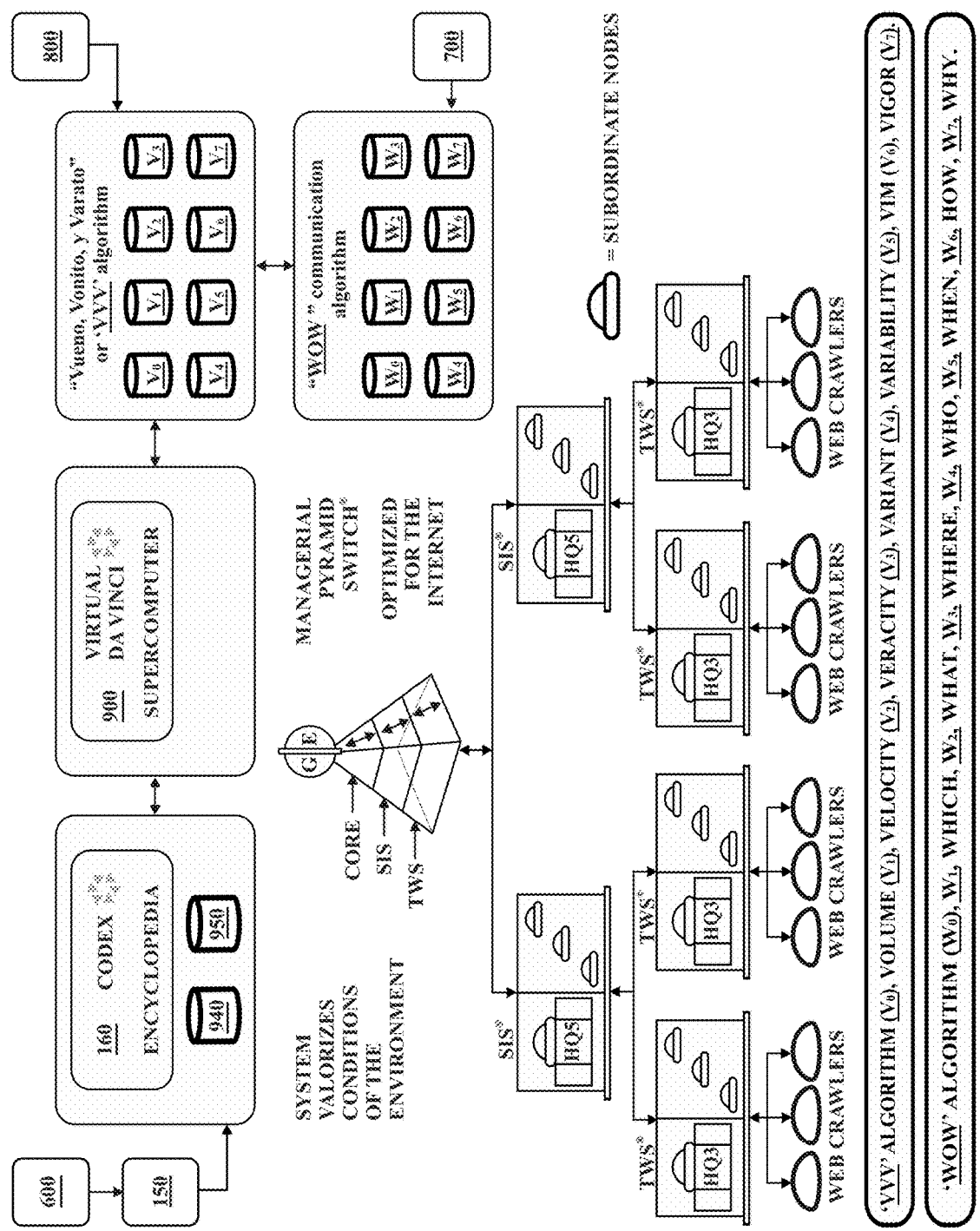
FIG. 26 presents a schematic diagram providing an Overview of the improved Evolving System using Big Data Indexing.

FIG. 26 Overview of the improved Evolving System using Big Data Indexing. An evolving system real time mission critical parallel cluster distributed supercomputer 600, comprising an optimized Internet search engine Managerial Pyramid Switch or Hive 150, using a link database 800, to assign a unique probability rank value to each webpage and website and continuously modify input and output preprocessed and pre-calculated datasets. Performing subject layers of index refinement given a search pattern using P(Q) to determine a searchable environment, P(~Q) to remove from calculation low quality, duplicate, spam and viral content to generate an improved environment, where P(Q)*P(~Q) describes P(Q|~Q) or P(Q+), since P(Q+) is a joint table calculation using the link database 800, webpage and website probabilities.

Da Vinci Supercomputer, 900, system, is a non-transitory artificial intelligence supercomputer program storage medium encoded with an artificial intelligence supercomputer program, the program comprising instructions that when executed by the supercomputer cause the supercomputer to automatically synchronize a plurality of non-transitory end user computing devices storage medium encoded with an artificial intelligence end user computing device or virtual maestro 700, the end user computing program comprising instructions that when executed by the end user computing device cause the end user computing device to perform operations.

The big data indexing 'Vueno, Vonito, Varato' or (V0) algorithm uses P(A)human knowledge 1st input set expansion of P(Q+), attenuating webpages not possessing relevant subject matter to P(Q+) to generate Superset (IN), further performing the nested intermediate reduction P(B) human wisdom $2^{nd}$ input set expansion to generate Set (IN, JO), further performing the nested intermediate reduction P(C) human understanding $3^{rd}$ input set expansion of P(Q+) to generate Subset (IN, JO, KP). The evolving system 600, uses (V0) algorithm: V1, volume, V2, velocity, V3, veracity, V4, variant, V5, variability, V6, vim, and V7, vigor, to find the optimal response given a search pattern. The managerial hierarchical set of Superset (U), Superset (IN), Set (IN, JO), Subset (IN, JO, KP), and further discover using human discernment, an Nth set of natural variants, as Elements (IN, JO, KP, LQ). mapping each resource belonging to a webpages and stored in the Codex encyclopedia 160.

Furthermore, the four TWS® belonging to the HIVE 150, comprising of clustered HQ3 to HQ0, where HQ2+ are (IDW) intelligent data warehouse components and subordinates HQ1 and HQ0 are (IC) intelligent components comprising the lion share of the processing power instantiate and coordinate a plurality of web crawlers, using the link database 800, to simulate the Internet environment, determining what is navigational, low quality content, duplicate, spam, viral and forbidden content using Site Rank quality partitions and Q(w, x, y, z) quality filters.

P(Q) is a 'Boolean Algebra' analysis of documents, using the 'to be or not to be' style algorithm, given the request or regular expression one or more keywords exists in the document.

P(~Q) is a TWS® evolving system process converting a zero significant difference environment into a 2nd significant difference environment to generate a $1^{st}$ sample partial differential equation (I) of W_RANK 1,000,000 webpages stored by the Codex 150, where P(A) set of natural variants is determining using human knowledge data mining given the request. P(A) is a conditional probability that is used to gain factor relevancy and attenuate irrelevancy.

P(Q+|A) is a SIS® evolving system process converting a $2^{nd}$ significant difference environment into a $2^{nd}$ significant difference environment to generate a nested $2^{nd}$ sample partial differential equation (J) of W_RANK 10,000 webpages stored by the Codex 150, where P(B) set of natural variants is determining using human wisdom data mining given the request. P(B) is a conditional probability that is used to gain factor relevancy and attenuate irrelevancy.

P(Q++|B) is a MPS® evolving system process converting a $4^{th}$ significant difference environment into a $5^{th}$ significant difference environment to generate a nested 3rd sample partial differential equation (K) of W_RANK 100 webpages stored by the Codex 150, where P(C) set of natural variants is determining using human understanding data mining given the request. P(C) is a conditional probability that is used to gain factor relevancy and attenuate irrelevancy.

At, this point the 'Cherry Picking' process convert the optimal request P(Q+++) using the independent obtained conditional probabilities P(~Q) quality of the parent website, P(A) quality of the human knowledge using TWS® subject matter data warehouses, P(B) quality of the human wisdom using SIS® subject matter data warehouses, P(C) quality of the human understanding using MPS® subject matter data warehouses, applying business intelligence statistical analysis to generate the optimal input P(Q+++) given the request. Exact patterns occur when using an assisted input or smart input that exists as a Codex page belonging to the Codex Encyclopedia, and search pattern when using probable and plausible branching natural branching expansions combinations. From P(Q+++) the output is generated, and the top non spam or viral content is deemed to be the optimal response or la crème de la crème.

P(R) or best results is an ad hoc analysis of top documents, using the 'to be or not to be' style algorithm, given the request or regular expression one or more keywords exists in the document in this case P(R) was not derived from P(Q) but instead from optimal input P(Q+++).

Da Vinci Supercomputer using (W1), which, (W2), what, (W3), where, (W4), who, (W5), when, (W6), how, and (W7), why, to determine the best method of how an end user computing device or virtual maestro, 700, communicates in a personalized manner with an end user 110 for P(Q) up to P(Q+++) as follows:

(A) Monitor mode: P (Q|R) best responses[AY] comprising automatic assisted or smart input responses sent to the user's computer terminal, or interface device with the best preprocessed and pre-calculated responses in the Codex 150, since a valid exact pattern exists.

(B) Reactive mode: P(Q|R+) comprising: searching the output for a non-repetitive clarification messages using the highest probability best response, parsing the output to discover contextual relevant words neighboring as 'related objects' to the highest probability P(R) response determining the highest probability [BY] 'related objects' P(R+) and then sending said highest probability 'related objects' P(R+) to the end user via the interface device.

(C) Proactive mode: P (Q|R+) proactively tracking the initial P(R) best responses and the non-duplicative clarification P(R+) best responses. Determining change from the Internet in the form of breaking news or events, social and trending to scrub, parse and prime relevant significant difference to discover non duplicate valid paragraphs of contextual content and resources related to the proactively tracked best responses. Artificial intelligence computer program, 700, correlating the clarification P(R+) best responses [CY] and the proactively tracked P(R+) best responses as a new output [DY] and picking probabilistically and displaying to the end user's interface from the proactively tracked P(R+) responses the highest weight response.

(D) Dialogue mode: P(Q|R++) determining, why the end user wants to ascertain 'related objects' related to people, products, geospatial, and event data, and measuring and weighting other similarly same characteristic end user's usage of behavior profiles to ascertain how the end user's input automatically mapped the output to determine dialogue P(R++) best responses. Virtual maestro artificial intelligence computer program, 700, correlating the proactive tracked P(R+) output [DY] and the dialogue P(R++) responses as a new output [EY], and determining probabilistically from the dialogue P(R++) responses the most satisficing craving need response and displaying to the end user interface device the P(R++) response.

Fourth Preferred Embodiment: Multivariate Analyzing Replicating Expert System

It is object of the present to improve U.S. Pat. Nos. 8,977,621 and 9,355,352 Expert System optimized for Internet web searches and financial transactions for computer terminals, smart and interfaces devices such as client-side virtual maestros and server-side supercomputers as follows:

Rule 101: Superset (U) for each valid request is transformed into a multivariate resultant vector. For each valid request P(Q) a searchable environment is created, and the Superset (U) represents all navigational and valid webpages in the search environment.

Rule 102: Superset (In) for each valid request searchable environment is compared using Site rank value of each webpage that removes irrelevancy is written as P(~Q), and thus upon removing irrelevancy for each valid request is written as P(Q+) absent of irrelevancy.

Rule 102: Superset (I0), when n=0, for each valid request P(Q+) as independent variable (I) generates the $1^{st}$ intermediate reduction approximation.

Rule 103: Output: comprises based on search engine standard to be the top N=1000, (W_RANK) pages, where using (W_RANK) a high quality webpages may be gain factored with a value greater than 1 and low quality webpage may be attenuated. Each output represents the top 1,000 W_RANK highest probability results given P(Q) when using Page Ranking and attenuate irrelevancy with Site Rank conditional probability P (Q|~Q) to generate P(Q+).

Rule 104: Superset (IN), where N denotes an integer greater than 0, for each valid request P(Q+) and $1^{st}$ set of key featured associations as the independent variable (I) used to generate intermediate reduction approximations written as P(A). P(A) comprises the first conditional probability describes input value that consists of related word and reference subject matter encyclopedia concept collections, geospatial data, antonyms and synonyms.

Rule 105: Set (TO, JO), when N=0 and O=0, for each valid request P(Q+) as independent variables (I, J) generate the $2^{nd}$ intermediate reduction approximation.

Rule 106: Set (IN, JO), where N and 0 denotes an integer greater than 0, for each valid request using P(Q+) and 2nd set of key featured associations as the independent variable (J) to generate intermediate reduction approximations written as P(B). P(B) comprises the second conditional probability describes input value that consists of related word and reference subject matter encyclopedia concept collections, geospatial data, antonyms and synonyms.

Rule 107: Subset (TO, JO, KO), when N=0, O=0, P=0, for each valid request P(Q+) as independent variables (I, J, K) generate the $3^{rd}$ intermediate reduction approximation.

Rule 108: Subset (IN, JO, KP), where N, O, P denotes an integer greater than 0, for each valid request using P(Q+) and 2nd set of key featured associations as the independent variable (J) to generate intermediate reduction approximations written as P(C). P(C) comprises the third conditional probability describes input value that consists of related word and reference subject matter encyclopedia concept collections, geospatial data, antonyms and synonyms.

Rule 109: Element (IN, JO, KP, LQ), where N, O, P, L denotes an integer, for each valid request using P(Q+) and nth set of key featured associations as a checkmate combination mapping a 'related object'. This rule is used for Direct Searches having financial, mapping and intellectual property when input automatically maps output putting buyers and sellers together.

Rule 110: Vector (V) represents P(Q+) for each probabilistic spatial environment, the 'vueno, vonito and varato' algorithm (V0), normalizes using quality metrics and usage patterns behavior the massive amount of probable combinations probabilistically simplifies to just the nitty gritty reasonable combinations to make a humanlike decision.

Rule 111: [AX] Samples Big Data Indexing: Vector (V) removes from calculation non-navigation webpages and resources to create an improved environment given a request. (V1) Volume determines the searchable environment as the point of reference. (V2) Velocity to cull the lion share as irrelevant to make the (input/output) mechanism real time and mission critical.

Rule 112: [BX] Samples Big Data Indexing: (V3) veracity, removing low quality webpages and (V4) variability, determining upon parsing webpages into monitoring and evaluation indicia as usage pattern of behavior, trending and social media data.

Rule 113: [CX] Samples Big Data Indexing: (V5) variant, removing low quality webpages and weighting related managerial set of natural variants Superset (IN), Set (IN, JO), Subset (IN, JO, KP), and Element (IN, JO, KP, LQ) key featured associations of the Vector (V).

Rule 114: [DX] Samples Big Data Indexing: (V6) vim, and (V7) vigor applying real time events and news data that satisfy a craving need of the end user as personal input.

Rule 115: [EX] Cherry Picking the output Big Data Indexing: Analyzing the contextually the content of webpages using the Hot/Cold and ('VVV') or (V0) algorithm, and Site quality to attenuate probabilistically unrelated low-quality content, and in turn gain factor probabilistically related high-quality content to map an optimal dataset.

Rule 116: Output: After performing the [AX] to [EX] intermediate calculations given a search pattern, the P(Q) to P(Q+++) is used to determine the output P(R).

Rule 117: [AY] Samples Big Data Indexing: The link database, modifies the Page Ranking probability of each webpage using Site, Supersite and Industry quality partition from 0 irrelevant or viral content to 10 la crème de la crème with a probability of 1 or certain.

Rule 118: [AY] Probabilistically removing irrelevancy with the quality of the Site.

Rule 119: [AY] Probabilistically gain factoring high quality Sites.

Rule 120: [AY] P(R) represents a commercial adjusted probability, upon gain factoring the quality of the website when part of a commercial Supersite portal, or an Industry.

Rule 121: [AY] Codex Pages, storing the optimal dataset and the managerial hierarchical set of associated entities given a search pattern. The most probable entities offered to the end user as command instructions as a managerial hierarchical set comprising related Superset (IN), Set (IN, JO), Subset (IN, JO, KP), and Element (IN, JO, KP, LQ) key featured associations of the Vector (V). Superset (IN) are the most probable, as parents of the hierarchy.

Rule 122: (W1), which, big data script indexing analyzes the quality of the websites using Site Rank values, as a search that determines "which is the best site" given the search pattern.

Rule 123: (W2), what, big data script weights the quality of the inventory content, as a search that determines "what is really inside as an inventory of content and related object such as intellectual property, people, products and live events in each site" given the search pattern.

Rule 124: Monitoring communication [AY], first the input is transformed interactively as a search pattern (super glyph equation) measuring each identified and concept, and then performing a set of intermediate reductions [AX] to [EX] mapping a managerial hierarchical set of entities, obtained using human knowledge, wisdom, understanding and discernment to improve the input from P(Q) to P(Q+++) to generates an output. The top (n) responses become the optimal dataset upon applying (W1), which, and (W2), which scripts to weight each webpage. The optimal dataset is the basis to instantiate Reactive, Proactive and Dialogue communications.

Rule 125: Monitoring top (n) responses [AY], after measuring the WebPages not to be low quality, duplicative, spam or viral content as P(~R), to improve P(R) as a conditional probability given the website content quality, as Garbage free output or P(R+)=P(R)|P(~R).

Rule 126: [BY] Samples Big Data Indexing: automatically (in jargon real time meaning as fast as possible) displaying or speaking the top (n) responses [AY] as if a ping pong match (another description of randomly surfing the web. To those in the art the automatic Monitoring [AY] communication comprises an improvement to the classical search engine, comprising given the P(Q) generate an output, and then using an ad hoc method determining P(R) to create an optimal dataset that is displayed to the end user, describing to independent calculations represented a P (Q|R). Using the benefit of the subject layers of refinement first introduces in U.S. Pat. No. 7,809,659 and its continuations U.S. Pat. Nos. 8,676,667, 8,386,456, and 9,355,352, P(Q|R) upon reaching input informational certainty becomes P (Q+++|R) and after culling low quality sites, and promoting high quality site, the process is defined a P (Q+++|R+).

Rule 127: P(Q|R) represents using a link database assigning a probability of zero or P(Q)=0.00, when the webpages does not make a partial or exact match of the search pattern, and P(Q)=1.00 when it does, then using Page Rank probabilities the top (n) responses become the output, where (n) as an industry standard is 1,000. It is the object of the present invention the top (n) responses become the output, where (n) does not exceed 20 when humanizing the process. The ad hoc method figures out the P(R) using Page Rank probabilities and the top (10) response becomes the optimal dataset that is displayed in order of highest to lowest to the user.

Rule 128 P(Q+|R), First P(Q|R) represents using a link database assigning a probability of zero or P(Q)=0.00, when the webpages does not make a partial or exact match of the search pattern, and P(Q)=1.00 when it does, the so called searchable environment, and then using Site Rank probabilities low quality website content, duplicates, spam and viral content is removed as P(~Q). Upon removing the garbage at incipiency), P(Q) is transformed to P(Q+). It is the object of the present invention to cull irrelevancy using the (V1), volume map the input side probabilistic spatial searchable environment, and (V2), velocity, the process of transforming the zero significant difference (n!−(n−6)!)/6!), and when n=100 represents 1,192,052,040 into an input side probabilistic improved environment $2^{nd}$ significant difference ((n−2)!−(n−6)!)/4!), and when n=100 represents 150,511 that pass the first threshold of informational certainty and thus the lion share is removed from calculation. Alternatively, the evolving system uses the SQRT (1,192,052,040) or 34,511 when humanizing the process.

Rule 129 P(Q+++|R): After transforming P(Q) into P(Q+) using the benefit of the subject layers of refinement first introduces in U.S. Pat. No. 7,809,659 and its continuations U.S. Pat. Nos. 8,676,667, 8,386,456, and 9,355,352 (V3), veracity, (V4), variant, (V5), variability, (V6), vim, and (V7), vigor, performing index refinement using human knowledge, wisdom and understanding to generate P(Q++) an input side probabilistic optimal environment $4^{th}$ significant difference ((n−4!)−(n−6)!)/2!), and when n=100 represents 4,560 that pass the $2^{nd}$ threshold of informational certainty. Alternatively, the evolving system uses SQRT (SQRT (1,192,052,040)) or 185 when humanizing the process. It is the object of the present invention to perform intermediate reductions to the nth P(Q+++) an input side probabilistic optimal element environment of $5^{th}$ significant difference ((n−5!)−(n−6)!)/1!), and when n=100 represents 95. Alternatively, the evolving system uses SQRT (SQRT (SQRT (1,192,052,040))) or 14 when humanizing using harmony, balance and proportion to calculate the highest quality only.

Rule 130 Reactive: The evolving system upon responding the output to the end user, may predicts what is optimal information displayed to the end user, or 'what was communicated' to the end user via a smart device or interface device, in view of P(Q+++|R+). U.S. Pat. No. 9,355,352 teaches a final decision. When a final decision occurs the virtual maestro may probabilistically instantiate the (W3), where and (W4), who, scripts to parse and analyze the optimal information in order to determine if additional natural variants, contextual or 'related objects' information clarification exists, or new significant trending or social media is available.

Rule 131: (W3), where, big data script indexing analyzes the output and determines where the 'related objects' are found based on the optimal information, where content and 'related objects' become command instructions that the virtual maestro can make as a final decision to engage on a communication with the user. First, eliminating repetitive content, if a 'related object' reverse engineering the description information or content within.

Rule 132: (W4), who, big data script tracks and analyzes who is searching based on the optimal information, real time live events, breaking news, social media or trending data.

Rule 133: Optimal information: comprises the content the virtual maestro speaks or displays to the end user. The optimal information is the weighted vectorized text paragraph sent such as intellectual property, trending, social media, financial and geospatial data.

Rule 134 Proactive: responding to a reactive or clarification message to the end user, to predict what is optimal information in view of P(Q+++|R++) using a $2^{nd}$ sample size for each valid optimal dataset. When a final decision occurs the virtual maestro may probabilistically instantiate the (W5), when, (W6), how, scripts to parse and analyze the optimal dataset in order to determine if additional contextual or 'related objects' information clarification exists, or new significant trending or social media is available. Optimal dataset describes the highest quality and best fit top (10) responses. To those in the art the humanized size optimal dataset is substantially greater when analyzing a session resultant optimal dataset and for this reason each request is measured as the second sample or SQRT(SQRT(P(Q+++))) or P(R++).

Rule 135: (W5), when, big data script analyzes output and determines where the 'related objects' such as people, products, geospatial and event data are found based on the optimal dataset, and determines probable significant alternatives that the virtual maestro can make as a final decision to engage on a communication with the user. First, eliminating repetitive content, and if a 'related object' reverse engineering the description information or content within.

Rule 136: (W6), how, big data script tracks and analyzes a plurality of output probabilistic spatial environment, Hot/Cold Inventory given [CY] alternative responses.

Rule 137 Dialogue: The evolving system upon responding a proactive, reactive or clarification message to the end user, may continue to predict and make final decisions based on what is optimal information, adding new output based optimal dataset representing the virtual maestro artificial intelligence P(Q+++|R+++) using a 3rd sample size for each optimal dataset.

Rule 138 (W7), why, big data script determines where the 'related objects' such as people, products, geospatial and event data exists and how they are relevant to P(Q+++) so that the evolving system virtual maestro know why the search was made and upon reaching informational certainty understands, and interacts with, the end user upon gathering, analyzing and priming significant changes in the environment relative to personal profile comprising human monitoring and evaluation data that is of interest or satisfies a craving need.

Rule 139 (W0), wow, big data script describes upon analyzing a tracking and analyzing a plurality of output probabilistic spatial environment, Hot/Cold Inventory given [BY] natural variant alternative responses, given [CY] Significant probable alternative responses and given [DY] Significant probable alternative responses, as per U.S. Pat. No. 7,058,601 the evolving system which continuously scans and gathers information from, understands, and interacts with, an environment. It is the object of the present invention to allow virtual maestro artificial intelligence device upon reaching information certainty be able to understand and interact with live and real time events of the Internet and be able to communicate probabilistically, new conversations, updates and comment from the analysis of significant breaking news, social media and trending data as if a human with the end user. Where the virtual maestro, upon identifying significant data from the environment of information deemed a craving need (as in of interest or personal satisfaction) is detected given usage pattern of the end user. Following a small sample script of at least one communication with time delays to avoid overcoming with trivia the human, but resetting automatically upon receiving a positive feedback from the user or a comment given the search pattern made by another user belonging to the same social group, and stopping upon receiving a final decision "stop" or equivalent. To those in the art a trusted identified human belonging to the social group of the user, such as mother-daughter or, brother and sister or coworkers with or without restrictions to name a few.

LIST OF ELEMENTS

Ref No. Description
100 Search Engine System
105 Computer Terminal, Subscriber Device or Smart Input Device
110 End User or Subscriber
115 Interactive Input
119 Request
120 Browser
130 Optimizer
135 Personal input
140 Internet
150 The Hive
155 HIVE SMP (Symmetric Multi-Processing) Artificial Intelligence Software
160 Codex Inventory Control System
165 Rules of Semantics
167 Pattern Matching
169 Codex Page
170 Human Knowledge Encyclopedia
175 Entity Object
177 Natural Variants
180 Optimal Environment
185 Inventory Control Content
189 Optimal Dataset
199 Personalized Dataset
200 Web Crawler Sub System
205 Web Crawler
207 Web Crawler navigating every Site
209 Reading each URL of a webpage
210 New Document
215 Raw Data
219 Primed Data (for human monitoring and evaluation)
220 Parse Data (using rules of grammar and semantics)
230 Determining if each webpage and associated 'related objects' are navigational
240 Counting unique hyperlinks to 'related objects' in the webpage.
242 Change in the count of distinct hyperlinks to 'related objects' in the webpage
245 Counting search clicks to 'related objects' in the web page
247 Counting the frequency of search clicks to 'related objects' in the web page
249 Identifying end users searching each resource, webpage, website and super site.
250 Determining for each resource a 'related object' type
260 Ranking each webpage
265 Trend Data (measures pattern of behavior)
266 Protected Trend Data (measures pattern of behavior)
269 Derive Significant Portions of Information
270 Identifying end user search patterns and relevant natural variants.
275 Map Entity Object
276 Protected Entity Object
277 Map Natural Variant
278 Protected Natural Variant
280 Mapping valid search pattern combinations given the 'related object' type
285 Update Super Glyph (Mathematical) Equation
630 Scripted Algorithm and Database
700 Virtual Maestro (artificial intelligence computer program product)
701 Input Probabilistic Spatial Environment
702 Output Probabilistic Spatial Environment
710 Weighted Output Natural Variants (feature attributes, or alternatives)
720 Pick Best Natural Variant
730 Best Response Probable Branching
740 Weighted Plausible Responses
790 Pick Best Plausible Response
799 Dialogue Best Plausible Responses with the End User
800 Link Database
810 End User Historical Profile given a valid Search Pattern
820 Virtual Maestro Profile given a valid Search Pattern
830 Determining the unique count of incoming hyperlinks to a web page
831 Determining the unique count of search clicks to a web page
832 Determining a probabilistic ranking value for every web page
833 Assign a quality partition from 0 to 10 given the web page ranking value
840 Determining the unique count of incoming hyperlinks to a website
841 Determining the unique count of search clicks to a website
842 Determining a probabilistic ranking value for every website
843 Assign a quality partition from 0 to 10 given the website ranking value
900 Virtual Da Vinci supercomputer artificial intelligence program device
910 Simulating for each codex page the optimal environment
911 Updating each codex page upon identifying a higher value webpage
912 Associate the new web page to the codex page storing and updating changes
913 Continuously updating at least one collection of top (n) web pages, and the top (n) sites geospatial information
914 Continuously update relative master index belonging to each codex page
915 Determining at predefined time intervals the total number of web pages in the codex and for each codex page in its chain of command
916 Determining at predefined time intervals the total number of significant difference changes in the Internet and then revaluing each site that updated its top ranked (n) web pages 917 Cleansing, mapping and plotting the old master index into the new master index using the content value of the relative master index of the highest vector valued codex page 918 Continuously synchronize in real time the new master index that reflect the latest condition of the environment 919 Cleansing, mapping and plotting the new master index and the Codex and the entire chain of command of codex pages 930 Determining the unique count of incoming hyperlinks to a Super site 931 Determining the unique count of search clicks to a Super site 932 Determining a probabilistic ranking value for every Super site 933 Assign a quality partition from 0 to 10 given the ranking value 940 Navigational nodes 950 Data Mining nodes

What is claimed is:

1. An evolving system computer network using big data indexing to continuously predict, update, and weight significant time sensitive information of the Internet, in order to modify input and output preprocessed and precalculated datasets, the evolving system computer network comprising:
    an end user computing device;
    a real time mission critical parallel cluster managerial hierarchical distributed supercomputer, wherein the supercomputer is in data communication with the end user computing device;
    an artificial intelligence supercomputer program residing on a non-transitory supercomputer storage medium, the supercomputer program comprising an instruction set adapted to be executed by the supercomputer, wherein the program instructs the supercomputer to automatically perform operations coordinating a plurality of non-transitory end user computing device storage media encoded with an artificial intelligence computing device program, the computing device program comprising an instruction set adapted to be executed by the computing device, wherein the instruction set directs the computing device to perform operations comprising the steps of:
    assigning, using a link database, a unique ranking probability to each website and webpage of the Internet;
    establishing a pattern database with a comprehensive collection of keywords and clusters based on the English language, wherein the computing device program, using big data indexing searches the pattern database, to interactively interpret numerical, text and speech data and convert the interpreted data into a search pattern sent to the supercomputer;
    attenuating webpages from the probabilistic spatial environment, using Big Data indexing, by removing from calculation low-quality sites, duplicate, spam and viral content into an improved probabilistic spatial environment;
    adjusting, by the evolving system in real-time, webpages of the improved probabilistic spatial environment having high-quality parent website ranking probability, and selecting as output the highest adjusted probability webpages; and
    determining by the supercomputer program executing a set of software instructions the best responses from the output and displaying the best responses to the end user's computing device;
    wherein the end user computing device sends an exact pattern to the supercomputer to perform the steps of:
        searching the pattern database and determining if a match for the exact pattern exists;
        in response of a positive determination, executing artificial intelligence big data indexing mapping an output probabilistic spatial environment given the exact pattern; and
        sending the output to the end user computing device executing a set of software instructions to display to the end user the highest probability responses in an order; and
    wherein the supercomputer program performs the additional steps of:
        tracking search patterns by web crawlers, executing big data indexing, analyzing and priming newly detected content belonging to high quality websites as trending data and updating and mapping the trending data to the output probabilistic spatial environment as a new output;
        determining if the highest probability response of the new output is greater than the highest probability rendered response; and
        in response to a positive determination displaying to the user interface device the highest probability response of the new output.

2. The evolving system computer network of claim 1, wherein the supercomputer program performs the additional step of:
    executing a set of artificial intelligence software instructions using a link database, assigning a unique supersite ranking probability to each supersite of the Internet and probabilistically attenuating duplicate webpages and probabilistically gain factoring source webpages of a supersite, and selecting as output the highest probability responses given the search pattern.

3. The evolving system computer network of claim 1, wherein the supercomputer program performs the additional step of:
    executing a set of artificial intelligence software instructions using a link database, assigning a unique industry of companies ranking probability to each website and supersite belonging to a common denominator industry of companies of the Internet, using big data indexing, to continuously cleanse and map a plurality of websites and supersites belonging to a common denominator industry of companies, and gain factor each webpage belonging to an industry of companies, and selecting as output the highest probability responses given the search pattern.

4. The evolving system computer network of claim 1, wherein the supercomputer program performs the additional step of:
    mapping the input probabilistic spatial environment given the exact pattern;
    determining natural variants, upon executing artificial intelligence big data indexing of the input probabilistic spatial environment; and
    mapping each natural variant to the input probabilistic spatial environment.

5. The evolving system computer network of claim 4, wherein the supercomputer program performs the additional steps of:
    generating for each natural variant an input probabilistic spatial environment given the exact pattern;
    determining probable branching entities, upon executing artificial intelligence big data indexing; and mapping each probable branching entity to the input probabilistic spatial environment.

6. The evolving system computer network of claim 5, wherein the supercomputer program performs the additional steps of:

generating for each probable branching entity an input probabilistic spatial environment given the exact pattern;

plausible branching entities, upon executing artificial intelligence big data indexing; and mapping each plausible branching entity to the input probabilistic spatial environment.

7. The evolving system computer network of claim 1, wherein the supercomputer program performs the additional steps of:

generating for each plausible branching entity an input probabilistic spatial environment given the exact pattern;

determining related objects' resources, upon executing artificial intelligence big data indexing of the managerial hierarchical set of input probabilistic spatial environments given the exact pattern; and assigning a probability to each related object resource given the exact pattern.

8. The evolving system computer network of claim 1, wherein the end user computing device sends an exact pattern to the supercomputer to perform the steps of:

upon a negative determination that an exact pattern exists, defining a probabilistic spatial environment, given a search pattern;

attenuating webpages from the probabilistic spatial environment, using Big Data indexing, by removing from calculation low-quality sites, duplicates, spam and viral content into an improved probabilistic spatial environment; and determining statistically significant webpages as being the output.

9. The evolving system computer network of claim 8, wherein the supercomputer program performs the task of clarifying the initial responses by performing the additional step of:

in response, correlating the output probabilistic spatial environment executing computer program set of instructions to discover non-duplicative related objects and contextual relevant words neighboring the highest initial response as a new output; and determining if the highest probability response of the new output is greater than the highest probability initial response; and in response to a positive determination displaying to the user interface device the highest probability response of the new output.

10. The evolving system computer network of claim 8, wherein the supercomputer program performs the additional steps of:

determining the lowest probability of the top (n) responses of the output:

determining for each highest probability response if the new output is greater than the highest probability rendered response; and displacing to the user interface device the highest probability responses of the new output in order from highest to lowest.

11. The evolving system computer network of claim 8, wherein the supercomputer program performs the additional step of automatically communicating dialogue responses, comprising steps of:

gain factoring search patterns mapping the highest quality websites of the output probabilistic spatial environment as a dialogue response;

executing big data business intelligence calculations weighting and priming dialogue responses belonging to high quality supersites based on usage patterns of behavior as a new output; and determining if the highest probability response of the new output is greater than the highest probability rendered response, and in response to a positive determination, displaying to the user interface device the highest probability response of the new output.

12. The evolving system computer network of claim 1, wherein the supercomputer program performs the additional steps of:

further determining if the highest response is greater than the highest probability rendered response:

determining if the end user computing device is using a browser; and in response to a positive determination, one of displaying to the end user computing device browser the highest probability set of results in an order and speaking via the end user computing device the optimal probability response.

13. An apparatus using big data indexing to continuously predict, update, and weight significant time sensitive information of the Internet, in order to modify input and output preprocessed and precalculated datasets comprising:

an interface device and a real time mission critical parallel cluster distributed apparatus;

a non-transitory apparatus storage medium encoded with an artificial intelligence supercomputer program, the program comprising instructions that, when executed by the supercomputer, cause the apparatus to automatically perform operations coordinating a plurality of non-transitory computer storage media encoded with an artificial intelligence end user computing device program, the program comprising instructions that, when executed by the end user computing device, cause the interface device to perform operations comprising the steps of:

assigning, using a link database, a unique ranking probability to each website and webpage of the Internet;

establishing a pattern database means with a collection of all keywords and clusters based on the English language, wherein the computing device program, using big data indexing searches the pattern database, to interactively interpret the end user's input data using rules of English grammar and semantics and convert the interpreted data into a search pattern sent to the apparatus;

attenuating webpages from the probabilistic spatial environment, using Big Data indexing, by removing from calculation low-quality sites, duplicate, spam and viral content into an improved probabilistic spatial environment;

adjusting, by the evolving system in real-time, webpages of the improved probabilistic spatial environment having high-quality parent website ranking probability, and selecting as output the highest adjusted probability webpages; and the apparatus executing a set of software instructions to search the pattern database in order to identify said search pattern, executing a set of instructions upon finding a match and automatically displaying the best responses to the end user's interface device;

wherein the end user computing device sends an exact pattern to the supercomputer to perform the steps of:
  searching the pattern database and determining if a match for the exact pattern exists;
  in response of a positive determination, executing artificial intelligence big data indexing mapping an output probabilistic spatial environment given the exact pattern; and
  sending the output to the end user computing device executing a set of software instructions to display to the end user the highest probability responses in an order; and
wherein the supercomputer program performs the additional steps of:
  tracking search patterns by web crawlers, executing big data indexing, analyzing and priming newly detected content belonging to high quality websites as trending data and updating and mapping the trending data to the output probabilistic spatial environment as a new output;
  determining if the highest probability response of the new output is greater than the highest probability rendered response; and
  in response to a positive determination displaying to the user interface device the highest probability response of the new output.

14. The apparatus of claim 13, wherein the end user computing device sends an exact pattern to the supercomputer to perform the steps of searching the pattern database and determining if a match for the exact pattern exists; in response to a positive determination, executing artificial intelligence big data indexing mapping an output probabilistic spatial environment given the exact pattern; and sending the output to the end user computing device and the end user computing device executing a set of software instructions to display to the end user the highest probability responses in an order.

15. The apparatus of claim 13, wherein the end user computer program clarifies the initial responses, performing the additional steps of:
  in response to clarification of the initial responses, correlating the output probabilistic spatial environment executing the computer program set of instructions to discover non-duplicative related objects and contextual relevant words neighboring the highest initial response as a new output; and
  determining if the highest probability response of the new output is greater than the highest probability initial response; and in response to a positive determination displaying to the end user computing device the highest probability response of the new output.

16. The apparatus of claim 13, wherein the supercomputer program performs the additional steps of:
  tracking search patterns by web crawlers, executing big data indexing, analyzing and priming newly detected content belonging to high quality websites as trending data and updating and mapping the trending data to the output probabilistic spatial environment as a new output; and
  determining if the highest probability response of the new output is greater than the highest probability rendered response; and in response to a positive determination, displaying to the end user computing device the highest probability response of the new output.

17. The apparatus of claim 13, wherein the supercomputer program performs the additional steps of:
  gain factoring search patterns mapping the highest quality websites of the output probabilistic spatial environment as a dialogue response;
  executing big data business intelligence calculations weighting and priming dialogue responses belonging to high quality supersites based on usage patterns of behavior as a new output; and
  determining if the highest probability response of the new output is greater than the highest probability rendered response, and in response to a positive determination, automatically displaying to the end user computing device the highest probability response of the new output.

18. An evolving system supercomputer using big data indexing to continuously modify input and output preprocessed and precalculated datasets comprising:
  an end user computing device;
  a real time mission critical parallel cluster managerial hierarchical distributed supercomputer, wherein the supercomputer is in data communication with the end user computing device;
  an artificial intelligence supercomputer program residing on a non-transitory supercomputer storage medium, the supercomputer program comprising an instruction set adapted to be executed by the supercomputer, wherein the program instructs the supercomputer to automatically perform operations coordinating a plurality of non-transitory end user computing device storage media encoded with an artificial intelligence computing device program, the computing device program comprising an instruction set adapted to be executed by the computing device, wherein the instruction set directs the computing device to perform operations comprising the steps of:
  assigning, using a link database, a unique ranking probability to each website and webpage of the Internet, to continuously attenuate webpages having a low-quality website ranking probability and gain factoring webpages having a high-quality website ranking probability;
  establishing a pattern database with a comprehensive collection of keywords and clusters based on the English language, wherein the computing device program, using big data indexing searches the pattern database, to interactively interpret at least one of numerical; text and speech data using rules of English grammar and semantics and convert the interpreted data into a search pattern sent to the supercomputer;
  determining, by the supercomputer executing a set of software instructions to search the pattern database in order to identify said search pattern, upon a positive determination automatically displaying the best responses as output to the end user's interface device;
  wherein the end user computing device sends an exact pattern to the supercomputer to perform the steps of:
    searching the pattern database and determining if a match for the exact pattern exists;
    in response of a positive determination, executing artificial intelligence big data indexing mapping an output probabilistic spatial environment given the exact pattern; and
    sending the output to the end user computing device executing a set of software instructions to display to the end user the highest probability responses in an order; and
  wherein the supercomputer program performs the additional steps of:

tracking search patterns by web crawlers, executing big data indexing, analyzing and priming newly detected content belonging to high quality websites as trending data and updating and mapping the trending data to the output probabilistic spatial environment as a new output;

determining if the highest probability response of the new output is greater than the highest probability rendered response; and in response to a positive determination displaying to the user interface device the highest probability response of the new output.

19. The evolving supercomputer of claim 18, wherein the supercomputer program performs the additional step of:

executing a set of artificial intelligence software instructions using a link database, assigning a unique supersite ranking probability to each supersite of the Internet and probabilistically attenuating duplicate webpages and probabilistically gain factoring source webpages of a supersite, and selecting as output the highest probability responses given the search pattern.

20. The evolving system supercomputer of claim 18, wherein the supercomputer program performs the additional step of:

executing a set of artificial intelligence software instructions using a link database, assigning a unique industry of companies ranking probability to each website and supersite belonging to a common denominator industry of companies of the Internet, using big data indexing, to continuously cleanse and map a plurality of websites and supersites belonging to a common denominator industry of companies, and gain factor each webpage belonging to an industry of companies, and selecting as output the highest probability responses given the search pattern.

* * * * *